US012507360B2

(12) United States Patent
Kim et al.

(10) Patent No.: US 12,507,360 B2
(45) Date of Patent: Dec. 23, 2025

(54) ELECTRONIC DEVICE WITH HINGE ASSEMBLY

(71) Applicant: SAMSUNG ELECTRONICS CO., LTD., Suwon-si (KR)

(72) Inventors: Taejeong Kim, Suwon-si (KR); Jusung Maeng, Suwon-si (KR); Garam Lee, Suwon-si (KR); Jongkeun Kim, Suwon-si (KR); Jeongmi Lee, Suwon-si (KR); Junyoung Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 409 days.

(21) Appl. No.: 18/078,580

(22) Filed: Dec. 9, 2022

(65) Prior Publication Data
US 2023/0136116 A1    May 4, 2023

Related U.S. Application Data

(63) Continuation of application No. PCT/KR2022/014059, filed on Sep. 21, 2022.

(30) Foreign Application Priority Data

Nov. 4, 2021    (KR) .................. 10-2021-0150590

(51) Int. Cl.
*H05K 5/02*    (2006.01)
*F16C 11/04*    (2006.01)

(52) U.S. Cl.
CPC ............ *H05K 5/0226* (2013.01); *F16C 11/04* (2013.01)

(58) Field of Classification Search
CPC ... H05K 5/0226; G06F 1/1681; G06F 1/1652; F16C 11/04
See application file for complete search history.

(56) References Cited

U.S. PATENT DOCUMENTS 8,925,152 B2 *  1/2015  Ejima ................. H04M 1/0216
                                                      16/307
9,371,676 B2 *  6/2016  Rittenhouse ............ E05D 11/08
(Continued)

FOREIGN PATENT DOCUMENTS

KR    100548343 B1    2/2006
KR    100803629 B1    2/2008
(Continued)

OTHER PUBLICATIONS

International Search Report with English Translation for International Application No. PCT/KR2022/014059; International Filing Date Sep. 21, 2022; Date of Mailing Dec. 16, 2022; 9 pages.

*Primary Examiner* — Rockshana D Chowdhury
*Assistant Examiner* — Douglas R Burtner
(74) *Attorney, Agent, or Firm* — CANTOR COLBURN LLP

(57) ABSTRACT

An electronic device includes a display, a first housing, a second housing and a hinge assembly configured to connect the first housing and the second housing, and having a pair of hinge axes. The hinge assembly includes a hinge bracket including an intermediate protrusion formed to protrude in a direction of a middle axis perpendicular to the pair of hinge axes, a pair of hinge structures connected to the hinge bracket to be rotatable about the pair of hinge axes, and an intermediate member including a through-hole into which the intermediate protrusion is inserted, to be rotatable about the middle axis with respect to the hinge bracket. The intermediate protrusion also includes a protrusion base having a first radius, and a head including a projection which is formed on the protrusion base and which has a second radius greater than the first radius.

20 Claims, 33 Drawing Sheets

(56) References Cited

U.S. PATENT DOCUMENTS

| | | | |
|---|---|---|---|
| 10,606,318 B1* | 3/2020 | Lin | G06F 1/1681 |
| 11,543,854 B2* | 1/2023 | Park | G06F 1/1616 |
| 12,221,998 B2* | 2/2025 | Hsu | F16C 11/04 |
| 2004/0244147 A1* | 12/2004 | Qin | H04M 1/0216 |
| | | | 16/330 |
| 2008/0078056 A1* | 4/2008 | Hsu | H05K 5/0226 |
| | | | 16/280 |
| 2008/0078062 A1* | 4/2008 | Hsu | H04M 1/0212 |
| | | | 16/367 |
| 2009/0144938 A1* | 6/2009 | Wang | H04M 1/0212 |
| | | | 16/367 |
| 2010/0125975 A1* | 5/2010 | Zhang | G06F 1/162 |
| | | | 16/337 |
| 2010/0263166 A1* | 10/2010 | Wang | G06F 1/1679 |
| | | | 16/297 |
| 2012/0023703 A1* | 2/2012 | Duan | H04M 1/0216 |
| | | | 16/250 |
| 2012/0099249 A1* | 4/2012 | Duan | G06F 1/1681 |
| | | | 361/679.01 |
| 2013/0081229 A1 | 4/2013 | Hirano | |
| 2020/0264674 A1* | 8/2020 | Km | G06F 1/1681 |
| 2021/0247814 A1* | 8/2021 | Nguyen | G06F 1/1616 |
| 2022/0035421 A1* | 2/2022 | Yao | G06F 1/1652 |
| 2022/0197346 A1* | 6/2022 | Kim | G06F 1/1652 |
| 2023/0076291 A1* | 3/2023 | Yun | H04M 1/022 |
| 2023/0393632 A1* | 12/2023 | Hong | G06F 1/1681 |
| 2024/0247683 A1* | 7/2024 | Hong | F16C 11/04 |
| 2024/0302868 A1* | 9/2024 | Feng | G06F 1/1652 |

FOREIGN PATENT DOCUMENTS

| | | |
|---|---|---|
| KR | 20200101238 A | 8/2020 |
| KR | 20200101239 A | 8/2020 |
| KR | 102200430 B1 | 1/2021 |
| KR | 20210068880 A | 6/2021 |
| KR | 102279103 B1 | 7/2021 |
| KR | 102298726 B1 | 9/2021 |

* cited by examiner

ELECTRONIC DEVICE WITH HINGE ASSEMBLY

CROSS-REFERENCE TO RELATED APPLICATIONS

This application is a continuation application of International Application No. PCT/KR2022/014059 designating the United States, filed on Sep. 21, 2022, in the Korean Intellectual Property Receiving Office and claiming priority to Korean Patent Application No. 10-2021-0150590, filed on Nov. 4, 2021, in the Korean Intellectual Property Office, the disclosures of which are incorporated by reference herein in their entireties.

BACKGROUND

1. Field

The disclosure relates to an electronic device including a hinge assembly.

2. Description of Related Art

Recently, with the development of display-related technologies, electronic devices with flexible displays are being developed. A flexible display may be used in the form of a flat surface, and may also be deformed to be used in a specific shape. For example, an electronic device with a flexible display may be implemented in a foldable form to be folded or unfolded about at least one folding axis.

SUMMARY

To implement a folding operation or unfolding operation of an electronic device, a hinge assembly may be provided between a first housing and a second housing. The hinge assembly may have a structure for generating a force to maintain a predetermined folding state of the electronic device. To implement such a structure, a cam structure and a spring may be used in the hinge assembly. A separate pin member may be used to rotatably connect some components to a bracket. However, if a separate pin member is used, the cost of the hinge assembly may increase due to an increase in the number of components, and errors may be accumulated, thereby reducing the quality of the hinge module.

According to embodiments, an electronic device including a hinge assembly that may rotatably connect some components (e.g., an intermediate member) to a bracket, instead of using a separate pin member may be provided.

According to embodiments, an electronic device including a hinge assembly with a decrease in a number of components and a reduced manufacturing cost and with an increased productivity and quality may be provided.

According to one embodiment, an electronic device includes a display including a first area, a second area, and a folding area between the first area and the second area, a first housing configured to support the first area, a second housing configured to support the second area, and a hinge assembly configured to connect the first housing and the second housing, and having a pair of hinge axes Ha and Hb. The hinge assembly includes a hinge bracket including an intermediate protrusion formed to protrude in a direction of a middle axis M perpendicular to the pair of hinge axes Ha and Hb, a pair of hinge structures connected to the hinge bracket to be rotatable about the pair of hinge axes Ha and Hb, and an intermediate member including a through-hole into which the intermediate protrusion is inserted, to be rotatable about the middle axis M with respect to the hinge bracket. The intermediate protrusion includes a protrusion base having a first radius R1, and a head including a projection which is formed on the protrusion base and which has a second radius R2 greater than the first radius R1. The through-hole has a shape corresponding to a shape of the head.

According to various embodiments, the electronic device includes a display including a first area, a second area, and a folding area between the first area and the second area, a first housing configured to support the first area, a second housing configured to support the second area, a hinge assembly configured to connect the first housing and the second housing, and having a pair of hinge axes Ha and Hb. The hinge assembly may include a hinge bracket including an intermediate protrusion formed to protrude in a direction of a middle axis M perpendicular to the pair of hinge axes Ha and Hb, two pairs of hinge structures connected to the hinge bracket to be rotatable about the pair of hinge axes Ha and Hb, a pair of intermediate members connected to the intermediate protrusion and overlapping each other, to be rotatable about the middle axis M with respect to the hinge bracket, respectively, each of the pair of intermediate members and including a through-hole into which the intermediate protrusion is inserted. The intermediate protrusion may include a protrusion base having a first radius R1, and a head including a projection which is formed on the protrusion base and which has a second radius R2 greater than the first radius R1. The through-hole or may have a shape corresponding to a shape of the head.

According to embodiments, some components (e.g., an intermediate member) may be rotatably connected to a bracket without a need to use a separate pin member.

According to embodiments, a number of components of a hinge assembly may be reduced, instead of using a separate pin member, and accordingly, a manufacturing cost and weight of the hinge assembly may be reduced.

According to embodiments, accumulated errors between components may be reduced by reducing the number of components of the hinge assembly, and thus it may be possible to increase a quality of the hinge assembly.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
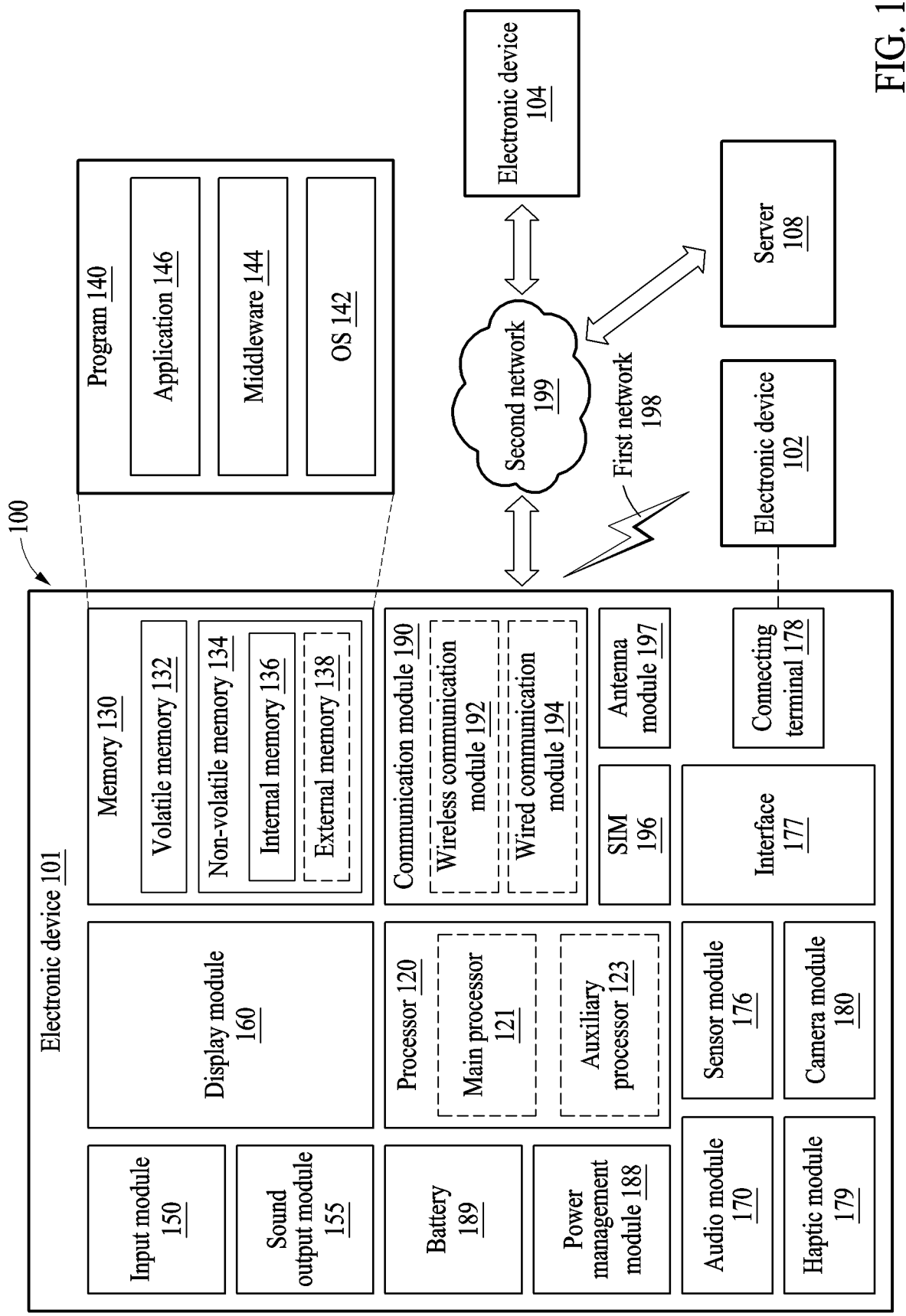
FIG. 1 is a block diagram illustrating an electronic device in a network environment according to one embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to one embodiment.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen). The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to one embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
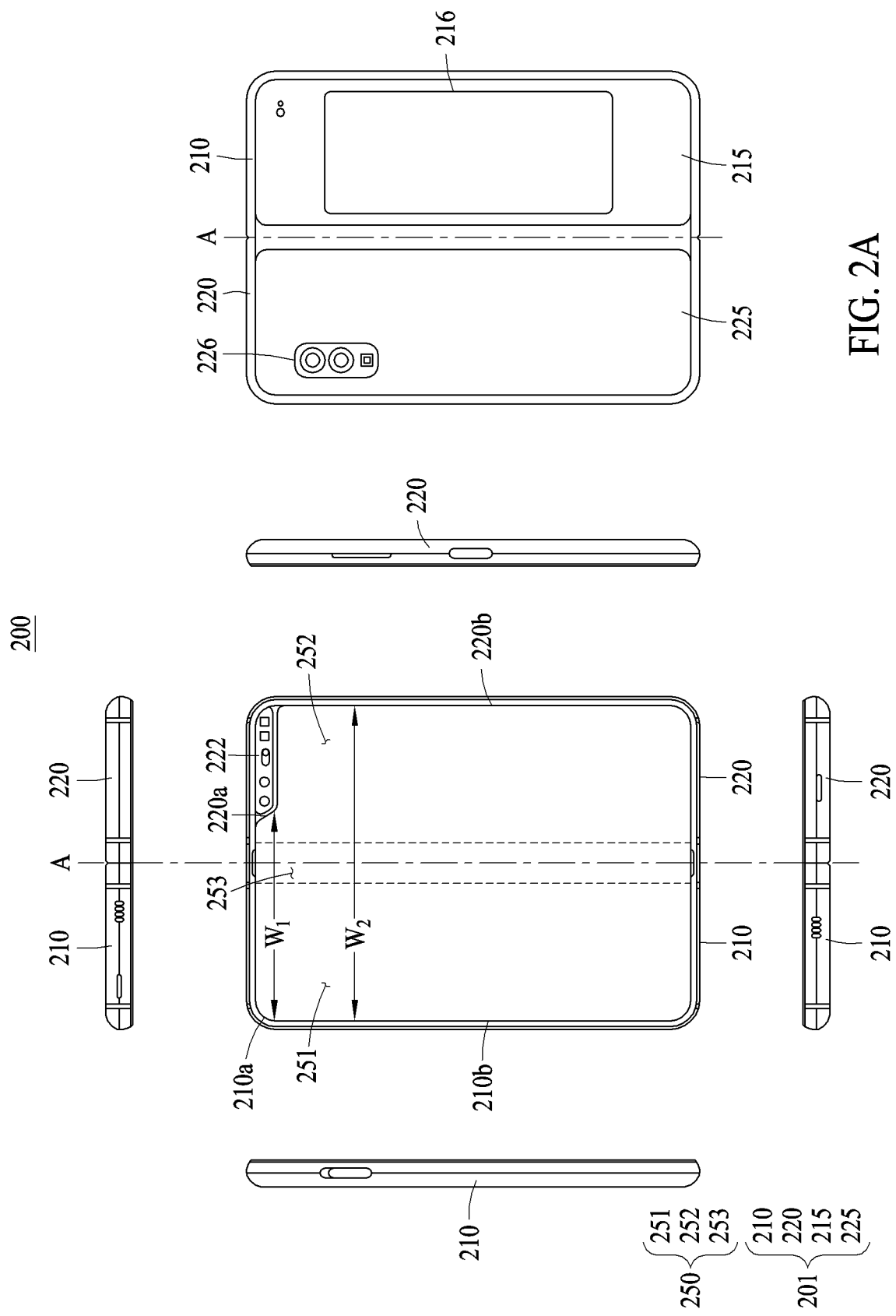
FIG. 2A is a diagram illustrating an unfolded state of an electronic device according to one embodiment.
Figure 2B:
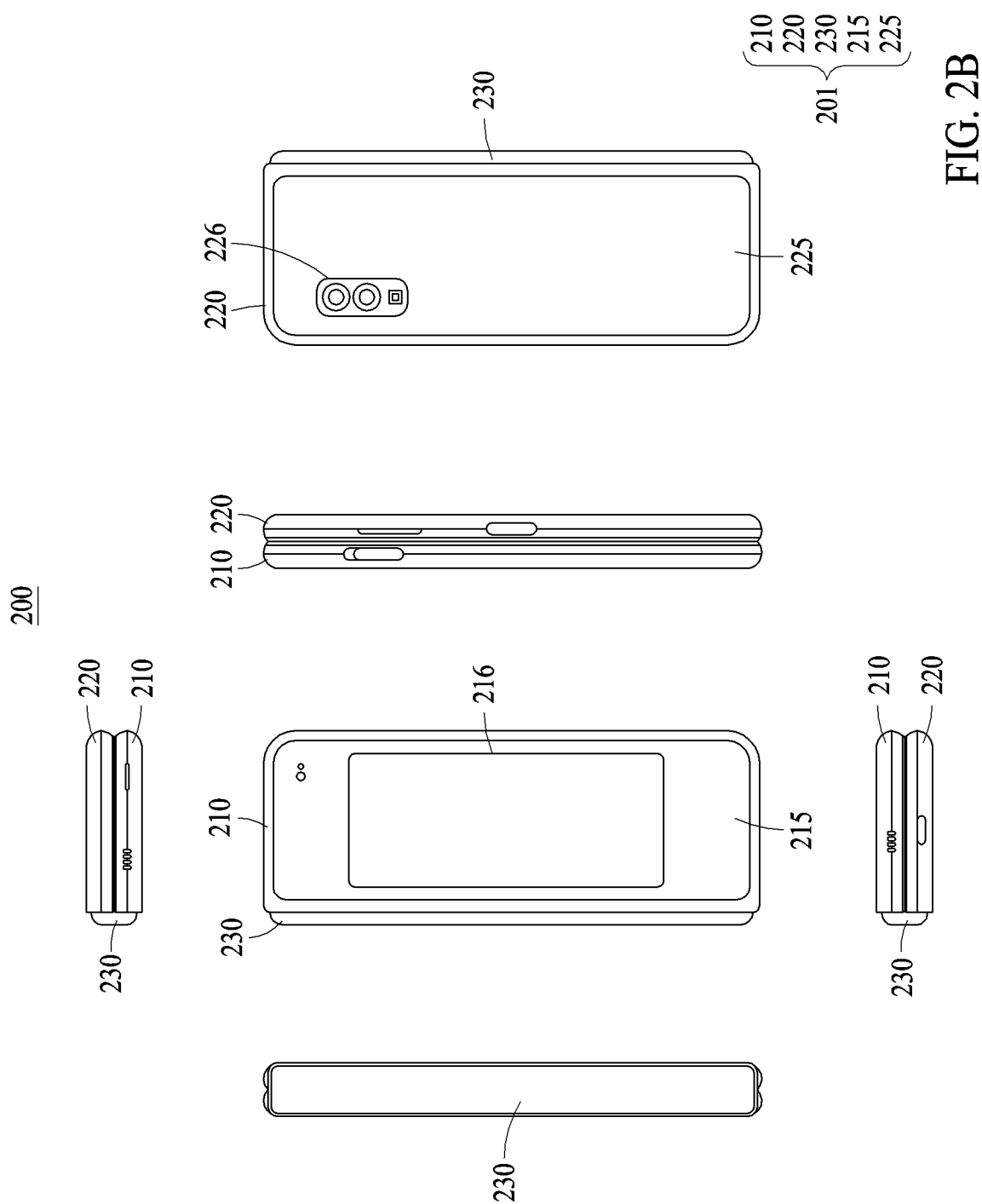
FIG. 2B is a diagram illustrating a folded state of an electronic device according to one embodiment.
Figure 2C:
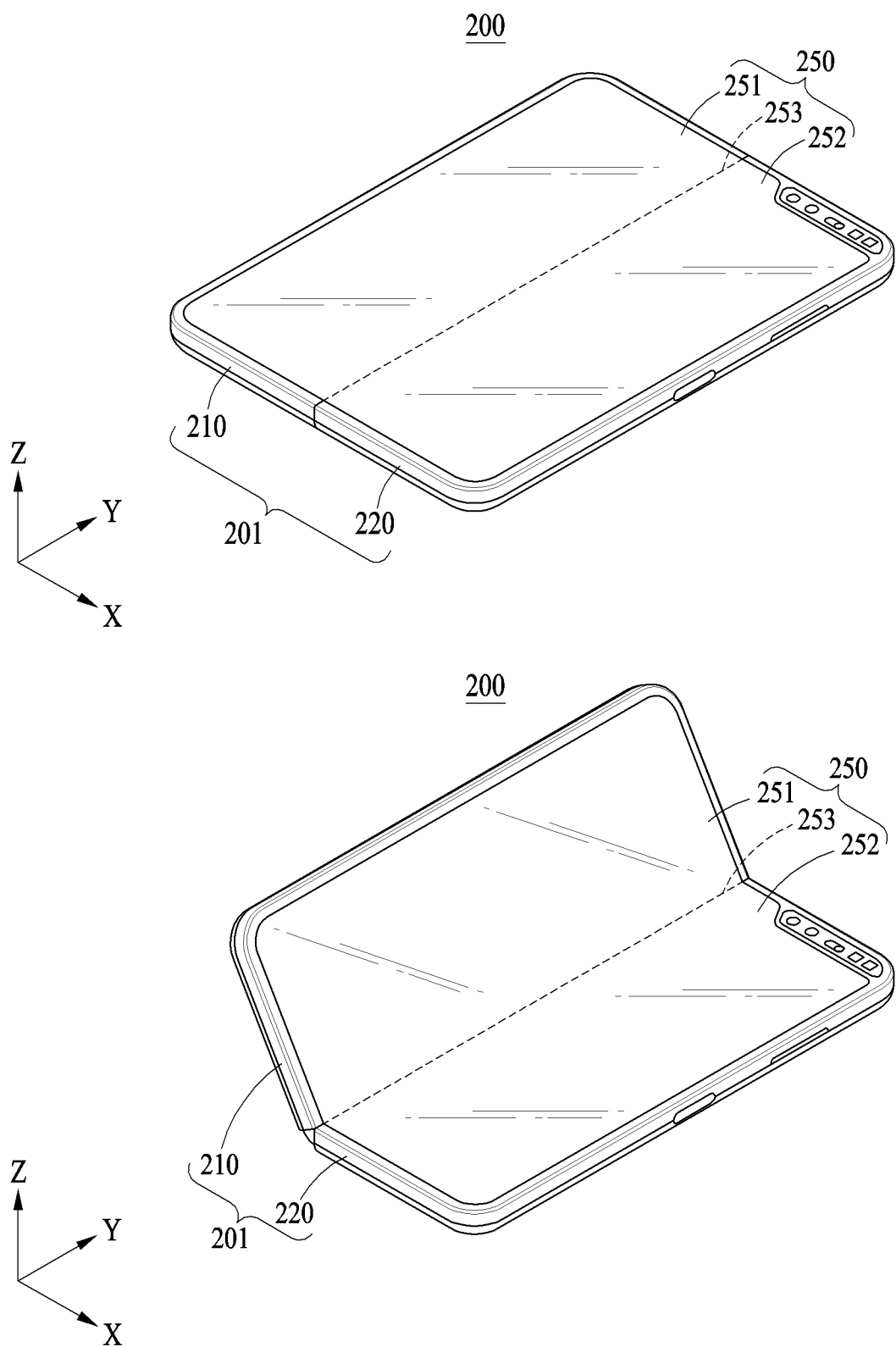
FIG. 2C is a perspective view illustrating an example of a fully unfolded state or an intermediate state of the electronic device according to one embodiment.

FIG. 2A is a diagram illustrating an unfolded state of an electronic device 200 according to one embodiment. FIG. 2B is a diagram illustrating a folded state of the electronic device 200 according to one embodiment. FIG. 2C is a perspective view illustrating an example of a fully unfolded state or an intermediate state of the electronic device 200 according to one embodiment.

The electronic device 200 of FIGS. 2A through 2C is an example of the electronic device 101 of FIG. 1, and may be a foldable or bendable electronic device.

In FIG. 2C and other following drawings, illustrated is a spatial coordinate system defined by an X-axis, a Y-axis, and a Z-axis that are orthogonal to each other. Here, the X-axis may represent a width direction of an electronic device, the Y-axis may represent a length direction of the electronic device, and the Z-axis may represent a height (or thickness) direction of the electronic device. In the following description, a "first direction" may refer to a direction parallel to the Z-axis.

Referring to FIGS. 2A and 2B, in one embodiment, the electronic device 200 may include a foldable housing 201, and a flexible or foldable display 250 (hereinafter, the "display" 250 in short) (e.g., the display module 160 of FIG. 1) disposed in a space formed by the foldable housing 201. A surface on which the display 250 is disposed (or a surface on which the display 250 is viewed from outside of the electronic device 200) may be defined as a front surface of the electronic device 200. In addition, a surface opposite to the front surface may be defined as a rear surface of the electronic device 200. In addition, a surface surrounding a space between the front surface and the rear surface may be defined as a side surface of the electronic device 200.

According to one embodiment, the foldable housing 201 may include a first housing structure 210, a second housing structure 220 including a sensor area 222, a first rear cover 215, a second rear cover 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2A and 2B, and may be implemented in a different shape or a different combination of components. For example, in one embodiment, the first housing structure 210 and the first rear cover 215 may be integrally formed, and the second housing structure 220 and the second rear cover 225 may be integrally formed.

According to one embodiment, the first housing structure 210 may be connected to the hinge structure 230, and may include a first surface facing a first direction, and a second surface facing a second direction opposite to the first direction. The second housing structure 220 may be connected to the hinge structure 230, and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

According to one embodiment, the first surface may face the third surface in a state in which the electronic device 200 is fully folded, and the third direction may be identical to the first direction in a state in which the electronic device 200 is fully unfolded.

According to one embodiment, the first housing structure 210 and the second housing structure 220 may be disposed on both sides with respect to a folding axis A and generally may be symmetrical with respect to the folding axis A. As to be described hereinafter, an angle or distance between the first housing structure 210 and the second housing structure 220 may vary depending on whether the state of the electronic device 200 is the unfolded state, the folded state, or an intermediate state (e.g., a partially folded state or a partially unfolded state). According to one embodiment, unlike the first housing structure 210, the second housing structure 220 may additionally include the sensor area 222, in which various sensors are arranged. However, the first housing structure 210 and the second housing structure 220 may have mutually symmetrical shapes in areas other than the sensor area 222. In one embodiment, the sensor area 222 may be additionally disposed in or replaced with at least a partial area of the second housing structure 220. The sensor area 222 may include, for example, a camera hole area, a sensor hole area, an under-display camera (UDC) area, and/or an under-display sensor (UDS) area.

According to one embodiment, as shown in FIG. 2A, the first housing structure 210 and the second housing structure 220 may together form a recess for accommodating the display 250. In one embodiment, due to the sensor area 222, the recess may have at least two different widths in a direction perpendicular to the folding axis A. For example, the recess may have a first width w1 between a first portion 210a of the first housing structure 210 parallel to the folding axis A and a first portion 220a of the second housing structure 220 formed on a periphery of the sensor area 222, and a second width w2 formed by a second portion 210b of the first housing structure 210 and a second portion 220b of the second housing structure 220 not corresponding to the sensor area 222 and being parallel to the folding axis A. In this case, the second width w2 may be greater than the first width w1. In one embodiment, the first portion 220a and the second portion 220b of the second housing structure 220 may be at different distances from the folding axis A. The widths of the recess are not limited to the shown example. In one embodiment, the recess may have a plurality of widths due to the shape of the sensor area 222 or asymmetrical portions of the first housing structure 210 and the second housing structure 220. According to one embodiment, the sensor area 222 may be formed to have a predetermined area adjacent to one corner of the second housing structure 220. However, the arrangement, shape, and size of the sensor area 222 are not limited to the shown example. For example, in one embodiment, the sensor area 222 may be provided at another corner of the second housing structure 220 or in a predetermined area between an upper corner and a lower corner. In one embodiment, components embedded in the electronic device 200 to perform various functions may be exposed to the front surface of the electronic device 200 through the sensor area 222 or through one or more openings provided in the sensor area 222. In one embodiment, the components may include various types of sensors. The sensors may include, for example, at least one of a front camera, a receiver, or a proximity sensor. According to one embodiment, the sensor area 222 may not be included in the second housing structure 220 or may be formed at a position different from that shown in the drawings.

According to one embodiment, at least a portion of the first housing structure 210 and the second housing structure 220 may be formed of a metal material or a non-metal material having a selected magnitude of rigidity to support the display 250. At least a portion of the first housing structure 210 and the second housing structure 220 formed of the metal material may provide a ground plane for the electronic device 200, and may be electrically connected to a ground line formed on a PCB disposed in the foldable housing 201.

According to one embodiment, the first rear cover 215 may be disposed on one side of the folding axis A on the rear surface of the electronic device 200, and may have, for example, a substantially rectangular periphery that may be enclosed by the first housing structure 210. Similarly, the second rear cover 225 may be disposed on another side of the folding axis A on the rear surface of the electronic device 200, and may have a periphery that may be enclosed by the second housing structure 220.

According to one embodiment, the first rear cover 215 and the second rear cover 225 may be substantially symmetrical with respect to the folding axis A. However, the first rear cover 215 and the second rear cover 225 are not necessarily mutually symmetrical. For example, the first rear cover 215 and the second rear cover 225 in the electronic device 200 may have various shapes. In one embodiment, the first rear cover 215 may be formed integrally with the first housing structure 210, and the second rear cover 225 may be formed integrally with the second housing structure 220.

According to one embodiment, the first rear cover 215, the second rear cover 225, the first housing structure 210, and the second housing structure 220 may form a space in which various components (e.g., a PCB, or a battery) of the electronic device 200 are to be arranged. In one embodiment, one or more components may be disposed or visually exposed on the rear surface of the electronic device 200. For example, at least a portion of a sub-display may be visually exposed through a first rear area 216 of the first rear cover 215. In one embodiment, one or more components or sensors may be visually exposed through a second rear area 226 of the second rear cover 225. In one embodiment, the sensors may include a proximity sensor and/or a rear camera.

According to one embodiment, a front camera exposed to the front surface of the electronic device 200 through one or more openings provided in the sensor area 222, or a rear camera exposed through the second rear area 226 of the second rear cover 225 may include one or more lenses, an image sensor, and/or an ISP. A flash may include, for example, a light emitting diode (LED) or a xenon lamp. In some embodiments, two or more lenses (e.g., infrared camera, wide-angle, and telephoto lenses) and image sensors may be arranged on one surface of the electronic device 200.

Referring to FIG. 2B, the hinge cover may be disposed between the first housing structure 210 and the second housing structure 220 to cover internal components (e.g., the hinge structure 230). According to one embodiment, the hinge structure 230 may be covered by a portion of the first housing structure 210 and a portion of the second housing structure 220, or may be exposed to the outside, depending on the state (e.g., the unfolded state, the intermediate state, or the folded state) of the electronic device 200.

In an example, when the electronic device 200 is in the unfolded state (e.g., a fully unfolded state) as illustrated in FIG. 2A, the hinge structure 230 may be covered by the first housing structure 210 and the second housing structure 220 not to be exposed. In another example, when the electronic device 200 is in the folded state (e.g., a fully folded state), as shown in FIG. 2B, the hinge structure 230 may be exposed to the outside between the first housing structure 210 and the second housing structure 220. In another example, when the first housing structure 210 and the second housing structure 220 are in an intermediate state of being folded with a predetermined angle, at least a portion of the hinge cover 230 may be exposed to the outside between the first housing structure 210 and the second housing structure 220. However, the area exposed in this example may be smaller than that in the fully folded state. In one embodiment, the hinge cover 230 may have a curved surface.

According to one embodiment, the display 250 may be disposed in a space formed by the foldable housing 201. For example, the display 250 may be seated on the recess formed by the foldable housing 201 and may be viewed from the outside through the front surface of the electronic device 200. For example, the display 250 may constitute most of the front surface of the electronic device 200. Accordingly, the front surface of the electronic device 200 may include the display 250, and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to one embodiment, the display 250 may refer to a display having at least a partial area that is deformable into a flat surface or a curved surface. In one embodiment, the display 250 may include a folding area 253, a first area 251 disposed on one side of the folding area 253 (e.g., on the left side of the folding area 253 shown in FIG. 2A), and a second area 252 disposed on the other side of the folding area 253 (e.g., on the right side of the folding area 253 shown in FIG. 2A).

However, such an area division of the display 250 shown in FIG. 2A is merely an example, and the display 250 may be divided into a plurality of areas (e.g., four or more areas, or two areas) depending on a structure or functions thereof. In an example, as shown in FIG. 2A, the display 250 may be divided into areas based on the folding area 203 extending in parallel to the folding axis A. In another example, the display 250 may be divided into areas based on another folding axis (e.g., a folding axis parallel to a width direction of an electronic device).

According to one embodiment, the display 250 may be coupled to or disposed adjacent to a touch panel including a touch sensing circuit and a pressure sensor for measuring a strength (a pressure) of a touch. For example, the display 250 may be coupled to or disposed adjacent to a touch panel for detecting a stylus pen of an electromagnetic resonance (EMR) type, as an example of the touch panel.

According to one embodiment, the first area 251 and the second area 252 may have globally symmetrical shapes around the folding area 253. However, unlike the first area 251, the second area 252 may include a notch that is cut depending on a presence of the sensor area 222, but may have a shape symmetrical to the first area 251 in the other areas. For example, the first area 251 and the second area 252 may include portions having mutually symmetrical shapes and portions having mutually asymmetrical shapes.

According to one embodiment, an edge thickness of each of the first area 251 and the second area 252 may be different from an edge thickness of the folding area 253. The edge thickness of the folding area 253 may be less than those of the first area 251 and the second area 252. For example, the first area 251 and the second area 252 may be asymmetrical in terms of thickness when viewed in a cross section thereof. For example, an edge of the first area 251 may be formed to have a first radius of curvature, and an edge of the second area 252 may be formed to have a second radius of curvature different from the first radius of curvature. In another example, the first area 251 and the second area 252 may be symmetrical in terms of thickness when viewed in the cross section thereof.

Hereinafter, each area of the display 250, and operations of the first housing structure 210 and the second housing structure 220 depending on the state (e.g., the folded state, the unfolded state, or the intermediate state) of the electronic device 200 will be described.

According to one embodiment, when the electronic device 200 is in the unfolded state (e.g., FIG. 2A), the first housing structure 210 and the second housing structure 220 may be arranged to face the same direction while forming an angle of 180 degrees. The surface of the first area 251 of the display 250 and the surface of the second area 252 thereof may face the same direction (e.g., a front direction of an electronic device) while forming 180 degrees. The folding area 253 may form the same plane in conjunction with the first area 251 and the second area 252.

According to embodiments, when the electronic device 200 is in the folded state (e.g., FIG. 2B), the first housing structure 210 and the second housing structure 220 may be arranged to face each other. The surface of the first area 251 and the surface of the second area 252 of the display 250 may face each other, forming a narrow angle (e.g., between 0 degrees to 10 degrees). At least a portion of the folding area 253 may form a curved surface having a predetermined curvature.

According to one embodiment, when the electronic device 200 is in the intermediate state, the first housing structure 210 and the second housing structure 220 may be arranged to form a predetermined angle therebetween. The surface of the first area 251 and the surface of the second area 252 of the display 250 may form an angle greater than that in the folded state and smaller than that in the unfolded state. At least a portion of the folding area 253 may include a curved surface having a predetermined curvature, and the curvature may be smaller than that in the folded state.

An upper part of FIG. 2C illustrates a state in which the electronic device 200 is fully unfolded, and a lower part of FIG. 2C illustrates an intermediate state in which the electronic device 200 is partially unfolded. As described above, the state of the electronic device 200 may be changed to the folded state or the unfolded state. According to one embodiment, when viewed in a direction of a folding axis (e.g., the folding axis A of FIG. 2A), the electronic device 200 may be folded in two types, i.e., an "in-folding" type in which the front surface of the electronic device 200 is folded to form an acute angle, and an "out-folding" type in which the front surface of the electronic device 200 is folded to form an obtuse angle. In an example, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the z-axis).

In another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2A and another axis parallel to the folding axis A). In this example, the electronic device 200 may also be folded in a "multi-folding" type in which the in-folding type and the out-folding type are combined. Also, although not shown in the drawings, a hinge axis may be formed in a vertical direction or a horizontal direction when the electronic device 200 is viewed from above. In an example, all the plurality of hinge axes may be arranged in the same direction. In another example, some of the plurality of hinge axes may be arranged in different directions and folded.

The in-folding type may refer to a state in which the display 250 is not exposed to the outside in the fully folded state. The out-folding type may refer to a state in which the display 250 is exposed to the outside in the fully folded state. The lower part of FIG. 2C shows the intermediate state in which the electronic device 200 is partially unfolded in an in-folding process.

Although the state in which the electronic device 200 is folded in the in-folding type will be described below for convenience's sake, it should be noted that the description may be similarly applied in the state in which the electronic device 200 is folded in the out-folding type.

The electronic device according to one embodiment may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to one embodiment, the module may be implemented in a form of an application-specific integrated circuit (ASIC).

Various embodiments of the present disclosure as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to one embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
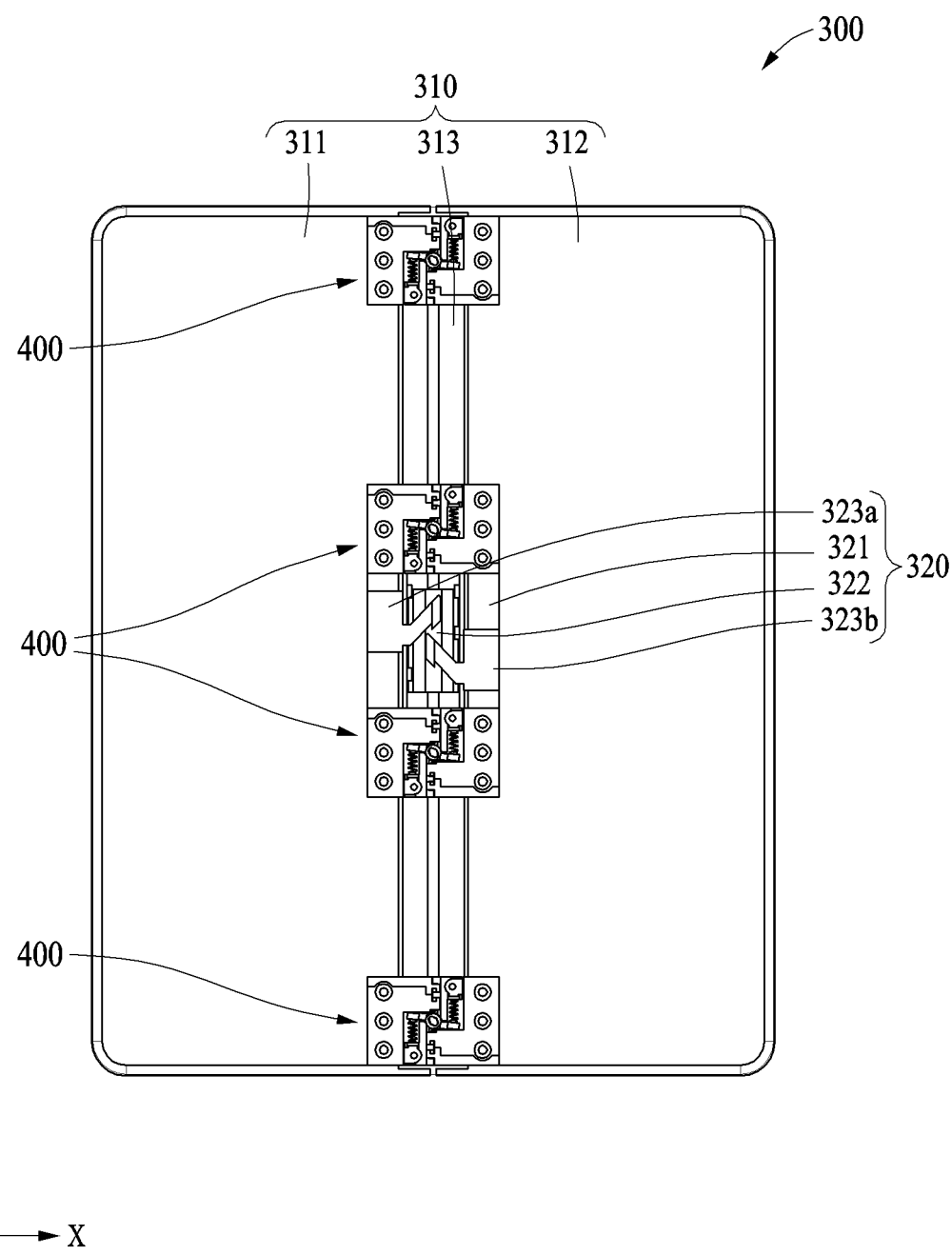
FIG. 3 is a front view illustrating a state in which a hinge assembly is applied to an electronic device according to one embodiment.

FIG. 3 is a front view illustrating a state in which a hinge assembly is applied to an electronic device according to one embodiment.

Referring to FIG. 3, an electronic device 300 (e.g., the electronic device 101 of FIG. 1 or the electronic device 200 of FIGS. 2A through 2C) according to one embodiment may be a foldable electronic device. For example, the electronic device 300 may be folded or unfolded about a folding axis A. However, this is merely an example, and a size, shape, structure, and folding axis of the electronic device 300 are not limited thereto. For example, the electronic device 300 of FIG. 3 may include the folding axis A in a Y-axis direction, which is a long side direction, however, an electronic device according to one embodiment may also include a folding axis in an X-axis direction, which is a short side direction.

The electronic device 300 according to one embodiment may include a housing 310 (e.g., the foldable housing 201 of FIGS. 2A through 2C), a display (not shown) (e.g., the display module 160 of FIG. 1, or the display 250 of FIGS. 2A through 2C), a hinge assembly 400, and a synchronization, or sync, assembly 320.

In one embodiment, the housing 310 may form at least a portion of an exterior of the electronic device 300. The housing 310 may include a first housing 311 (e.g., the first housing structure 210 of FIGS. 2A through 2C), a second housing 312 (e.g., the second housing structure 220 of FIGS. 2A through 2C), and a hinge housing 313.

In one embodiment, the first housing 311 and the second housing 312 may be foldably connected to each other by the hinge assembly 400. An angle or distance between the first housing 311 and the second housing 312 may vary depending on whether the electronic device 300 is in a flat state or unfolded state, a folded state, or an intermediate state. The hinge housing 313 may be disposed between the first housing 311 and the second housing 312 to provide a space for mounting internal components (e.g., the hinge assembly 400 and/or the sync assembly 320). For example, the hinge housing 313 may be configured to cover the hinge assembly 400 and/or the sync assembly 320 so that the hinge assembly 400 and/or the sync assembly 320 may not be exposed to the outside.

In one embodiment, the first housing 311 and the second housing 312 may provide a space in which the display 250 is disposed. The display 250 may be, for example, a foldable flexible display. For example, the display 250 may include a first area (e.g., the first area 251 of FIG. 2C), a second area (e.g., the second area 252 of FIG. 2C), and a folding area (e.g., the folding area 253 of FIG. 2C) between the first area and the second area. The first housing 311 may be disposed at a position corresponding to the first area 251 of the display 250 to support the first area 251 of the display 250. The second housing 312 may be disposed at a position corresponding to the second area 252 of the display 250 to support the second area 252 of the display 250.

In one embodiment, the hinge assembly 400 may be disposed between the first housing 311 and the second housing 312 to connect the first housing 311 and the second housing 312. For example, the hinge structure 230 of FIG. 2B may include a plurality of hinge assemblies 400. The plurality of hinge assemblies 400 may be spaced apart along the folding axis A. For example, as shown in FIG. 3, four hinge assemblies 400 may be spaced apart along the folding axis A. However, this is merely an example, and a number of hinge assemblies 400 is not limited thereto. The hinge assembly 400 may implement folding or unfolding operations of the electronic device 300. The hinge assembly 400 may operate between a folded state in which the first area 251 and the second area 252 face each other and an unfolded state in which the first area 251 and the second area 252 do not face each other. The hinge assembly 400 may generate a force to maintain a predetermined folded state of the electronic device 300. For example, when the electronic device 300 is in the folded state, the hinge assembly 400 may generate a force to maintain the folded state of the electronic device 300. When the electronic device 300 is in the unfolded state, the hinge assembly 400 may generate a force to maintain the unfolded state of the electronic device 300. When the electronic device 300 is in the intermediate state, the hinge assembly 400 may generate a force to maintain the intermediate state of the electronic device 300. The hinge assembly 400 will be further described below.

In one embodiment, the sync assembly 320 may be disposed between the first housing 311 and the second housing 312 and may synchronize folding angles between the first housing 311 and the second housing 312. For example, the sync assembly 320 may include a bracket 321, a slider 322, and a pair of rotators 323a and 323b. The bracket 321 may be disposed between the first housing 311 and the second housing 312. For example, the bracket 321 may be fixedly connected to the hinge housing 313. The slider 322 may be connected to the bracket 321 to be movable in the direction of the folding axis A with respect to the bracket 321. One side of each of the pair of rotators 323a and 323b may be connected to the first housing 311 or the second housing 312, and the other side may be connected to the slider 322. When the first housing 311 or the second housing 312 is folded about the folding axis A, the folding angles between the first housing 311 and the second housing 312 may be synchronized by a helical rotation of the pair of rotators 323a and 323b and a movement of the slider 322 in the direction of the folding axis A. However, this is merely an example, and the structure of the sync assembly 320 is not limited thereto. For example, the sync assembly 320 may also synchronize the folding angles between the first housing 311 and the second housing 312 through a gear structure.

Figure 4A:
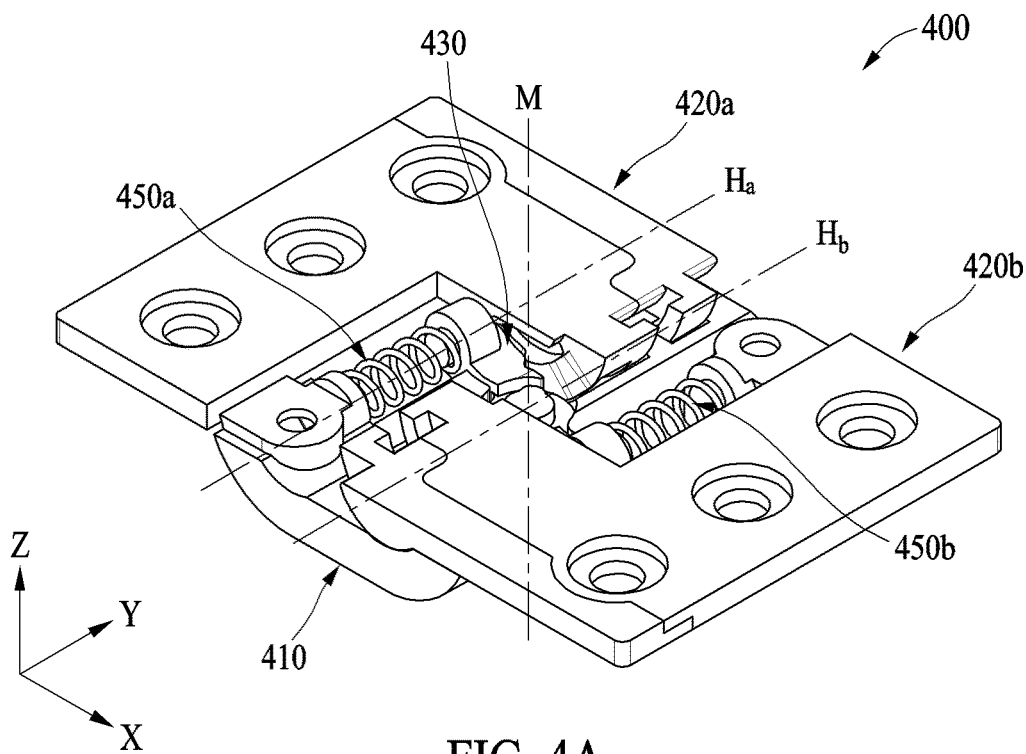
FIG. 4A is a perspective view illustrating an unfolded state of a hinge assembly according to one embodiment.
Figure 4B:
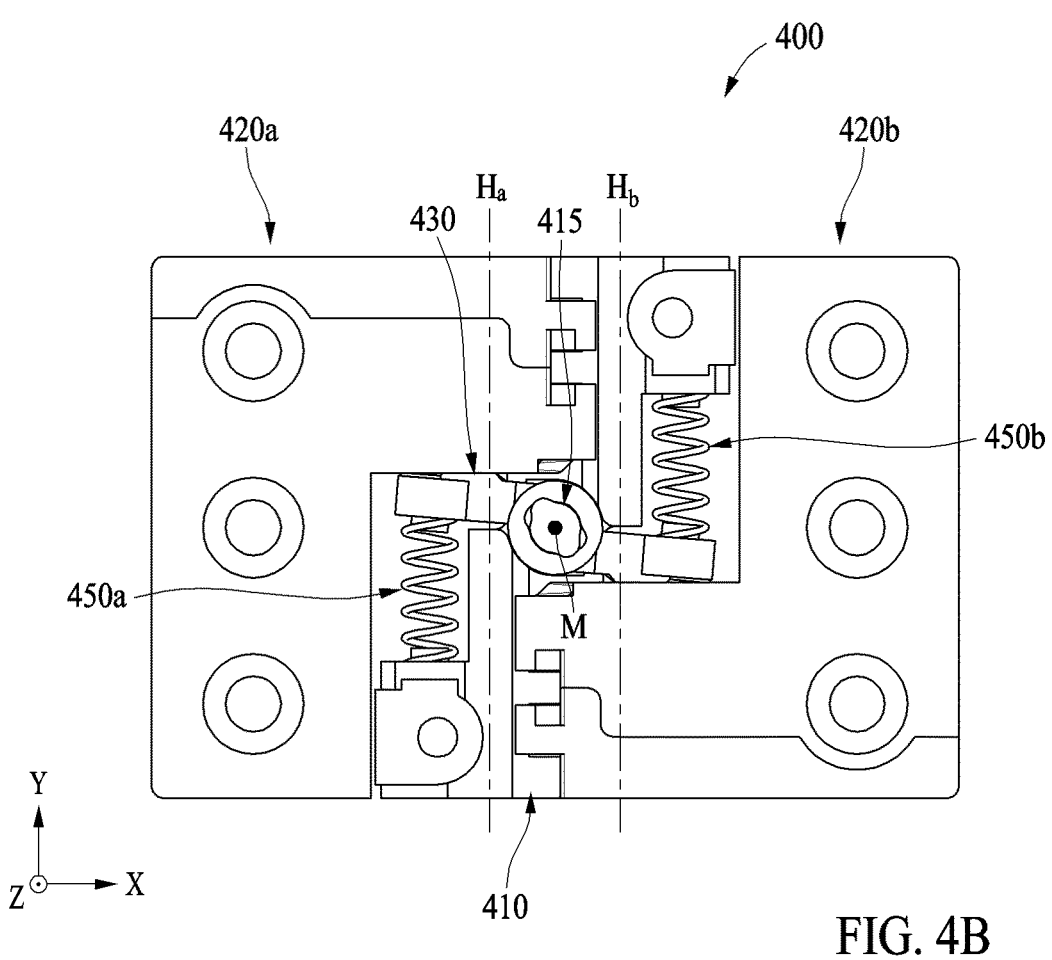
FIG. 4B is a front view illustrating an unfolded state of a hinge assembly according to one embodiment.
Figure 4C:
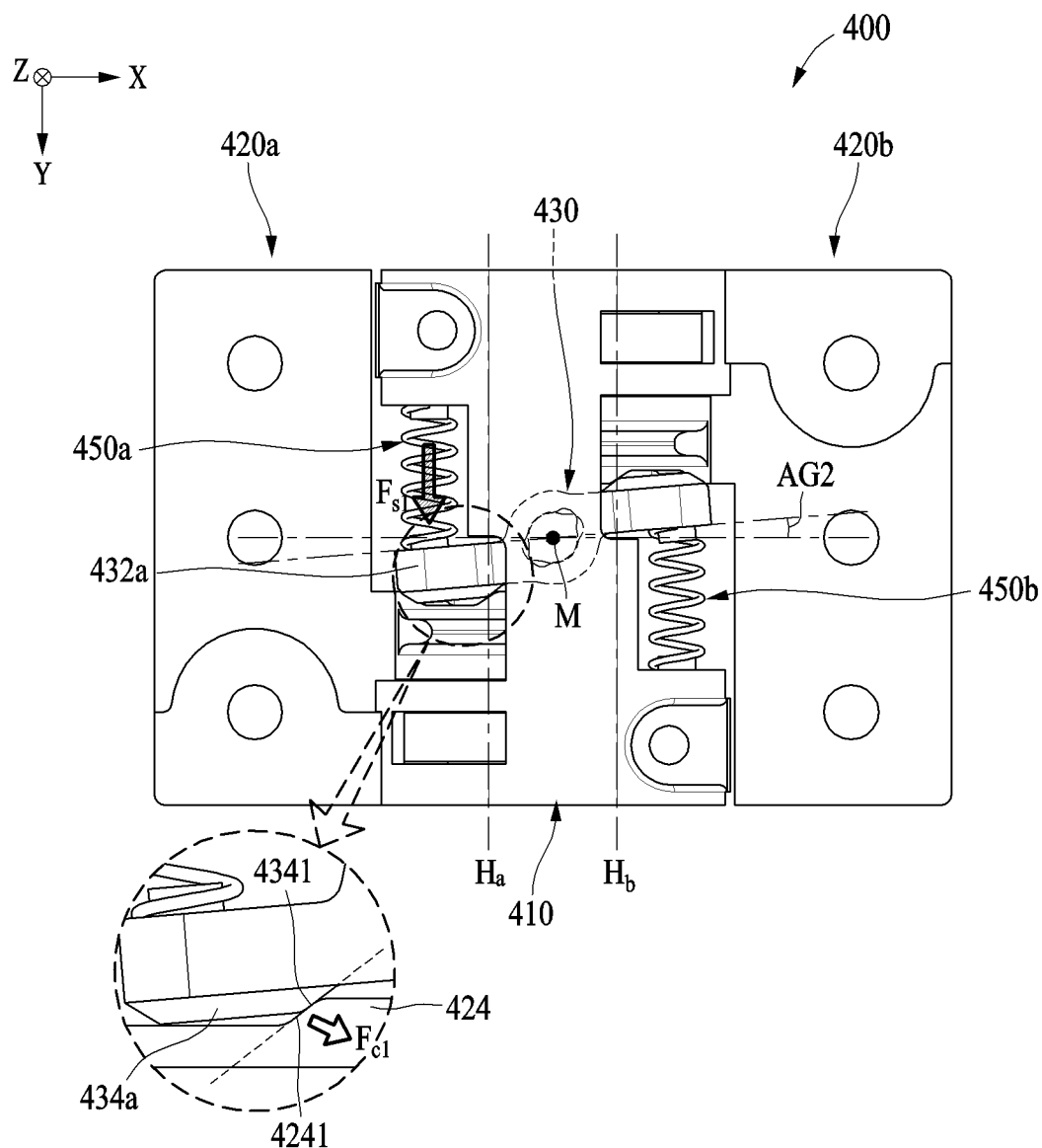
FIG. 4C is a rear view illustrating an unfolded state of a hinge assembly according to one embodiment.
Figure 4D:
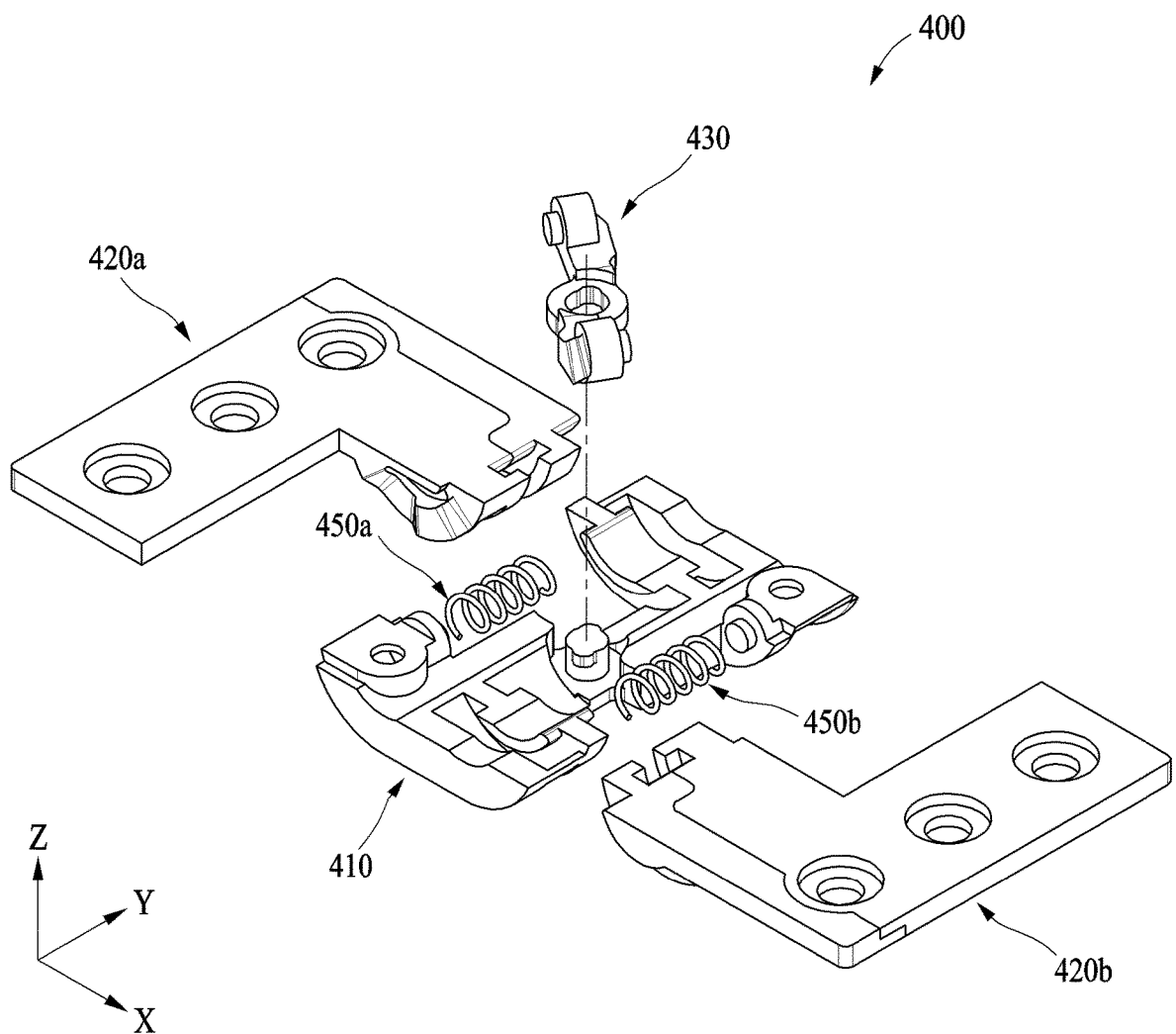
FIG. 4D is an exploded perspective view illustrating a hinge assembly according to one embodiment.
Figure 4E:
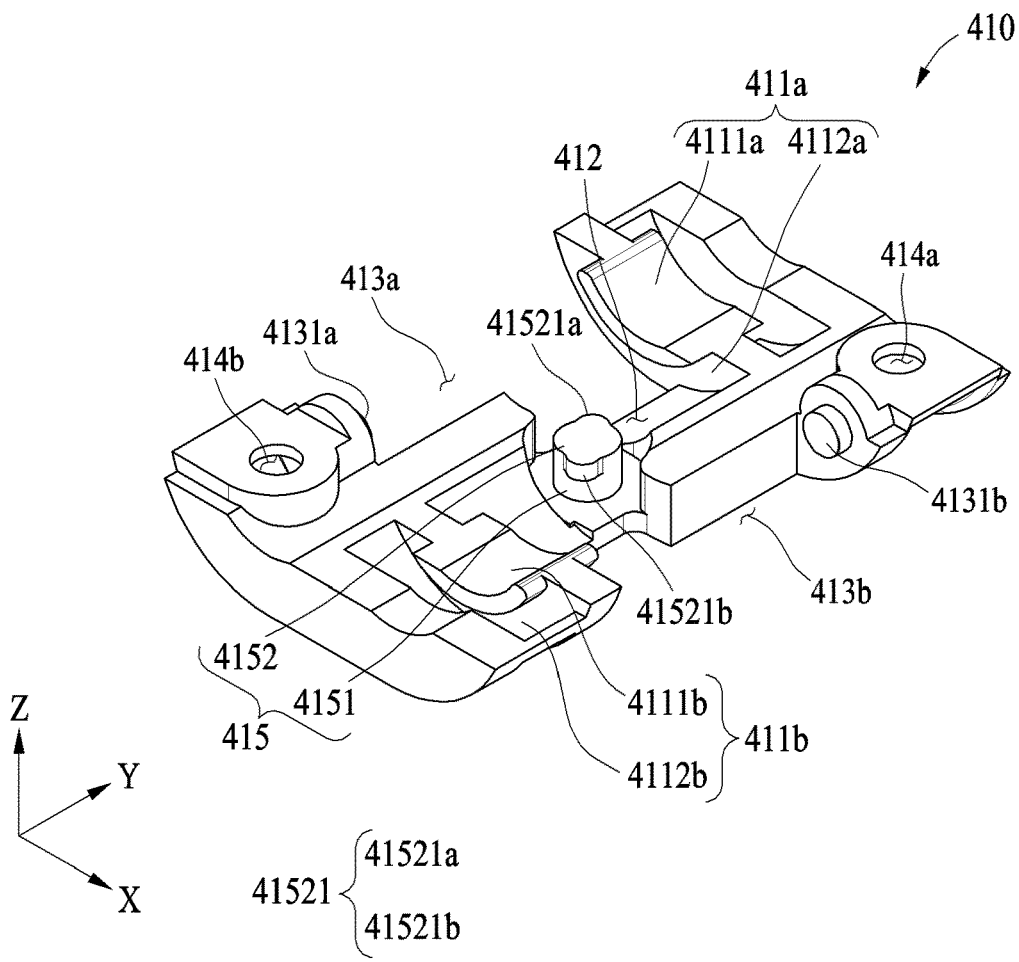
FIG. 4E is a perspective view illustrating a hinge bracket according to one embodiment.
Figure 4F:
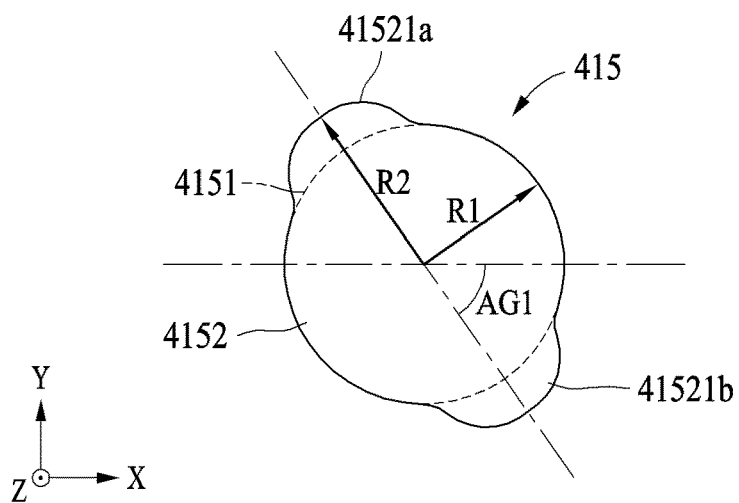
FIG. 4F is a front view illustrating an intermediate protrusion according to one embodiment.
Figure 4G:
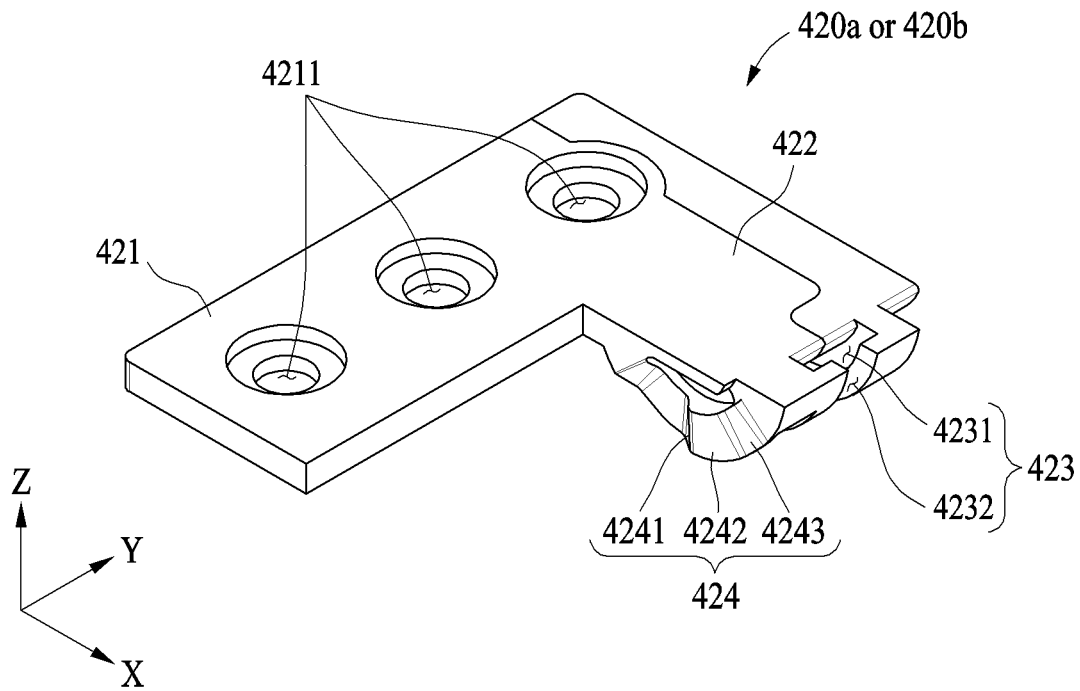
FIG. 4G is a perspective view illustrating a hinge structure according to one embodiment.
Figure 4H:
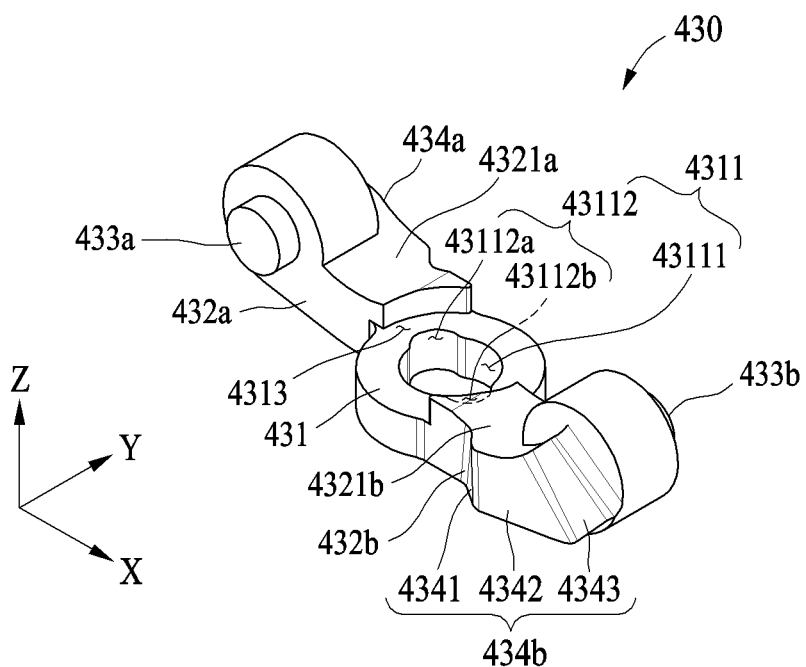
FIG. 4H is a perspective view illustrating an intermediate member according to one embodiment.

FIG. 4A is a perspective view illustrating an unfolded state of a hinge assembly according to one embodiment. FIG. 4B is a front view illustrating the unfolded state of the hinge assembly according to one embodiment. FIG. 4C is a rear view illustrating the unfolded state of the hinge assembly according to one embodiment. FIG. 4D is an exploded perspective view illustrating the hinge assembly according to one embodiment. FIG. 4E is a perspective view illustrating a hinge bracket according to one embodiment. FIG. 4F is a front view illustrating an intermediate protrusion according to one embodiment. FIG. 4G is a perspective view illustrating a hinge structure according to one embodiment. FIG. 4H is a perspective view illustrating an intermediate member according to one embodiment.

Referring to FIGS. 4A through 4H, a hinge assembly 400 according to one embodiment may include a hinge bracket 410, a pair of hinge structures 420a and 420b, an intermediate member 430, and a pair of elastic members 450a and 450b.

The hinge bracket 410 according to one embodiment may be fixedly connected to a housing (e.g., the housing 310 of FIG. 3). For example, the hinge bracket 410 may be fixedly connected to a hinge housing (e.g., the hinge housing 313 of FIG. 3). At least a portion of a lower surface (e.g., a surface facing the −z-axis direction) of the hinge bracket 410 may have a curved surface. For example, the lower surface of the hinge bracket 410 may be formed to correspond to the shape of the inside of the hinge housing 313. At least a portion of an upper surface (e.g., a surface facing the +z-axis direction) of the hinge bracket 410 may have a flat surface.

In one embodiment, the hinge bracket 410 may include a pair of first rail structures 411a and 411b, an intermediate member arrangement space 412, a pair of open spaces 413a and 413b, a pair of bracket fixing holes 414a and 414b, and an intermediate protrusion 415.

In one embodiment, the hinge bracket 410 may include the pair of first rail structures 411a and 411b such that the pair of hinge structures 420a and 420b may be rotatably coupled. At least a portion of a cross section of the pair of first rail structures 411a and 411b may have an arc shape in a direction from the upper surface (e.g., the surface facing the +z-axis direction) to the lower surface (e.g., the surface facing the −z-axis direction). The pair of first rail structures 411a and 411b may be formed to protrude in an arc shape with a predetermined angle. For example, portions at both sides (e.g., a +y side and a −y side) of the first rail structure 411a or 411b may be relatively recessed such that a cross section of the first rail structure 411a or 411b facing an x-z plane may protrude in an arc shape. The hinge structure 420a or 420b may be connected to the hinge bracket 410 in a direction (e.g., the +x-axis direction or the −x-axis direction) perpendicular to a folding axis (e.g., the folding axis A of FIG. 3). For example, a second rail structure 423 formed in the hinge structure 420a or 420b may be inserted into the first rail structure 411a or 411b in the +x-axis direction or the −x-axis direction, so that the hinge structure 420a or 420b may be connected to the hinge bracket 410. The second rail structure 423 of each of the hinge structures 420a and 420b may be inserted into the pair of first rail structures 411a and 411b to interoperate with the pair of first rail structures 411a and 411b. The pair of first rail structures 411a and 411b may be formed to diagonally face each other. For example, the pair of first rail structures 411a and 411b may be formed to be point-symmetric with respect to the center of the hinge bracket 410, when the hinge bracket 410 is viewed from the front side. For example, one first rail structure 411a may be formed at a position relatively biased in the −x-axis direction and/or the +y-axis direction in comparison to the other first rail structure 411b, and the other first rail structure 411b may be formed at a position relatively biased in the +x-axis direction and/or the −y-axis direction in comparison to the first rail structure 411a. The arc shapes of the pair of first rail structures 411a and 411b may define a pair of hinge axes Ha and Hb. For example, centers of the arc shapes of the pair of first rail structures 411a and 411b may be defined as the pair of hinge axes Ha and Hb. The pair of hinge axes Ha and Hb may be parallel to the folding axis A. The pair of hinge axes Ha and Hb may be spaced apart from each other by a designated interval.

In one embodiment, the intermediate member arrangement space 412 may be formed near the center of the hinge bracket 410. In one embodiment, the intermediate member arrangement space 412 may be formed at the center of the hinge bracket 410, when the hinge bracket 410 is viewed from the front side. For example, the intermediate member arrangement space 412 may be recessed with a shape corresponding to an outer shape of a central portion 431 of the intermediate member 430. The intermediate member 430 that will be described below may be rotatably disposed in the intermediate member arrangement space 412.

In one embodiment, the pair of open spaces 413a and 413b may be formed on both sides (e.g., a −x side and a +x side based on FIG. 4E) of the hinge bracket 410. For example, when a direction parallel to the hinge axis Ha or Hb corresponds to a y-axis when the hinge bracket 410 is viewed from the front side, the pair of open spaces 413a and 413b may be formed on both sides (e.g., the −x side and +x side based on FIG. 4E) of the hinge bracket 410. The open space 413a, 413b may be a space for an arrangement of at least the elastic member 450a or 450b and/or the extension 432a or 432b of the intermediate member 430. For example, at least a portion of the open space 413a, 413b may be formed to have a longitudinal direction in the y-axis direction. The pair of open spaces 413a and 413b may be formed to diagonally face each other. For example, the pair of open spaces 413a and 413b may be formed to be point-symmetric with respect to the center of the hinge bracket 410 when the hinge bracket 410 is viewed from the front side. The pair of open spaces 413a and 413b may substantially communicate with the intermediate member arrangement space 412. For example, one open space 413a may substantially communicate with the intermediate member arrangement space 412 in the −x-axis direction and/or the +y-axis direction, and the other open space 413b may substantially communicate with the intermediate member arrangement space 412 in the +x-axis direction and/or the −y-axis direction.

In one embodiment, a first connection projection 4131a or 4131b may protrude in a direction parallel to the hinge axis Ha or Hb in the open space 413a or 413b. For example, one first connection projection 4131a may protrude in the +y-axis direction in one open space 413a, and the other first connection projection 4131b may protrude in the −y-axis direction in the other open space 413b. The first connection projection 4131a or 4131b may be inserted into and connected to one end portion (e.g., an end portion facing the −y-axis direction, or an end portion facing the +y-axis direction) of the elastic member 450a or 450b.

In one embodiment, the hinge bracket 410 may include the pair of bracket fixing holes 414a and 414b to fix the hinge bracket 410 to the hinge housing 313. For example, a fastening member (e.g., a screw, a bolt, a pin, and/or a combination fastening structure) may be inserted into each of the pair of bracket fixing holes 414a and 414b. The pair of bracket fixing holes 414a and 414b may be formed to diagonally face each other. For example, the pair of bracket fixing holes 414a and 414b may be formed to be point-symmetric with respect to the center of the hinge bracket 410 when the hinge bracket 410 is viewed from the front side. For example, one bracket fixing hole 414a may be formed at a position relatively biased in the +x-axis direction and/or +y-axis direction, in comparison to the other bracket fixing hole 414b, and the other bracket fixing hole 414b may be formed at a position relatively biased in the −x-axis direction and/or the −y-axis direction, in comparison to the one bracket fixing hole 414a. For example, the pair of bracket fixing holes 414a and 414b may be disposed in a diagonal direction that crosses a direction in which the pair of first rail structures 411a and 411b are disposed.

In one embodiment, the intermediate protrusion 415 may protrude from the intermediate member arrangement space 412 in a direction perpendicular to the hinge axis Ha or Hb. A direction in which the intermediate protrusion 415 protrudes may be defined as a middle axis M. The middle axis M may be positioned between the pair of hinge axes Ha and Hb and may be perpendicular to the pair of hinge axes Ha and Hb. For example, the middle axis M may be oriented in the z-axis direction. The intermediate member 430 that will be described below may be rotatably connected to the intermediate protrusion 415.

In one embodiment, the intermediate protrusion 415 may include a protrusion base 4151 and a head 4152.

In one embodiment, the protrusion base 4151 may be formed to protrude from the intermediate member arrangement space 412 of the hinge bracket 410 in a direction of the middle axis M. For example, the protrusion base 4151 may protrude in the +z-axis direction. The protrusion base 4151 may substantially have a cylindrical shape. For example, the protrusion base 4151 may be formed with a first radius R1 about the middle axis M. However, this is merely an example, and a shape of the protrusion base 4151 is not limited thereto. For example, at least a portion of an outer surface of the protrusion base 4151 may not have a cylindrical shape. For example, a cut face or a cut groove may be formed on at least a portion (e.g., a lower portion (e.g., a −z side portion) of a projection 41521 that will be described below) of the outer surface of the protrusion base 4151 for reasons of the manufacturing process.

In one embodiment, the head 4152 may be formed on the protrusion base 4151. For example, the head 4152 may be formed on an upper end portion of the protrusion base 4151. At least a portion of the head 4152 may be formed to have a radius greater than that of the protrusion base 4151. For example, the head 4152 may include the projection 41521 having a second radius R2 greater than the first radius R1. For example, at least a point of the projection 41521 may have the second radius R2 from the middle axis M. In one embodiment, for ease of assembling between the intermediate protrusion 415 and the intermediate member 430, a chamfer may also be formed at an upper edge side (e.g., a side facing the +z direction) of the head 4152.

In one embodiment, a single projection 41521, or a plurality of projections 41521 may be formed. For example, a pair of projections 41521 may be formed. A pair of projections 41521a and 41521b may protrude in directions opposite to each other. For example, the pair of projections 41521a and 41521b may protrude in a direction in which the intermediate member arrangement space 412 substantially communicates with the pair of open spaces 413a and 413b. For example, one projection 41521a may substantially protrude in the −x-axis direction and the +y-axis direction, and the other projection 41521b may substantially protrude in the +x-axis direction and the −y-axis direction. The pair of projections 41521a and 41521b may protrude in a direction inclined by a designated angle AG1 with respect to the x-axis. The angle AG1 at which the direction in which the pair of projections 41521a and 41521b protrudes is inclined with respect to the x-axis may be greater than an angle (e.g., an angle AG2 of FIGS. 4C and/or 4R) at which the intermediate member 430 is rotated about the middle axis M when the hinge assembly 400 is operating. For example, the direction in which the pair of projections 41521a and 41521b protrudes may be a direction substantially inclined at 45 degrees with respect to the x-axis. However, this is merely an example, and a number of projections 41521 and a direction of the projection 41521 are not limited thereto.

In one embodiment, the pair of hinge structures 420a and 420b may be rotatably connected to the hinge bracket 410. For example, the pair of hinge structures 420a and 420b may be rotatably connected to the pair of first rail structures 411a and 411b, respectively. The pair of hinge structures 420a and 420b may be arranged to diagonally face each other. For example, the pair of hinge structures 420a and 420b may be arranged to be point-symmetric with respect to the center of the hinge assembly 400, when the hinge assembly 400 is viewed from the front side.

In one embodiment, the hinge structure 420a or 420b may include a first body 421, a second body 422, the second rail structure 423, and a first cam structure 424.

In one embodiment, the first body 421 may be formed in a plate shape. The first body 421 may be fixedly connected to a first housing (e.g., the first housing 311 of FIG. 3) or a second housing (e.g., the second housing 312 of FIG. 3). The first body 421 may be parallel to a front surface (e.g., a surface facing the +z direction based on the state of FIG. 3) of the first housing 311 or the second housing 312. At least one housing fixing hole 4211 for fixing the hinge structure 420a or 420b to the first housing 311 or the second housing 312 may be formed in the first body 421. For example, the housing fixing hole 4211 may be formed to penetrate the first body 421 in the z-axis direction. For example, a fastening member (e.g., a screw, a bolt, a pin, and/or a combination fastening structure) may be inserted into the housing fixing hole 4211. Although three housing fixing holes 4211 are formed as shown in FIG. 4G, this is merely an example, and a number of housing fixing holes 4211 is not limited thereto.

In one embodiment, the second body 422 may be formed to extend from at least a portion of one end of the first body 421. For example, referring to FIG. 4G, the second body 422 may be formed to extend in the +x-axis direction from at least a portion of an end portion of the first body 421 facing the +x-axis direction. The second body 422 may be formed integrally with the first body 421. At least a portion of a cross section of the second body 422 may have an arc shape in the direction from the upper surface (e.g., the surface facing the +z-axis direction) to the lower surface (e.g., the surface facing the −z-axis direction). For example, at least a portion of a cross section of the second body 422 facing the x-z plane may have an arc shape.

In one embodiment, the second rail structure 423 may be formed on a lower side (e.g., a side facing the −z-axis direction) of the second body 422. The second rail structure 423 may be recessed in the second body 422. The second rail structure 423 may be recessed from a lower end portion (e.g., an end portion facing the −z-axis direction) of the second body 422 in an upward direction (e.g., the +z-axis direction) such that at least a portion of the lower end portion (e.g., the end portion facing the −z-axis direction) of the second body 422 may be opened. At least a portion of a cross section of the second rail structure 423 may have an arc shape in the direction from the upper surface (e.g., the surface facing the +z-axis direction) to the lower surface (e.g., the surface facing the −z-axis direction). For example, at least a portion of a cross section of the second rail structure 423 facing the x-z plane may have an arc shape. The arc shape of the second rail structure 423 may correspond to the arc shape of the first rail structure 411a or 411b. The hinge structure 420a or 420b may be connected to the hinge bracket 410 such that the first rail structure 411a or 411b may be inserted into the second rail structure 423. The second rail structure 423 may rotate about the hinge axis Ha or Hb within a designated angle range along the first rail structure 411a or 411b. Based on the above structure, in a state in which the first rail structure 411a or 411b is inserted into the second rail structure 423, the hinge structure 420a or 420b may rotate about the hinge axis Ha or Hb within a designated angle range with respect to the hinge bracket 410. For example, the hinge structure 420a or 420b may rotate in the x-z plane about the hinge axis Ha or Hb formed by the first rail structure 411a or 411b and the second rail structure 423. The first rail structure 411a or 411b and the second rail structure 423 may allow only a rotational motion of the hinge structure 420a or 420b on the x-z plane and may restrict a translational motion and/or a rotational motion of the hinge structure 420a or 420b in another direction. For example, an inner portion 4111a or 4111b of the first rail structure 411a or 411b in the radial direction may be formed to be stepped with a relatively large width (e.g., a width in the y-axis direction), in comparison to an outer portion 4112a or 4112b of the first rail structure 411a or 411b, and an inner portion 4231 of the second rail structure 423 in the radial direction may be formed to be stepped with a relatively large width (e.g., a width in the y-axis direction), in comparison to an outer portion 4232 of the second rail structure 423. The pair of first rail structures 411a and 411b protrude and the second rail structure 423 is recessed, as illustrated and described above, however, this is merely an example. For example, the pair of first rail structures 411a and 411b may be recessed, and the second rail structure 423 may protrude.

In one embodiment, the first cam structure 424 may be formed on one surface of the second body 422. For example, based on FIG. 4G, the first cam structure 424 may be formed on a surface of the second body 422 facing the −y-axis direction. The first cam structure 424 may be formed along an arc having the hinge axis Ha or Hb as a center. For example, the first cam structure 424 may be formed along an arc shape of the lower side (e.g., the side facing the −z direction) of the second body 422. The first cam structure 424 may include at least one crest and/or one trough structure. For example, the first cam structure 424 may protrude to include a first inclined surface 4241, a first flat surface 4242, and a second inclined surface 4243.

In one embodiment, the intermediate member 430 may be disposed between the pair of hinge structures 420a and 420b. The intermediate member 430 may be disposed in the intermediate member arrangement space 412 and connected to the hinge bracket 410 through the intermediate protrusion 415. The intermediate member 430 may be rotatable with respect to the hinge bracket 410 about the middle axis M perpendicular to the pair of hinge axes Ha and Hb. A pair of second cam structures 434a and 434b interoperating with the first cam structure 424 may be formed on both end portions (e.g., an end portion facing the −x-axis direction and an end portion facing the +x-axis direction) of the intermediate member 430.

In one embodiment, the intermediate member 430 may include the central portion 431, a pair of extensions 432a and 432b, a pair of second connection projections 433a and 433b, and the pair of second cam structures 434a and 434b.

In one embodiment, the central portion 431 may be a portion positioned at the center of the intermediate member 430. An outer circumferential surface of the central portion 431 may be formed in a substantially cylindrical shape. A through-hole 4311 may be formed in the center of the central portion 431. For example, the through-hole 4311 may penetrate the central portion 431 in the z-axis direction. The central portion 431 may be disposed in the intermediate member arrangement space 412 such that the intermediate protrusion 415 of the hinge bracket 410 may be inserted into the through-hole 4311. The central portion 431 may be disposed in the intermediate member arrangement space 412 to be rotatable with respect to the hinge bracket 410 about the middle axis M perpendicular to the pair of hinge axes Ha and Hb. The central portion 431 may be formed to have a height (e.g., a height in the z-axis direction) substantially corresponding to the protrusion base 4151 of the intermediate protrusion 415. Based on the above configuration, when the intermediate member 430 is inserted into the intermediate protrusion 415, the head 4152 of the intermediate protrusion 415 may pass through the through-hole 4311 to be exposed to an upper side (e.g., a side facing the +z direction) of the intermediate member 430.

In an embodiment, the intermediate protrusion 415 may be inserted into the through-hole 4311. The through-hole 4311 may have a shape substantially corresponding to a shape of the head 4152 of the intermediate protrusion 415. In one embodiment, for ease of assembling between the intermediate protrusion 415 and the intermediate member 430, a chamfer may also be formed at a lower edge side (e.g., a side facing the −z direction) of the through-hole 4311.

In one embodiment, the through-hole 4311 may include a main hole 43111 and a recessed portion 43112.

In one embodiment, the main hole 43111 may be a substantially cylindrical hole. For example, the main hole 43111 may be formed with a first radius R1. A radius of the main hole 43111 may substantially correspond to a radius of the intermediate protrusion 415. The recessed portion 43112 may be recessed radially from the main hole 43111 to have a radius greater than that of the main hole 43111. For example, the recessed portion 43112 may be formed such that at least a point of the recessed portion 43112 may have the second radius R2.

In one embodiment, a number of recessed portions 43112 and/or a shape of the recessed portion 43112 may correspond to a number of protrusions 41521 of the intermediate protrusion 415 and/or a shape of the projection 41521. A single or a plurality of recessed portions 43112 may be formed. For example, a pair of recessed portions 43112 may be formed. A pair of recessed portions 43112a and 43112b may be recessed in directions opposite to each other. For example, the pair of recessed portions 43112a and 43112b may be formed in a direction corresponding to a pair of projections 41521a and 41521b.

In one embodiment, the pair of extensions 432a and 432b may be portions extending to both sides (e.g., a side facing the −x direction and a side facing the +x direction) of the central portion 431. For example, one extension 432a may extend from the central portion 431 in the −x direction, and the other extension 432b may extend from the central portion 431 in the +x direction. The pair of extensions 432a and 432b may be formed to be point-symmetric with respect to the center, when the intermediate member 430 is viewed from the front side. For example, the one extension 432a may be formed at a position relatively biased in the −x-axis direction and/or the +y-axis direction, in comparison to the other extension 432b, and the other extension 432b may be formed at a position relatively biased in the +x-axis direction and/or the −y-axis direction, in comparison to the one extension 432a. In a state in which the central portion 431 is disposed in the intermediate member arrangement space 412, the pair of extensions 432a and 432b may be disposed in the pair of open spaces 413a and 413b, respectively.

In one embodiment, the pair of extensions 432a and 432b may be formed with a height (e.g., a height in the z-axis direction) greater than that of the central portion 431. For example, an upper surface 4312 (e.g., a surface facing the +z direction) of the central portion 431 as shown in FIG. 4L may be formed to be stepped below (e.g., in the −z direction) an upper surface 4321a, 4321b (e.g., a surface facing the +z direction) of the extension 432a, 432b. Based on the above configuration, when the intermediate member 430 is inserted into the intermediate protrusion 415, a space 4313 in which the head 4152 passing through the through-hole 4311 may be located may be formed.

In one embodiment, the second cam structure 434a or 434b may be formed on one surface (e.g., a surface facing the +y-axis or −y-axis direction) of the extension 432a or 432b, and the second connection projection 433a or 433b may be formed on another surface (e.g., a surface facing the −y-axis or +y-axis direction).

In one embodiment, the pair of second connection projections 433a and 433b may be formed to protrude from one surface of the pair of extensions 432a and 432b. The pair of second connection projections 433a and 433b may be formed to be point-symmetric with respect to the center, when the intermediate member 430 is viewed from the front side. For example, one second connection projection 433a may protrude from one surface (e.g., the surface facing the −y-axis direction) of one extension 432a, and the other second connection projection 433b may protrude from one surface (e.g., the surface facing the +y-axis direction) of the other extension 432b. The second connection projection 433a or 433b may be inserted into and connected to the other end portion (e.g., an end portion facing the +y-axis direction, or an end portion facing the −y-axis direction) of the elastic member 450a or 450b.

In one embodiment, the pair of second cam structures 434a and 434b may be formed to protrude from the other surface of the pair of extensions 432a and 432b. The pair of second connection projections 433a and 433b may be formed to be point-symmetric with respect to the center, when the intermediate member 430 is viewed from the front side. The second cam structure 434a or 434b may be formed on a surface opposite to the second connection projection 433a or 433b. For example, one second cam structure 434a may be formed on another surface (e.g., the surface facing the +y-axis direction) of the one extension 432a, and the other second cam structure 434b may be formed on another surface (e.g., the surface facing the −y-axis direction) of the other extension 432b. The second cam structure 434a or 434b may be formed along an arc having the hinge axis Ha or Hb as a center. The second cam structure 434a or 434b may include at least one crest and/or trough structure. For example, the second cam structure 434a or 434b may protrude to include a third inclined surface 4341, a second flat surface 4342, and a fourth inclined surface 4343.

In one embodiment, the elastic member 450a or 450b may generate an elastic force. For example, the elastic member 450a or 450b may generate an elastic force in the longitudinal direction. The elastic member 450a or 450b may be disposed in a direction parallel to the hinge axis Ha or Hb to generate an elastic force in the longitudinal direction. For example, the elastic member 450a or 450b may have a shape of a spring with an empty central space. The elastic member 450a or 450b may be disposed in the open space 413a or 413b such that one end portion (e.g., the end portion facing the −y-axis direction or +y-axis direction) may be connected to the first connection projection 4131a or 4131b, and that another end portion (e.g., the end portion facing the +y-axis direction or −y-axis direction) may be connected to the second connection projection 433a or 433b. For example, the one end portion (e.g., the end portion facing the −y-axis direction or +y-axis direction) of the elastic member 450a or 450b may be supported by the hinge bracket 410, and the other end portion (e.g., the end portion facing the +y-axis direction or −y-axis direction) may be supported by the intermediate member 430. The elastic member 450a or 450b may provide an elastic force to the extension 432a or 432b in a direction in which the second cam structure 434a or 434b is pressed toward the first cam structure 424a or 424b. For example, one elastic member 450a may press the one extension 432a in the +y-axis direction, and the other elastic member 450b may press the other extension 432b in the −y-axis direction. As a result, the elastic force of the elastic member 450a or 450b may generate torque for rotating the intermediate member 430 in the direction in which the second cam structure 434a or 434b is pressed toward the first cam structure 424a or 424b. Based on the above structure, the second cam structure 434a or 434b and the first cam structure 424a or 424b may be in close contact with each other. In one embodiment, the elastic member may also be formed of a torsion spring for generating an elastic force in a rotation direction. For example, the elastic member may be inserted into the intermediate protrusion 415 to generate an elastic force to rotate the intermediate member 430 in one direction (e.g., a clockwise direction).

Figure 4I:
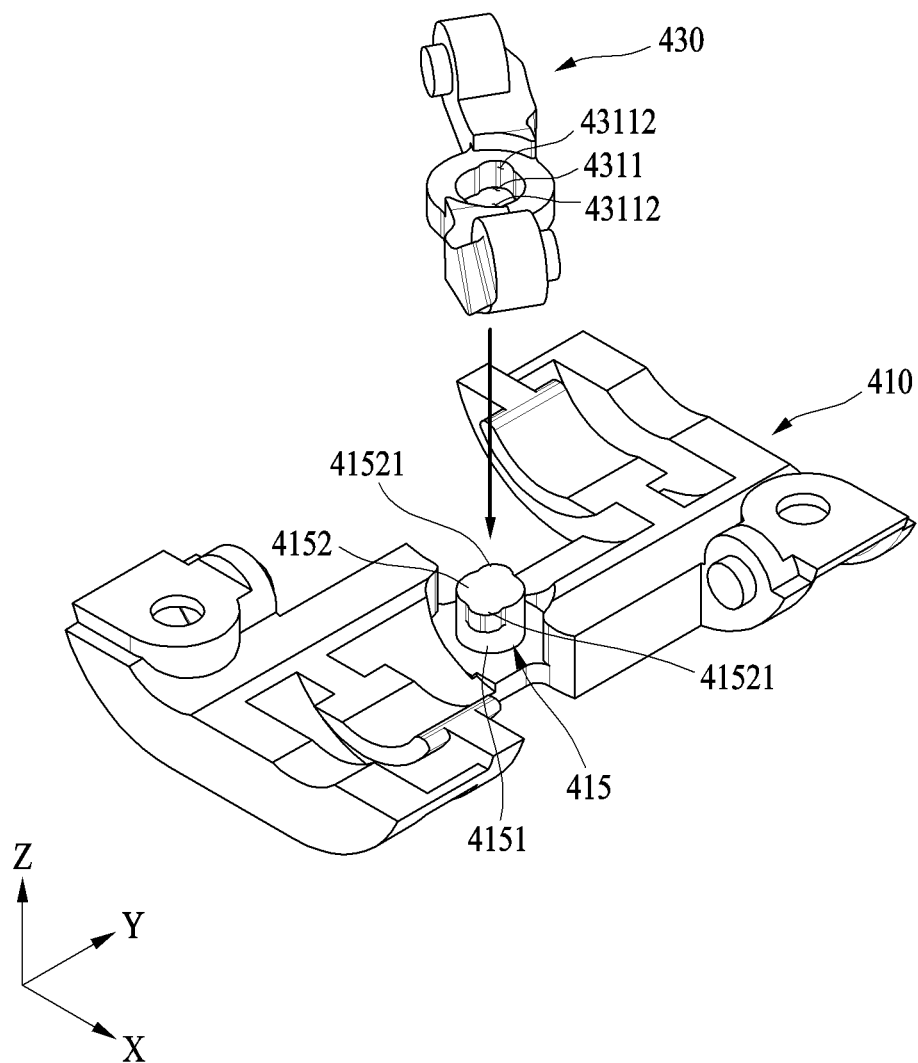
FIGS. 4I, 4J, and 4K illustrate a process in which an intermediate member is rotatably connected to a hinge bracket according to one embodiment.
Figure 4J:
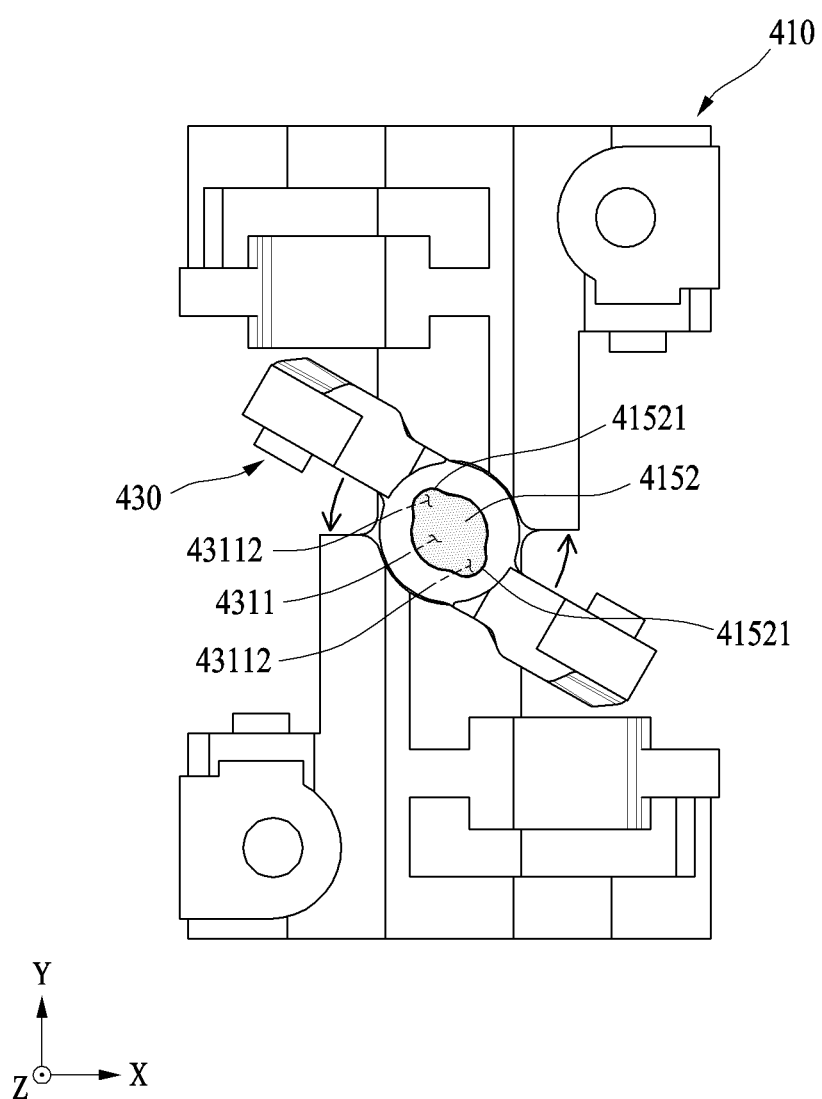
Figure 4K:
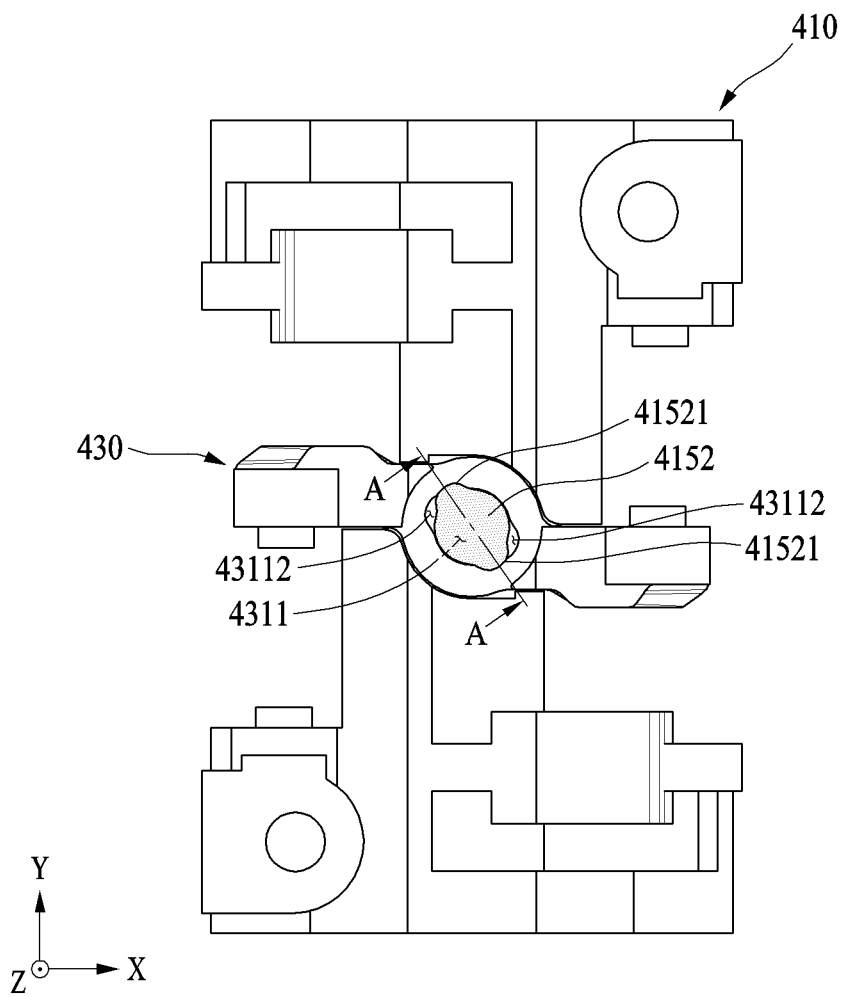
Figure 4L:
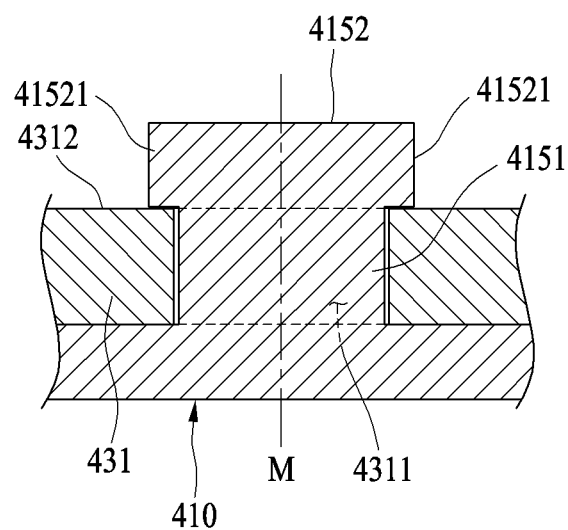
FIG. 4L is a cross-sectional view taken along line A-A of FIG. 4K.

FIGS. 4I through 4K illustrate a process in which an intermediate member is rotatably connected to a hinge bracket according to one embodiment. FIG. 4L is a cross-sectional view taken along line A-A of FIG. 4K.

Referring to FIGS. 4I through 4L, in one embodiment, the intermediate member 430 may be rotatably connected to the intermediate protrusion 415 of the hinge bracket 410. The intermediate member 430 may be inserted into the intermediate protrusion 415 in a state in which the through-hole 4311 and the head 4152 of the intermediate protrusion 415 are aligned such that the shape of the through-hole 4311 and the shape of the head 4152 correspond to each other, as shown in FIGS. 4I and 4J. The state in which the through-hole 4311 and the head 4152 are aligned such that the shape of the through-hole 4311 and the shape of the head 4152 of the intermediate protrusion 415 correspond to each other may indicate a state in which a position of the projection 41521 of the head 4152 and a position of the recessed portion 43112 of the through-hole 4311 are aligned with each other. In the state in which the position of the projection 41521 of the head 4152 and the position of the recessed portion 43112 of the through-hole 4311 are aligned with each other, the projection 41521 may pass through the recessed portion 43112, and accordingly the intermediate member 430 may be inserted into the intermediate protrusion 415. When the intermediate member 430 is inserted into the intermediate protrusion 415, the head 4152 of the intermediate protrusion 415 may pass through the through-hole 4311 and may be exposed to the upper side (e.g., a side facing the +z direction) of the intermediate member 430.

In one embodiment, referring to FIGS. 4K and 4L, in a state in which the intermediate member 430 is inserted into the intermediate protrusion 415, the intermediate member 430 may be rotated with respect to the intermediate protrusion 415 such that the head 4152 and the through-hole 4311 may be out of alignment with each other. A state in which the head 4152 and the through-hole 4311 are out of alignment with each other may indicate a state in which the position of the projection 41521 of the head 4152 and the position of the recessed portion 43112 of the through-hole 4311 are out of alignment with each other. For example, the intermediate member 430 may be rotated in a counterclockwise direction by a designated angle with respect to the intermediate protrusion 415. When the head 4152 and the through-hole 4311 are out of alignment with each other in the state in which the intermediate member 430 is inserted into the intermediate protrusion 415, it may be difficult for the projection 41521 of the head 4152 to pass through the through-hole 4311, to prevent the intermediate member 430 from being separated from the intermediate protrusion 415 in the direction (e.g., the +z-axis direction) of the middle axis M. For example, the head 4152 of the intermediate protrusion 415 may support the upper surface 4312 (e.g., the surface facing the +z direction) of the central portion 431 of the intermediate member 430 on the upper side, to prevent the intermediate member 430 from deviating in the +z-axis direction. In addition, an angle (e.g., the angle AG1 of FIG. 4F) at which the projection 41521 of the intermediate protrusion 415 is inclined with respect to the x-axis may be formed to be greater than an angle (e.g., the angle AG2 of FIGS. 4C and/or 4R) at which the intermediate member 430 is rotated about the middle axis M with respect to the x-axis during an operation of a hinge assembly (e.g., the hinge assembly 400 of FIG. 4A). Thus, it may be possible to prevent the intermediate member 430 from being separated from the intermediate protrusion 415 even during an operation of the hinge assembly 400.

Based on the above structure, it may be possible to prevent the intermediate member 430 from being separated while rotatably connecting the intermediate member 430 to the hinge bracket 410 without using a separate pin member. Therefore, since there is no need to use a separate pin member, a number of components may be reduced, thereby reducing a manufacturing cost and a weight. Also, if the number of components is reduced, an accumulated error between components may be reduced, and thus a quality of the hinge assembly (e.g., the hinge assembly 400 of FIG. 4A) may be enhanced. In addition, a process of welding a pin member to a bracket may not be required, in comparison to a case in which a separate pin member is used, and thus a deformation and/or thermal damage to components that may occur during welding may not occur. As a result, a reliability and/or durability of the hinge assembly 400 may be enhanced.

Figure 4M:
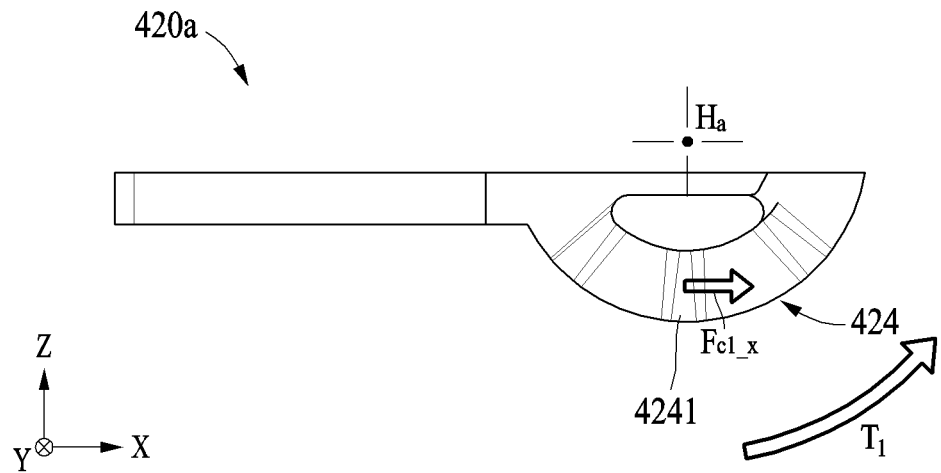
FIG. 4M illustrates a force and torque acting on one hinge structure of FIGS. 4A through 4C.

FIG. 4M illustrates a force and torque acting on one hinge structure of FIGS. 4A through 4C.

Hereinafter, the force and torque acting on one hinge structure 420a in the unfolded state of the hinge assembly 400 according to one embodiment will be described with reference to FIGS. 4A through 4C and 4M. However, this is for convenience of description, and it will be obvious that the other hinge structure 420b may also operate in a manner corresponding to that of the one hinge structure 420a. The unfolded state of the hinge assembly 400 may refer to a state in which the pair of hinge structures 420a and 420b are fully unfolded with respect to the hinge bracket 410.

In one embodiment, in the state in which the hinge assembly 400 is unfolded, the first cam structure 424 and the second cam structure 434a may be arranged to be alternately engaged with each other. For example, a crest portion of the second cam structure 434a may be inserted into a trough portion of the first cam structure 424. For example, the first inclined surface 4241 of the first cam structure 424 and the third inclined surface 4341 of the second cam structure 434a may contact each other. The elastic member 450a may provide an elastic force Fs1 to the extension 432a of the intermediate member 430 in a direction in which the second cam structure 434a is pressed toward the first cam structure 424. For example, the elastic force Fs1 may be provided in the +y-axis direction by the elastic member 450a. If the elastic member 450a applies the elastic force Fs1 in the +y-axis direction in a state in which the crest portion of the second cam structure 434a is inserted into the trough portion of the first cam structure 424, the intermediate member 430 may be in a state of being rotated by a predetermined angle (e.g., the angle AG2) about the middle axis M in a direction in which the extension 432a approaches the hinge structure 420a. For example, when the hinge assembly 400 is viewed from the front side, the intermediate member 430 may be in a state of being rotated in the clockwise direction by a predetermined angle (e.g., the angle AG2) about the middle axis M.

In one embodiment, the elastic force Fs1 of the elastic member 450a may be applied to press the second cam structure 434a to the first cam structure 424 in the +y-axis direction. The first cam structure 424 and the second cam structure 434a may apply a reaction force to each other in a direction perpendicular to inclined surfaces (e.g., the first inclined surface 4241 and the third inclined surface 4341) that are in contact with each other. For example, a reaction force Fc1 may be applied to the first cam structure 424 by the second cam structure 434a in a direction perpendicular to the first inclined surface 4241 and the third inclined surface 4341. For example, the reaction force Fc1 may be applied to the first cam structure 424 by the second cam structure 434a in a direction between the +x-axis direction and the +y-axis direction. FIG. 4M illustrates an x-axis direction component Fc1_x of the reaction force Fc1 applied to the first inclined surface 4241 of the first cam structure 424. Referring to FIG. 4M, the x-axis direction component Fc1_x of the reaction force Fc1 may generate counterclockwise torque T1 about the hinge axis Ha. The counterclockwise torque T1 may be torque in a direction to allow the hinge structure 420a to be further unfolded with respect to the hinge bracket 410. Based on the above structure, in the state in which the hinge structure 420a is unfolded, the elastic force Fs1 of the elastic member 450a may act as torque to further unfold the hinge structure 420a. For example, in the state in which the hinge structure 420a is unfolded, the elastic force Fs1 of the elastic member 450a may act as a kind of open detent force to allow the hinge structure 420a to remain unfolded. Therefore, the hinge structure 420a may start to be folded with respect to the hinge bracket 410 only when a force greater than the open detent force is applied. If the force greater than the open detent force is not applied, the unfolded state of the hinge structure 420a with respect to the bracket 410 may be maintained.

Figure 4N:
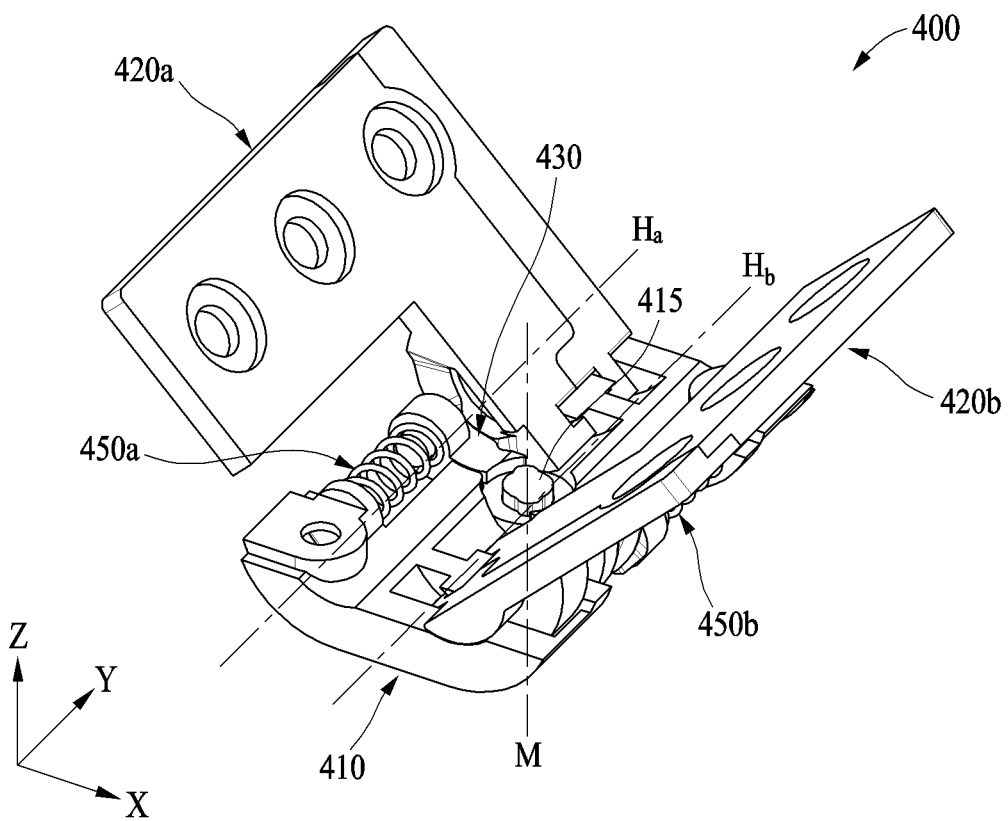
FIG. 4N is a perspective view illustrating an intermediate state of a hinge assembly according to one embodiment.
Figure 4O:
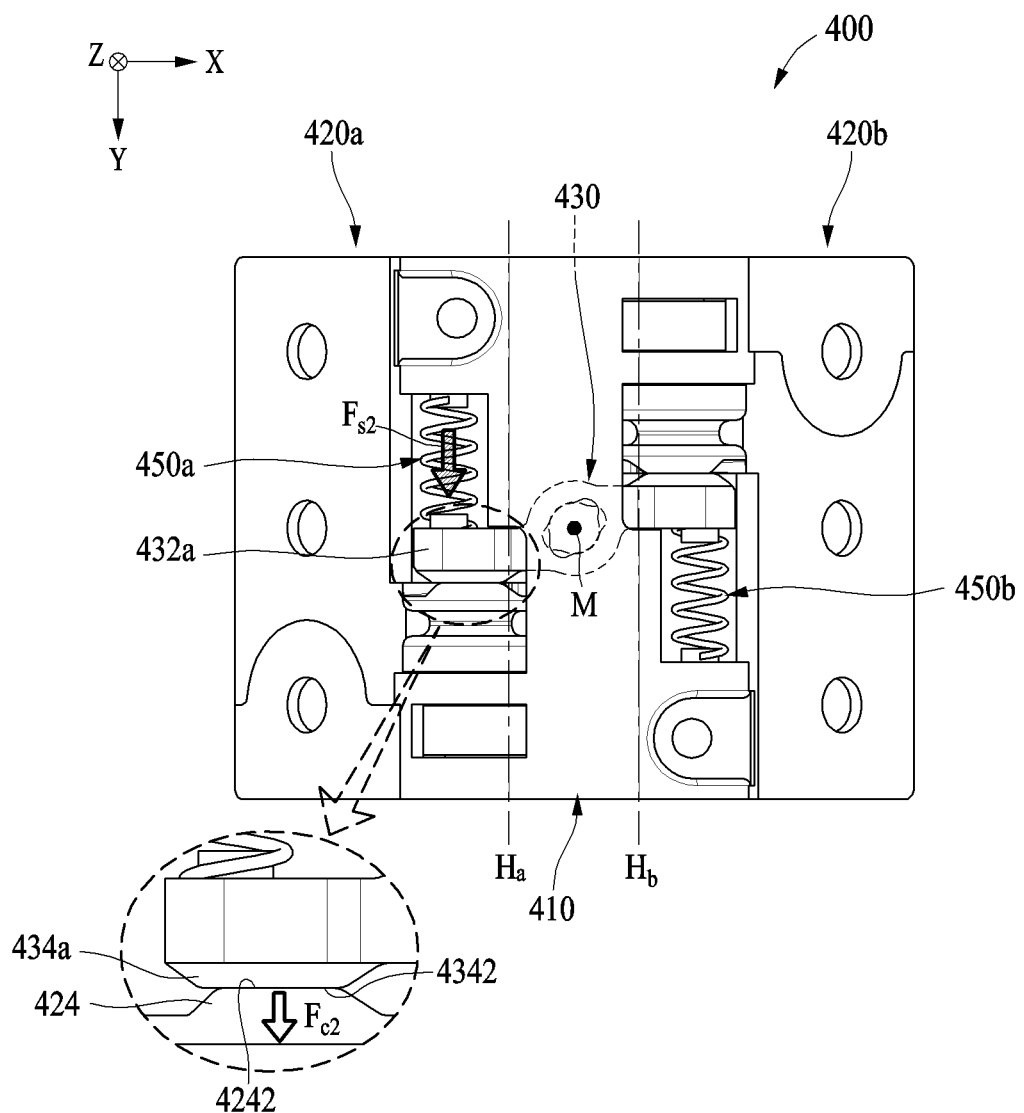
FIG. 4O is a rear view illustrating an intermediate state of a hinge assembly according to one embodiment.
Figure 4P:
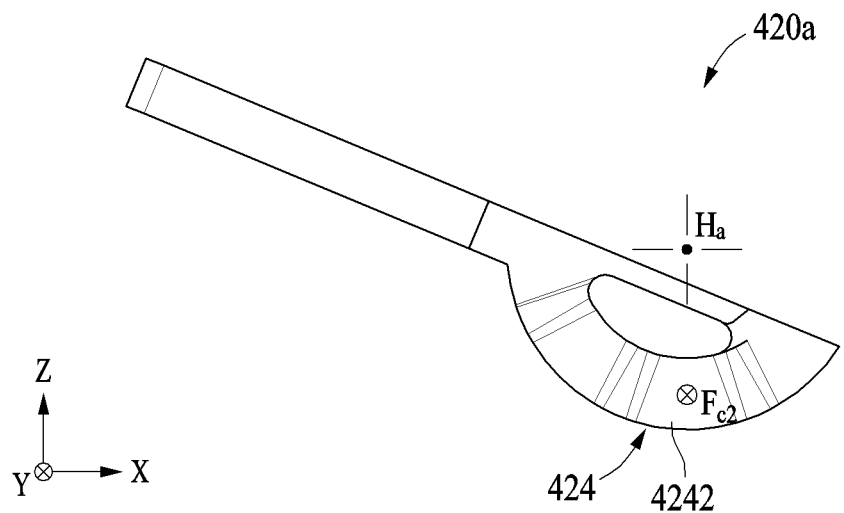
FIG. 4P illustrates a force acting on one hinge structure of FIGS. 4N and 4O.

FIG. 4N is a perspective view illustrating an intermediate state of the hinge assembly according to one embodiment. FIG. 4O is a rear view illustrating the intermediate state of the hinge assembly according to one embodiment. FIG. 4P illustrates a force acting on one hinge structure of FIGS. 4N and 4O.

Hereinafter, a force acting on one hinge structure 420a in an intermediate state of the hinge assembly 400 according to one embodiment will be described with reference to FIGS. 4N through 4P. However, this is merely for convenience of description, and it will be obvious that the other hinge structure 420b may also operate in a manner corresponding to that of the one hinge structure 420a. The intermediate state of the hinge assembly 400, which is a state between the unfolded state and the folded state, may refer to a state in which the pair of hinge structures 420a and 420b are rotated by a designated angle range about the hinge axes Ha and Hb with respect to the hinge bracket 410

In one embodiment, in the intermediate state of the hinge assembly 400, the first cam structure 424 and the second cam structure 434a may be disposed such that a flat surface of the first cam structure 424 and a flat surface of the second cam structure 434a may contact each other. For example, the crest portion of the second cam structure 434a and a crest portion of the first cam structure 424 may contact each other. For example, the first flat surface 4242 of the first cam structure 424 and the second flat surface 4342 of the second cam structure 434a may contact each other. The elastic member 450a may provide an elastic force Fs2 to the extension 432a of the intermediate member 430 in the direction in which the second cam structure 434a is pressed toward the first cam structure 424. For example, the elastic force Fs2 may be provided in the +y-axis direction by the elastic member 450a. In a process in which one hinge structure 420a unfolded with respect to the hinge bracket 410 is rotated to be in the intermediate state, the first cam structure 424 and the second cam structure 434a that are alternately arranged may face each other such that the flat surface of the first cam structure 424 and the flat surface of the second cam structure 434a may contact each other. Accordingly, the intermediate member 430 may be rotated by a predetermined angle about the middle axis M in a direction in which the extension 432a moves away from the hinge structure 420a. For example, the extension 432a or 432b of the intermediate member 430 may be disposed parallel to the x-axis direction, when the hinge assembly 400 is viewed from the front side.

In one embodiment, the elastic force Fs2 of the elastic member 450a may be applied to press the second cam structure 434a to the first cam structure 424 in the +y-axis direction. The first cam structure 424 and the second cam structure 434a may apply a reaction force to each other in a direction perpendicular to flat surfaces (e.g., the first flat surface 4242 and the second flat surface 4342) that are in contact with each other. For example, a reaction force Fc2 may be applied to the first cam structure 424 by the second cam structure 434a in a direction perpendicular to the first flat surface 4242 and the second flat surface 4342. For example, the reaction force Fc2 may be applied to the first cam structure 424 by the second cam structure 434a in the +y-axis direction. FIG. 4P illustrates the reaction force Fc2 applied to the first flat surface 4242 of the first cam structure 424. Referring to FIG. 4P, since the reaction force Fc2 does not include an x-axis direction component or z-axis direction component, any torque about the hinge axis Ha may not be generated. Instead, the reaction force Fc2 may act as a normal force that generates a friction force between the first flat surface 4242 and the second flat surface 4342. Accordingly, due to the reaction force Fc2 acting perpendicular to the first flat surface 4242 and the second flat surface 4342, a large friction force may be generated between the first flat surface 4242 and the second flat surface 4342. Based on the above structure, in the intermediate state of the hinge structure 420a, the elastic force Fs2 of the elastic member 450a may generate a friction force to prevent the hinge structure 420a from being unfolded or folded. For example, in the intermediate state of the hinge structure 420a, the elastic force Fs2 of the elastic member 450a may act as an intermediate state stopping force to maintain the hinge structure 420a in the intermediate state. Therefore, the hinge structure 420a may start to be folded or unfolded with respect to the hinge bracket 410 only when a force greater than the intermediate state stopping force is applied. If the force greater than the intermediate state stopping force is not applied, the intermediate state of the hinge structure 420a with respect to the hinge bracket 410 may be maintained.

Figure 4Q:
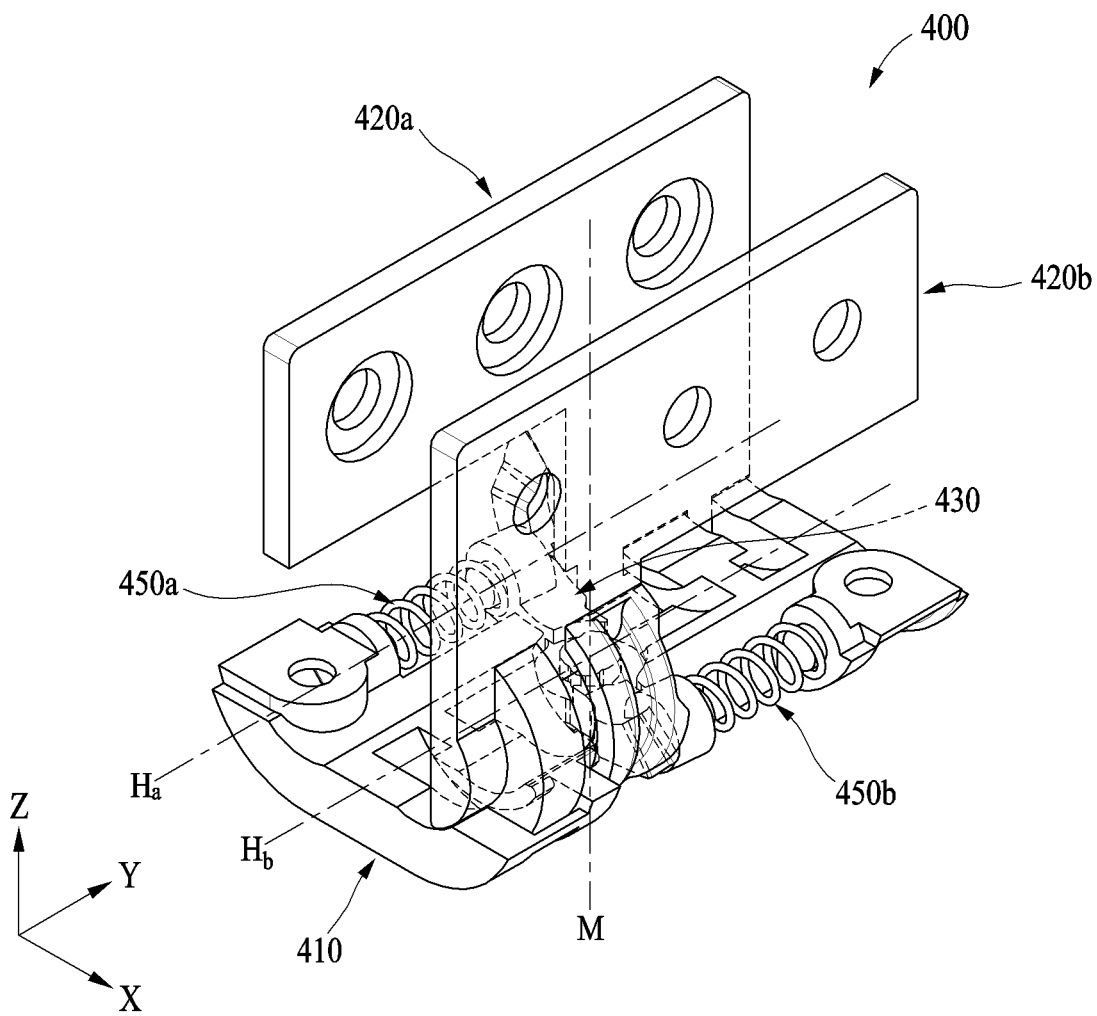
FIG. 4Q is a perspective view illustrating a folded state of a hinge assembly according to one embodiment.
Figure 4R:
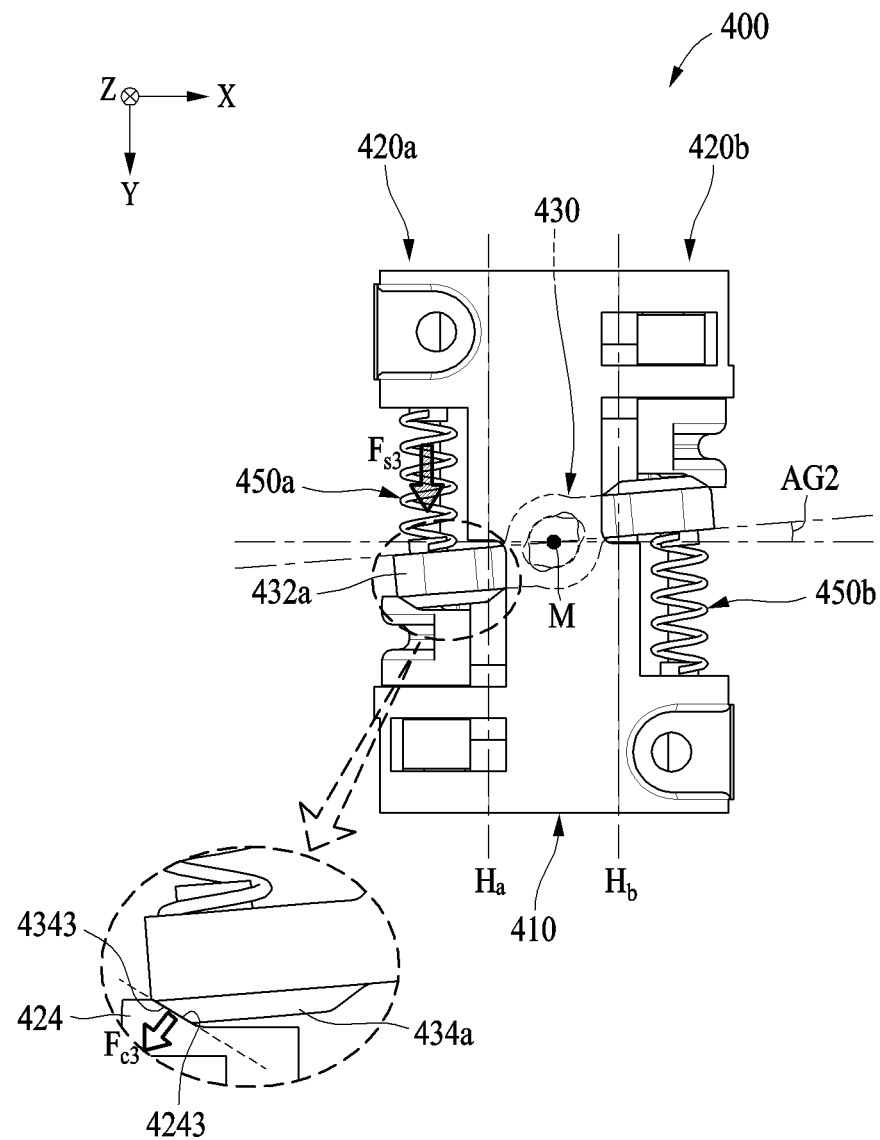
FIG. 4R is a rear view illustrating a folded state of a hinge assembly according to one embodiment.
Figure 4S:
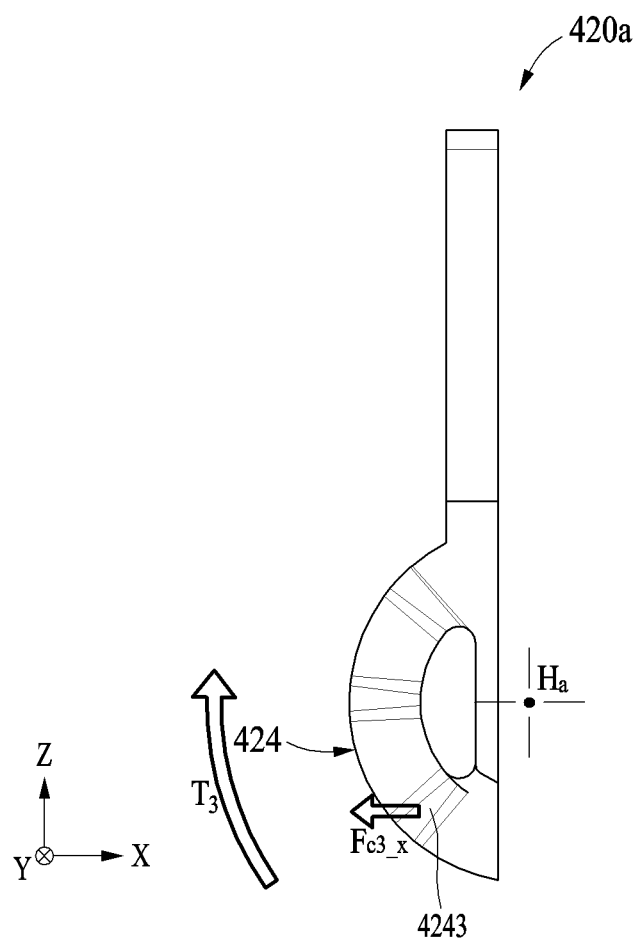
FIG. 4S illustrates a force and torque acting on one hinge structure of FIGS. 4Q and 4R.

FIG. 4Q is a perspective view illustrating a folded state of the hinge assembly according to one embodiment. FIG. 4R is a rear view illustrating the folded state of the hinge assembly according to one embodiment. FIG. 4S illustrates a force and torque acting on one hinge structure of FIGS. 4Q and 4R.

Hereinafter, a force and torque acting on the hinge structure 420a in the folded state of the hinge assembly 400 according to one embodiment will be described with reference to FIGS. 4Q through 4S. However, this is merely for convenience of description, and it will be obvious that the other hinge structure 420b may also operate in a manner corresponding to that of the one hinge structure 420a. The folded state of the hinge assembly 400 may refer to a state in which the pair of hinge structures 420a and 420b are fully folded with respect to the hinge bracket 410.

In one embodiment, in the state in which the hinge assembly 400 is folded, the first cam structure 424 and the second cam structure 434a may be alternately engaged with each other. For example, the crest portion of the second cam structure 434a may be inserted into the trough portion of the first cam structure 424. For example, the second inclined surface 4243 of the first cam structure 424 and the fourth inclined surface 4343 of the second cam structure 434a may contact each other. The elastic member 450a may provide an elastic force Fs3 to the extension 432a of the intermediate member 430 in the direction in which the second cam structure 434a is pressed toward the first cam structure 424. For example, the elastic force Fs3 may be provided in the +y-axis direction by the elastic member 450a. In a process in which the one hinge structure 420a in the intermediate state is rotated to be folded with respect to the hinge bracket 410, the first cam structure 424 and the second cam structure 434a disposed such that the flat surfaces contact with each other may be alternately arranged. Here, if the elastic member 450a applies the elastic force Fs3 in the +y-axis direction, the intermediate member 430 may be rotated by a predetermined angle (e.g., the angle AG2) about the middle axis M in the direction in which the extension 432*a* approaches the hinge structure 420*a*. For example, when the hinge assembly 400 is viewed from the front side, the intermediate member 430 may be in a state of being rotated in the clockwise direction by a predetermined angle (e.g., the angle AG2) about the middle axis M.

In one embodiment, the elastic force Fs3 of the elastic member 450*a* may be applied to press the second cam structure 434*a* to the first cam structure 424 in the +y-axis direction. The first cam structure 424 and the second cam structure 434*a* may apply a reaction force to each other in a direction perpendicular to inclined surfaces (e.g., the second inclined surface 4243 and the fourth inclined surface 4343) that are in contact with each other. For example, the reaction force Fc3 may be applied to the first cam structure 424 by the second cam structure 434*a* in a direction perpendicular to the second inclined surface 4243 and the fourth inclined surface 4343. For example, the reaction force Fc3 may be applied to the first cam structure 424 by the second cam structure 434*a* in a direction between the −x-axis direction and the +y-axis direction. FIG. 4S illustrates an x-axis direction component Fc3_*x* of the reaction force Fc3 applied to the second inclined surface 4243 of the first cam structure 424. Referring to FIG. 4S, the x-axis direction component Fc3_*x* of the reaction force Fc3 may generate clockwise torque T3 about the hinge axis Ha. The clockwise torque T3 may be torque in a direction to allow the hinge structure 420*a* to be further folded with respect to the hinge bracket 410. Based on the above structure, in the state in which the hinge structure 420*a* is folded, the elastic force Fs3 of the elastic member 450*a* may act as torque to allow the hinge structure 420*a* to be further folded. For example, in the state in which the hinge structure 420*a* is folded, the elastic force Fs3 of the elastic member 450*a* may act as a kind of close detent force to allow the hinge structure 420*a* to remain folded. Accordingly, the hinge structure 420*a* may start to be unfolded with respect to the hinge bracket 410 only when a force greater than the close detent force is applied. If the force greater than the close detent force is not applied, the folded state of the hinge structure 420*a* with respect to the bracket 410 may be maintained.

Figure 4T:
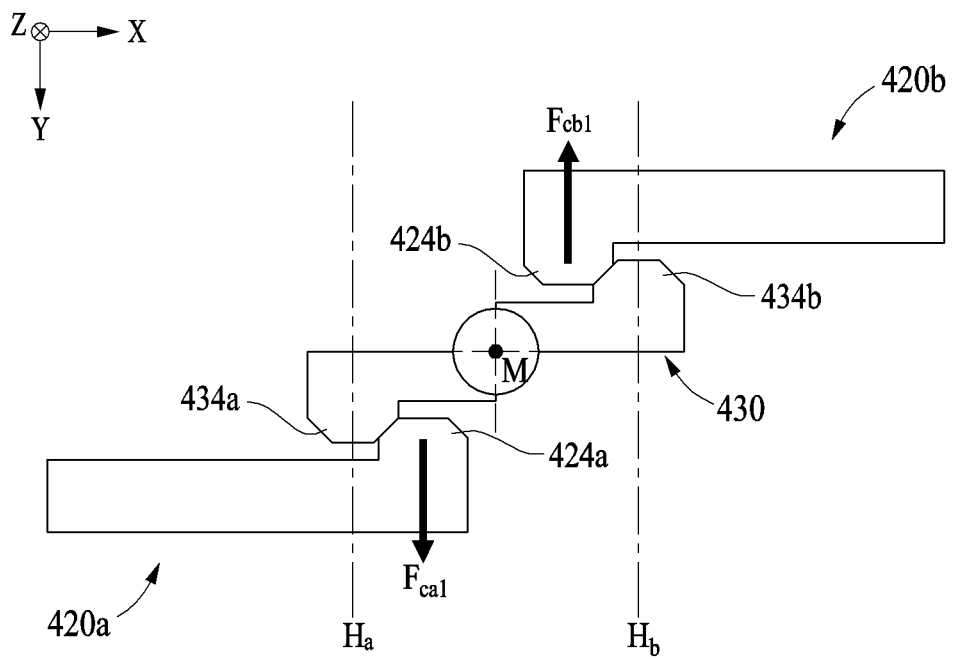
FIGS. 4T, 4U, and 4V are rear views schematically illustrating a hinge assembly according to one embodiment, and illustrate a process in which a balance between both sides of the hinge assembly is achieved in a situation in which one rotation member starts to rotate first.
Figure 4U:
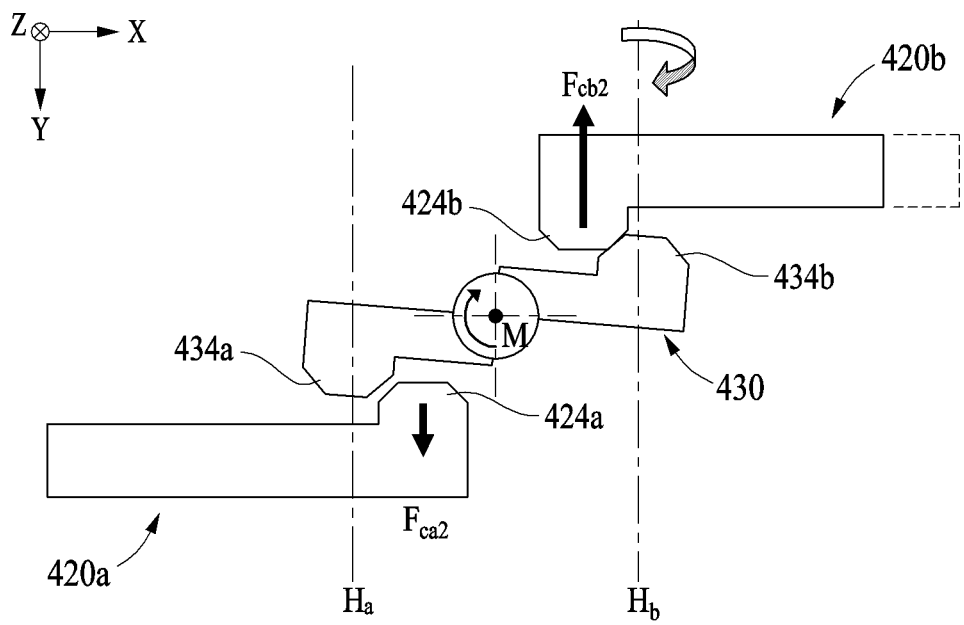
Figure 4V:
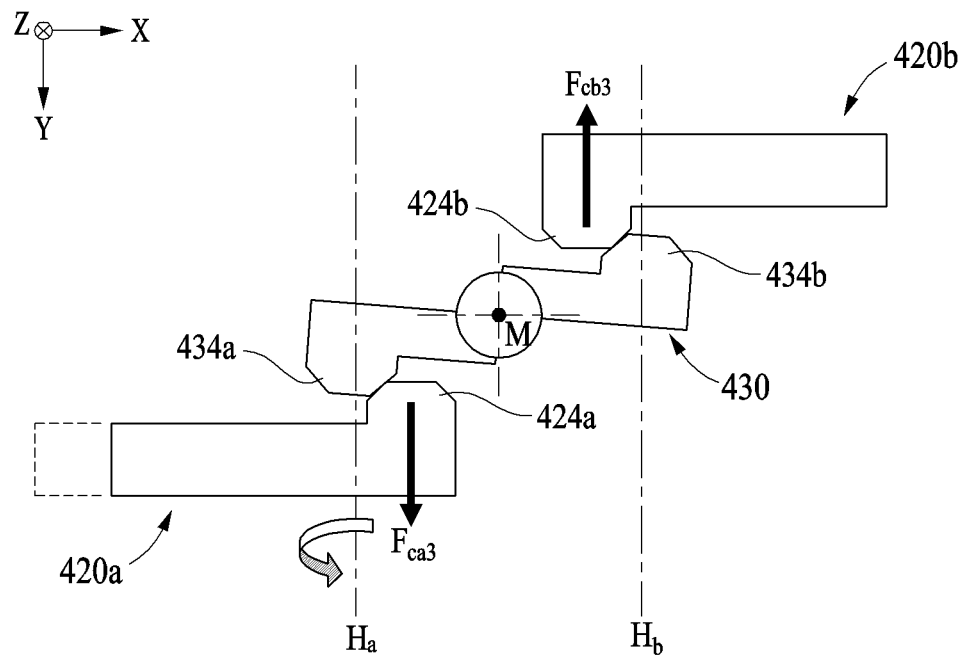

FIGS. 4T through 4V are rear views schematically illustrating the hinge assembly according to one embodiment, and illustrate a process in which a balance between both sides of the hinge assembly is achieved in a situation in which one rotation member starts to rotate first.

FIG. 4T illustrates a state in which the pair of hinge structures 420*a* and 420*b* are rotated by the same angle. In the state of FIG. 4T, a reaction force Fca1 acting between the first cam structure 424*a* and the second cam structure 434*a* and a reaction force Fcb1 acting between the first cam structure 424*b* and the second cam structure 434*b* may be equal to each other, to achieve the balance between both sides. FIG. 4U illustrates a state in which one hinge structure 420*b* first starts to rotate about the hinge axis Hb. A rotation angle of the one hinge structure 420*b* may be synchronized with a rotation angle of the other hinge structure 420*a* by a sync assembly (e.g., the sync assembly 320 of FIG. 3). However, a gap may be formed between components of the sync assembly 320 in a manufacturing process. Due to the gap, the rotation angle of the one hinge structure 420*b* and the rotation angle of the other hinge structure 420*a* may not be temporarily the same. In such a state, as shown in FIG. 4U, the first cam structure 424*b* of the one hinge structure 420*b* that starts to rotate first may start to push the second cam structure 434*b*, so that the intermediate member 430 may be rotated about the middle axis M in one direction (e.g., a clockwise direction). If the intermediate member 430 is rotated about the middle axis M in one direction (e.g., a clockwise direction), a distance between the first cam structure 424*a* and the second cam structure 434*a* of the other hinge structure 420*a* may relatively increase. Therefore, a reaction force Fca2 between the first cam structure 424*a* and the second cam structure 434*a* in the other hinge structure 420*a* may be relatively reduced in comparison to a reaction force Fcb2 between the first cam structure 424*b* and the second cam structure 434*b* in the one hinge structure 420*b* that starts to rotate first. For example, the reaction force Fca2 between the first cam structure 424*a* and the second cam structure 434*a* and the reaction force Fcb2 between the first cam structure 424*b* and the second cam structure 434*b* may be temporarily imbalanced. FIG. 4V illustrates a state in which the other hinge structure 420*a* is rotated about the hinge axis Ha, to solve an imbalance between reaction forces. If the reaction force Fca2 between the first cam structure 424*a* and the second cam structure 434*a* and the reaction force Fcb2 between the first cam structure 424*b* and the second cam structure 434*b* are imbalanced, the other hinge structure 420*a* may be rotated about the hinge axis Ha until reaction forces Fca3 and Fcb3 on both sides are balanced, because a rotation resistance of the other hinge structure 420*a* having a relatively small reaction force Fca2 is less than that of the one hinge structure 420*b* having a relatively large reaction force Fcb2. As a result, the other hinge structure 420*a* may be rotated about the hinge axis Ha until the same angle as the rotation angle of the one hinge structure 420*b* is formed. In such a state, the reaction forces Fca3 and Fcb3 may be balanced with each other as shown in FIG. 4V. As a result, since the pair of hinge structures 420*a* and 420*b* interoperate with each other through the intermediate member 430 in the hinge assembly 400 according to one embodiment, the other hinge structure 420*a* may be rotated in compensation via the intermediate member 430 even though the one hinge structure 420*b* starts to rotate first. Therefore, the hinge assembly 400 according to one embodiment may complement the sync assembly 320 by reducing a rotation angle imbalance of the pair of hinge structures 420*a* and 420*b* by itself. As a result, the pair of hinge structures 420*a* and 420*b* may be smoothly rotated.

Figure 4W:
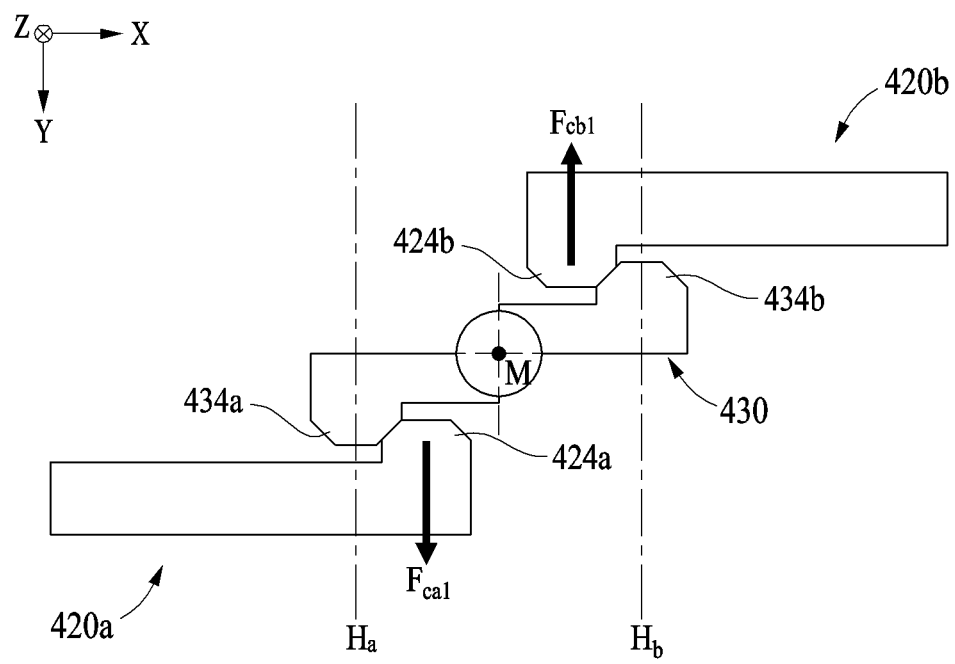
FIGS. 4W, 4X, and 4Y are rear views schematically illustrating a hinge assembly according to one embodiment, and illustrate a process in which a balance between both sides of the hinge assembly is achieved in a situation in which one rotation member starts to rotate first.
Figure 4X:
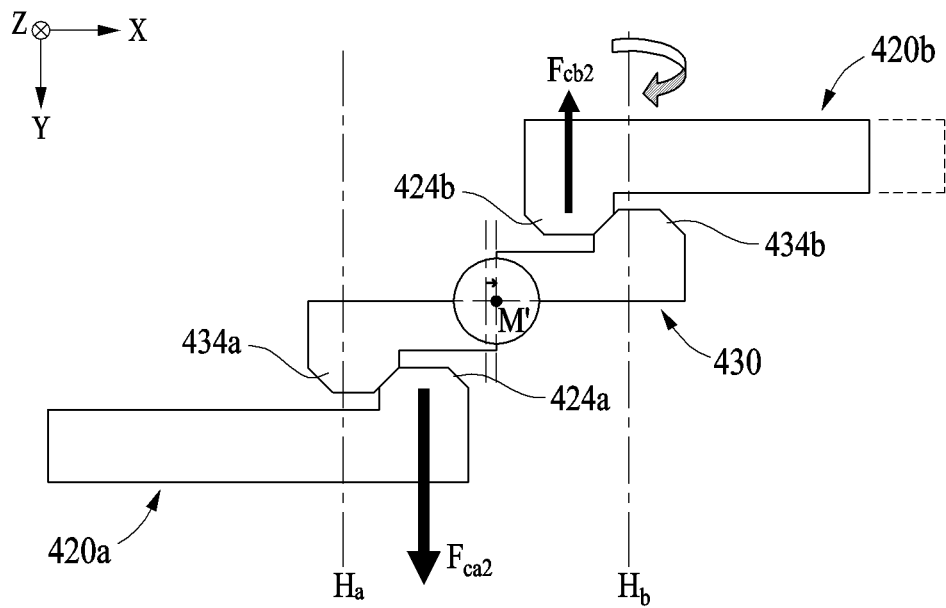
Figure 4Y:
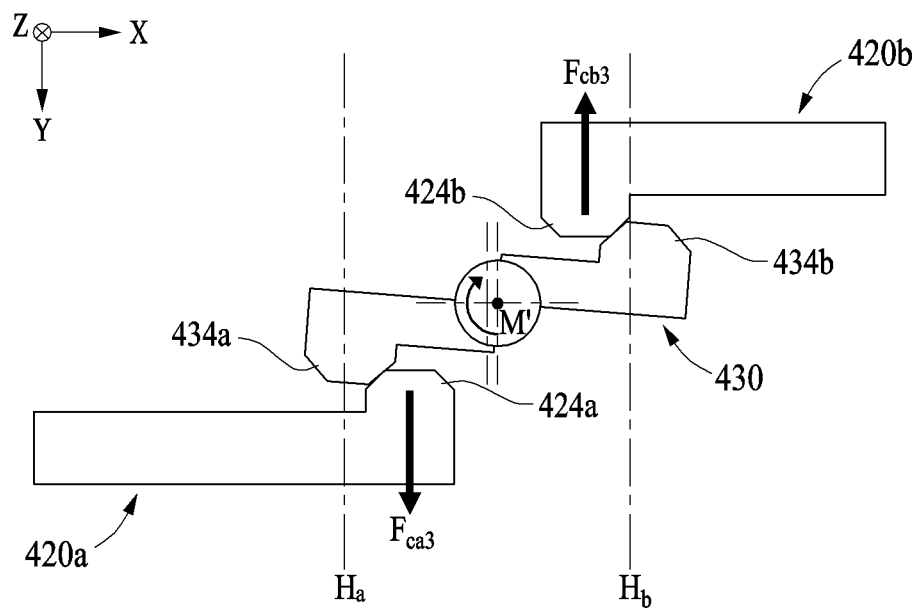

FIGS. 4W through 4Y are rear views schematically illustrating the hinge assembly according to one embodiment, and illustrate a process in which a balance between both sides of the hinge assembly is achieved in a situation in which one rotation member starts to rotate first.

FIG. 4W illustrates a state in which the pair of hinge structures 420*a* and 420*b* are rotated by the same angle. In the state of FIG. 4W, a reaction force Fca1 acting between the first cam structure 424*a* and the second cam structure 434*a*, and a reaction force Fcb1 acting between the first cam structure 424*b* and the second cam structure 434*b* on both sides may be equal to each other, to achieve the balance between both sides. FIG. 4X illustrates a state in which one hinge structure 420*b* first starts to rotate about the hinge axis Hb. In a process in which the first cam structure 424*b* of the one hinge structure 420*b* that starts to rotate first pushes the second cam structure 434*b*, the intermediate member 430 may be pushed in one direction (e.g., the +x direction) by a gap between a through-hole (e.g., the through-hole 4311 of FIG. 4H) of the intermediate member 430 and an intermediate protrusion (e.g., the intermediate protrusion 415 of FIG. 4E) of a hinge bracket (e.g., the hinge bracket 410 of FIG. 4E). In such a state, since the first cam structure 424*a* and the second cam structure 434*a* in the other hinge structure 420*a* interfere with each other, the reaction force Fca2 between the first cam structure 424*a* and the second cam structure 434*a* in the other hinge structure 420*a* may relatively increase in comparison to the reaction force Fcb2 between the first cam structure 424*b* and the second cam structure 434*b* in the one hinge structure 420*b*. For example, the reaction force Fca2 between the first cam structure 424*a* and the second cam structure 434*a* and the reaction force Fcb2 between the first cam structure 424*b* and the second cam structure 434*b* on both sides may be temporarily imbalanced. FIG. 4Y illustrates a state in which the intermediate member 430 is rotated in one direction (e.g., a clockwise direction) about a new middle axis M', to solve an imbalance between reaction forces. To solve the interference between the first cam structure 424*a* and the second cam structure 434*a* in the other hinge structure 420*a*, the intermediate member 430 may be rotated about the new middle axis M' in the clockwise direction until the reaction force Fca3 between the first cam structure 424*a* and the second cam structure 434*a* and the reaction force Fcb3 between the first cam structure 424*b* and the second cam structure 434*b* on both sides are equal. In such a state, the reaction forces Fca3 and Fcb3 may be balanced with each other as shown in FIG. 4Y. As a result, since the pair of hinge structures 420*a* and 420*b* interoperate with each other through the intermediate member 430 in the hinge assembly 400 according to one embodiment, the reaction forces Fca3 and Fcb3 on both sides may be balanced even though the one hinge structure 420*b* starts to rotate first. Therefore, the hinge assembly 400 according to one embodiment may prevent a reaction force imbalance of the pair of hinge structures 420*a* and 420*b*. As a result, the pair of hinge structures 420*a* and 420*b* may be smoothly rotated.

In one embodiment, as described above with reference to FIGS. 4A through 4Y, the intermediate member 430 may be rotated about the middle axis M between the pair of hinge structures 420*a* and 420*b*, and accordingly rotation operations of the hinge structure 420*a* and 420*b* may interoperate with each other through the intermediate member 430. Thus, the hinge assembly 400 may be smoothly folded or unfolded. In addition, by preventing tilting caused by a gap between components, the thickness of the hinge assembly 400 and the number of components of the hinge assembly 400 may be reduced, and a sufficient elastic force of the elastic member 450*a* or 450*b* may be secured.

Figure 5:
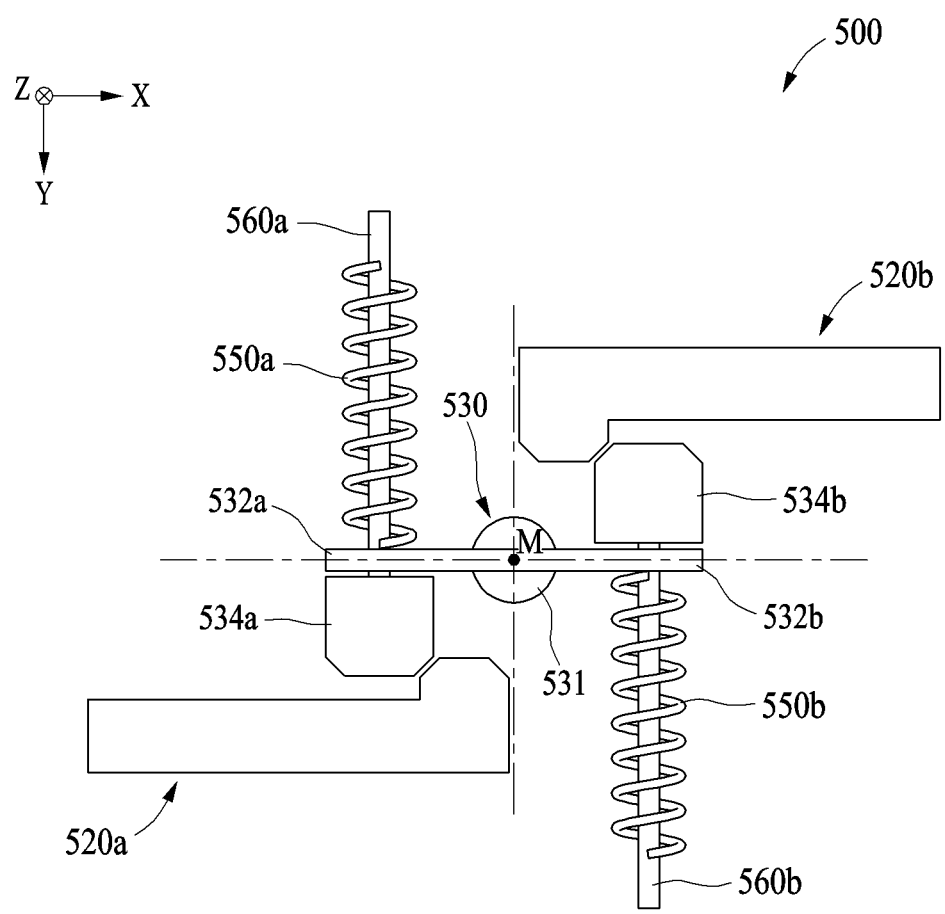
FIG. 5 is a rear view schematically illustrating a hinge assembly according to one embodiment.

FIG. 5 is a rear view schematically illustrating a hinge assembly according to one embodiment.

Referring to FIG. 5, in one embodiment, a pair of second cam structures 534*a* and 534*b* may be formed as components separate from an intermediate member 530. For example, at least a central portion 531 and a pair of extensions 532*a* and 532*b* of the intermediate member 530 may be integrally formed, and the pair of second cam structures 534*a* and 534*b* may be separate components in contact with the pair of extensions 532*a* and 532*b*. An elastic member 550*a* or 550*b* may press the extension 532*a* or 532*b* toward the second cam structure 534*a* or 534*b* such that the extension 532*a* or 532*b* may remain in contact with the second cam structure 534*a* or 534*b*. In addition, for a longitudinal alignment of the elastic member 550*a* or 550*b*, the extension 532*a* or 532*b*, and the second cam structure 534*a* or 534*b*, a guide member 560*a* or 560*b* penetrating the elastic member 550*a* or 550*b*, the extension 532*a* or 532*b*, and the second cam structure 534*a* or 534*b* in a longitudinal direction (e.g., a y-axis direction) may also be separately provided. A hinge assembly 500 of FIG. 5 may operate in substantially the same manner as the hinge assembly 400 described above with reference to FIGS. 4A through 4Y.

Figure 6A:
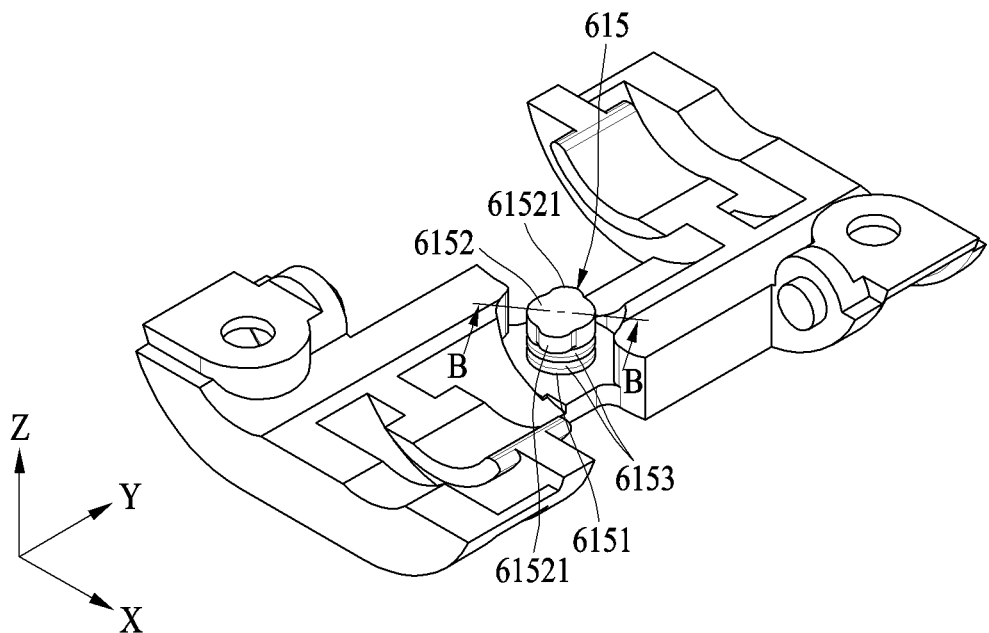
FIG. 6A is a perspective view illustrating an intermediate protrusion according to one embodiment.
Figure 6B:
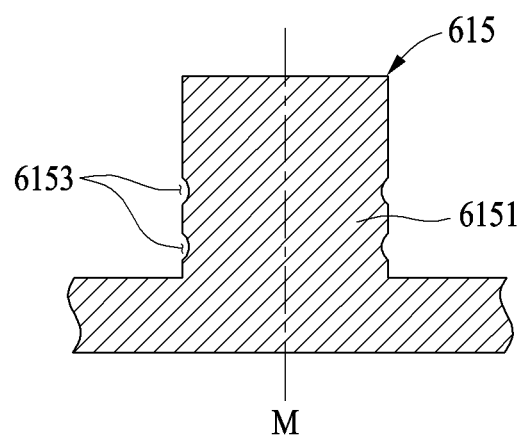
FIG. 6B is a cross-sectional view taken along line B-B of FIG. 6A.

FIG. 6A is a perspective view illustrating an intermediate protrusion according to one embodiment. FIG. 6B is a cross-sectional view taken along line B-B of FIG. 6A.

Referring to FIGS. 6A and 6B, an intermediate protrusion 615 according to one embodiment may include a protrusion base 6151, a head 6152 having a protrusion 61521, and a groove 6153.

In one embodiment, the groove 6153 may be recessed in at least a portion of an outer surface of the protrusion base 6151. For example, the groove 6153 may be formed along a circumference of the protrusion base 6151. For example, a single groove 6153, or a plurality of grooves 6153 may be formed. The plurality of grooves 6153 may be formed to be spaced apart from each other in the direction of the middle axis M in the protrusion base 6151. Although two grooves 6153 are illustrated in FIGS. 6A and 6B, this is merely an example. A number of grooves 6153 and/or a shape of the groove 6153 is not limited thereto.

In one embodiment, when a lubricant is applied around the protrusion base 6151, the lubricant may be introduced into a space formed by the groove 6153 to fill the space. The lubricant may include, for example, grease. The lubricant introduced into the groove 6153 may reduce a rotational frictional resistance of an intermediate member (e.g., the intermediate member 430 of FIG. 4D) with respect to the intermediate protrusion 615.

Figure 7A:
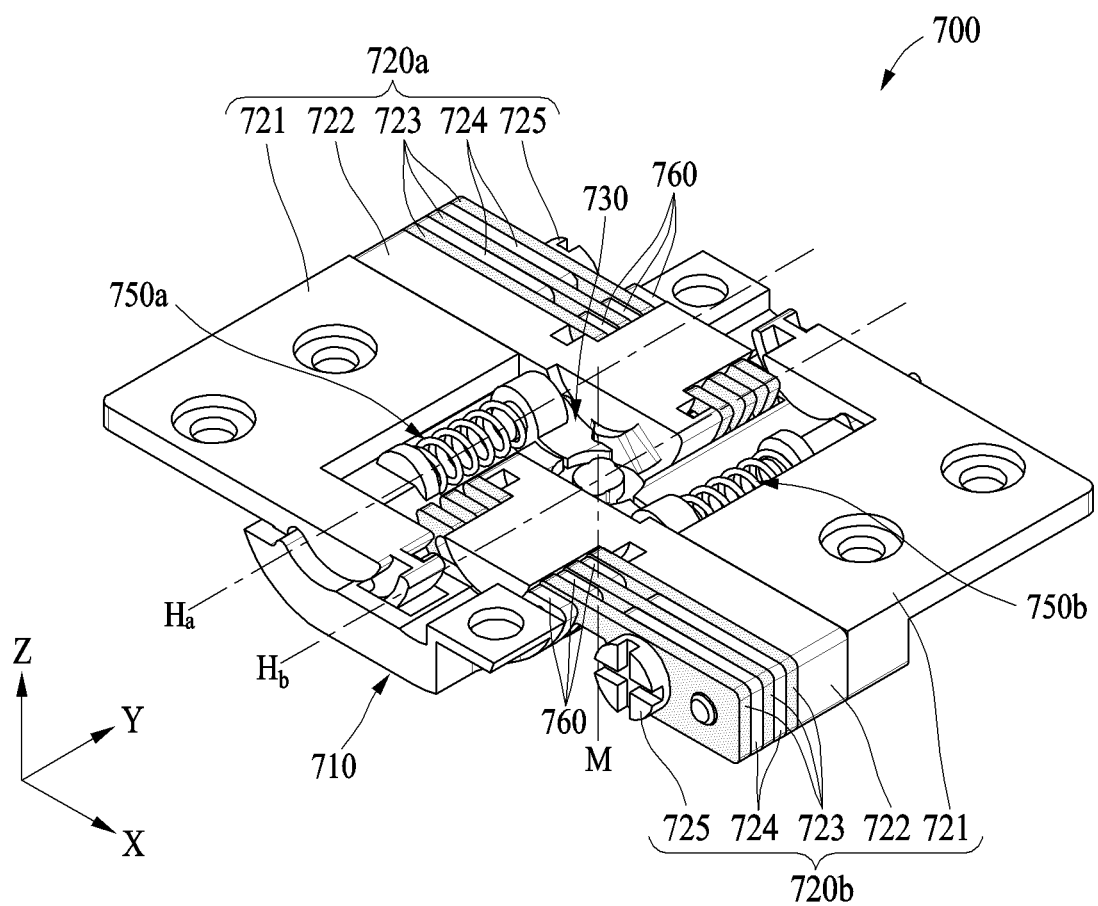
FIG. 7A is a perspective view illustrating an unfolded state of a hinge assembly according to one embodiment.
Figure 7B:
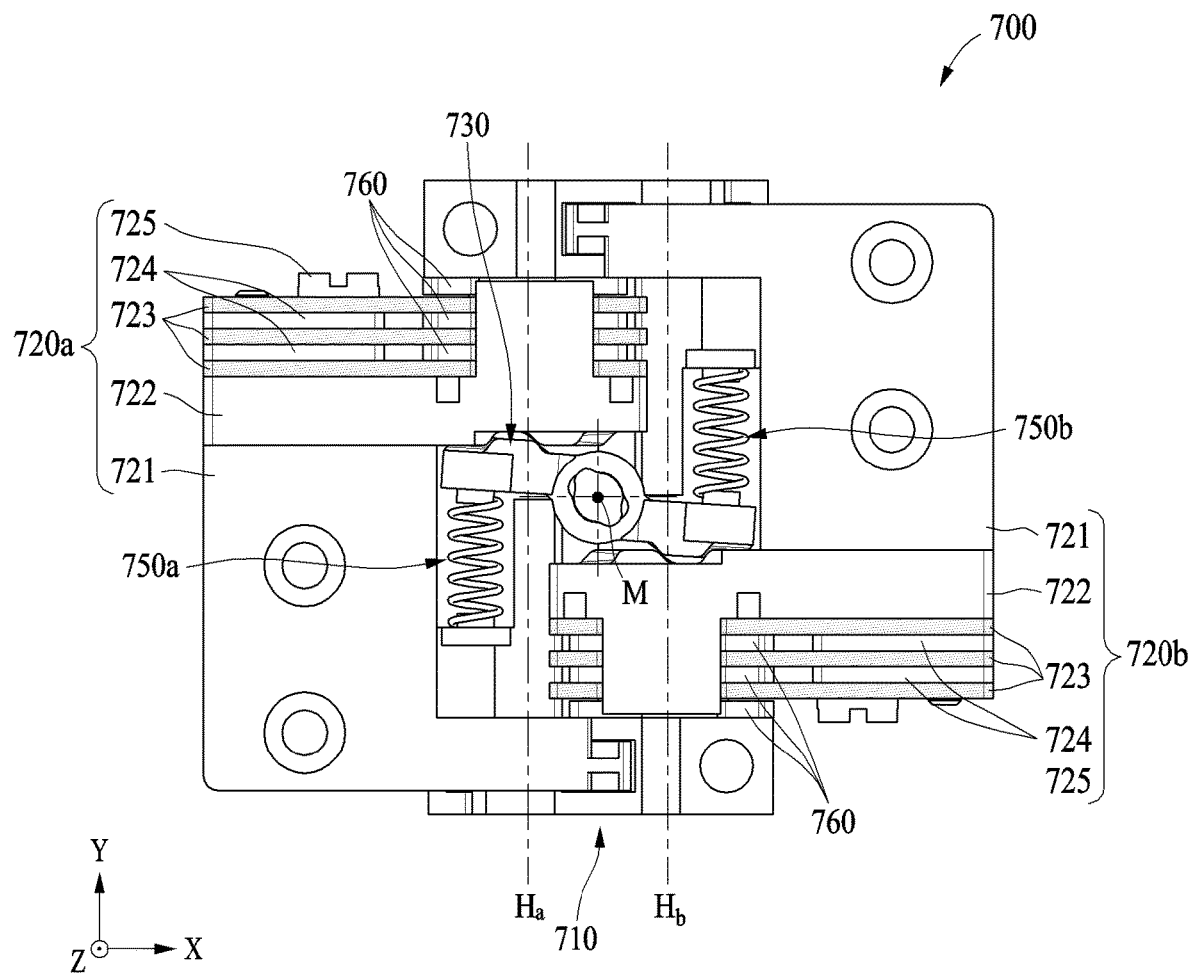
FIG. 7B is a front view illustrating an unfolded state of a hinge assembly according to one embodiment.
Figure 7C:
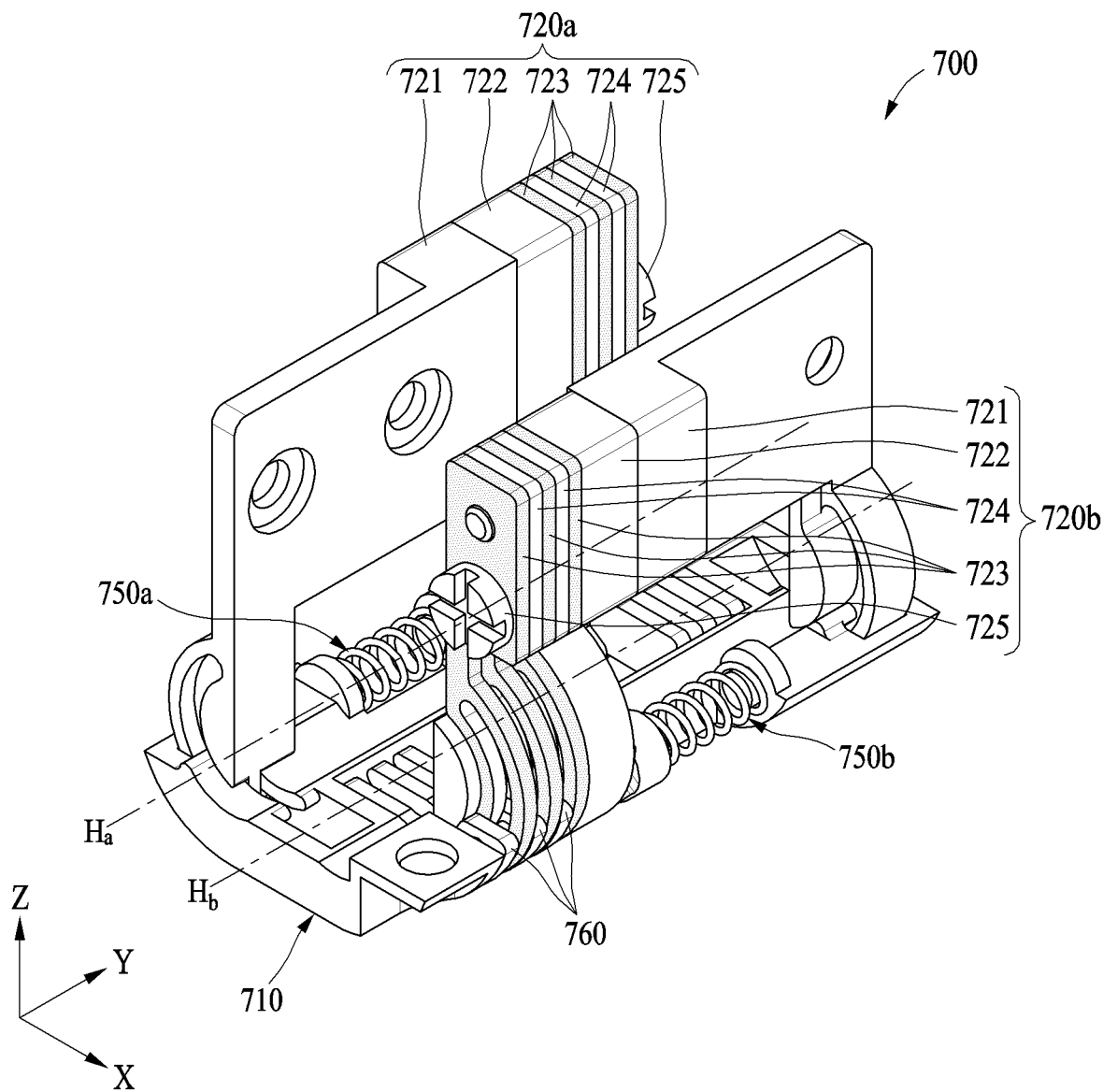
FIG. 7C is a perspective view illustrating a folded state of a hinge assembly according to one embodiment.
Figure 7D:
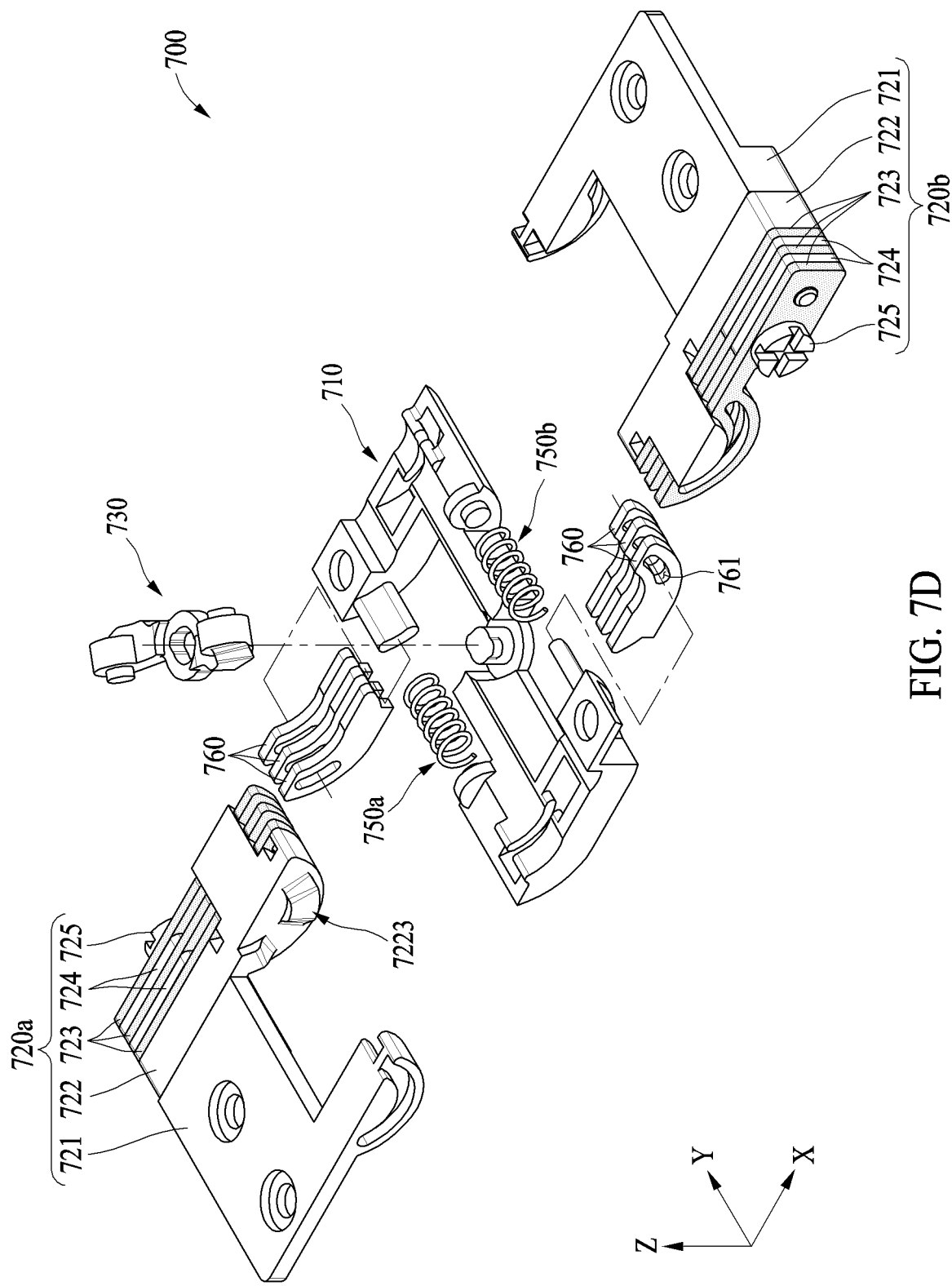
FIG. 7D is an exploded perspective view illustrating a hinge assembly according to one embodiment.
Figure 7E:
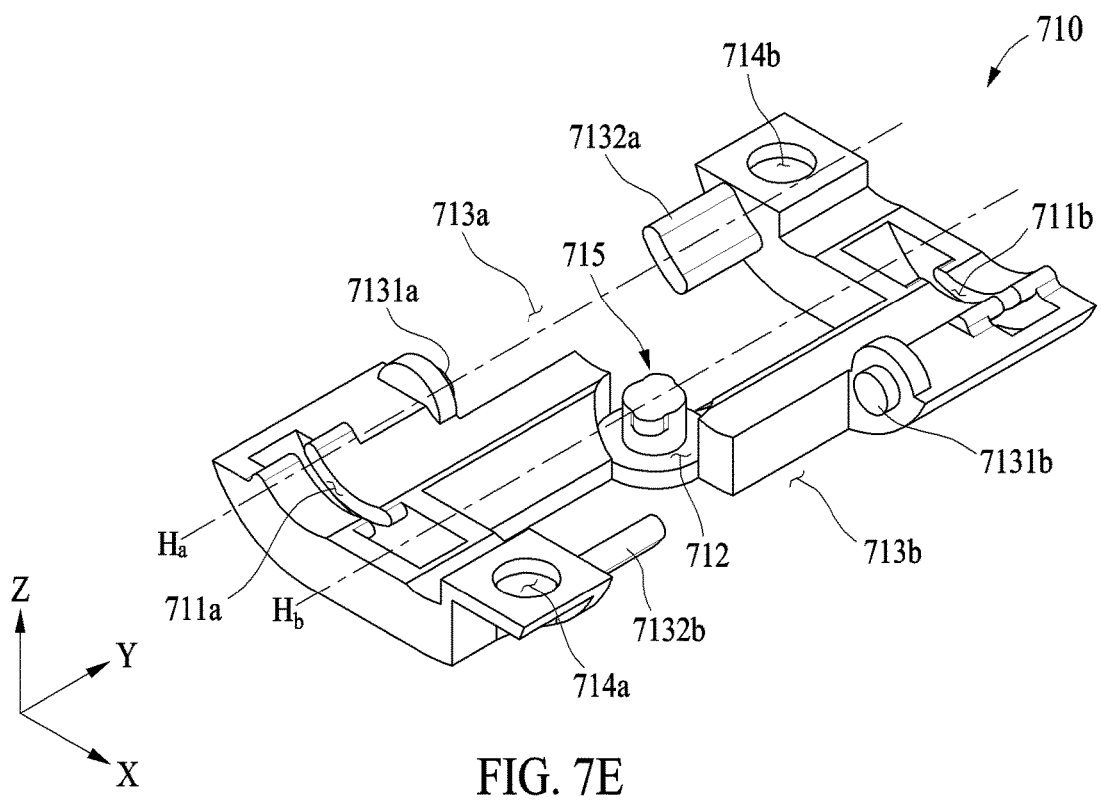
FIG. 7E is a perspective view illustrating a hinge bracket according to one embodiment.
Figure 7F:
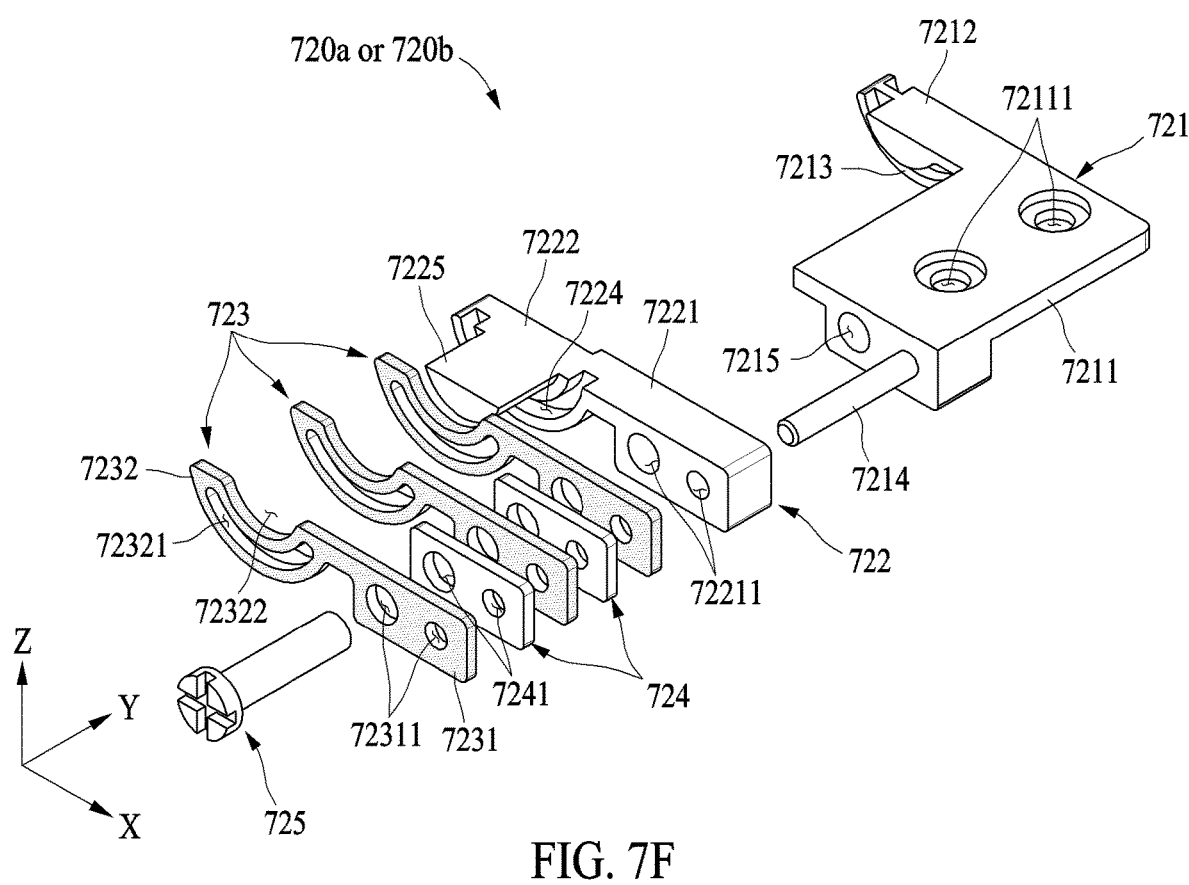
FIG. 7F is an exploded perspective view illustrating a hinge structure according to one embodiment.
Figure 7I:
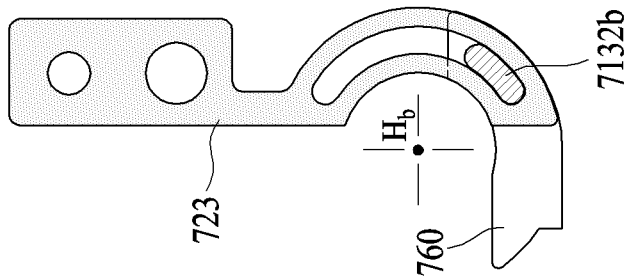
FIGS. 7G, 7H, and 7I illustrate a state in which a rotation plate and a fixing plate are in surface contact with each other according to one embodiment.
Figure 7H:
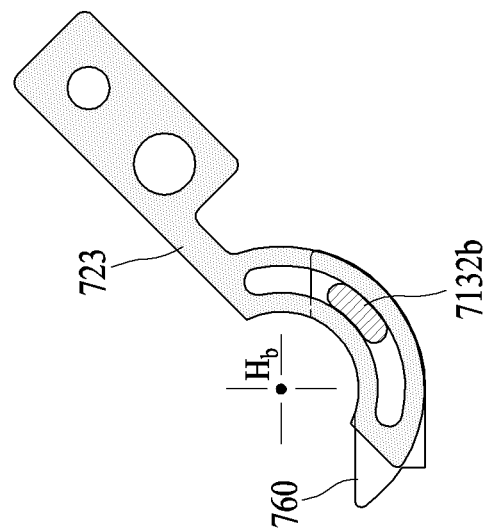
Figure 7G:
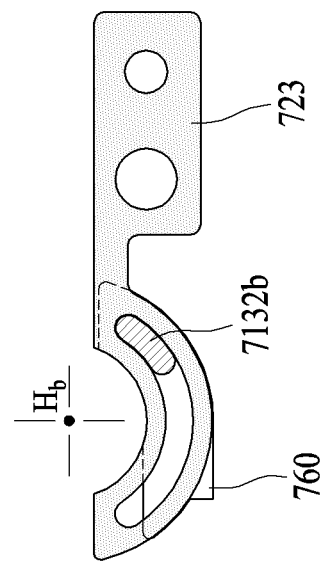

FIG. 7A is a perspective view illustrating an unfolded state of a hinge assembly according to one embodiment. FIG. 7B is a front view illustrating the unfolded state of the hinge assembly according to one embodiment. FIG. 7C is a perspective view illustrating a folded state of the hinge assembly according to one embodiment. FIG. 7D is an exploded perspective view illustrating the hinge assembly according to one embodiment. FIG. 7E is a perspective view illustrating a hinge bracket according to one embodiment. FIG. 7F is an exploded perspective view illustrating a hinge structure according to one embodiment. FIGS. 7G through 7I illustrate a state in which a rotation plate and a fixing plate are in surface contact with each other according to one embodiment.

Referring to 7A through 7I, a hinge assembly 700 according to one embodiment may include a hinge bracket 710, a pair of hinge structures 720*a* and 720*b*, an intermediate member 730, a pair of elastic members 750*a* and 750*b*, and a fixing plate 760. The description of the configuration of the hinge assembly 400 provided with reference to FIGS. 4A through 4Y may be similarly applied to a configuration of the hinge assembly 700 of FIGS. 7A through 7I which is substantially the same as that of the hinge assembly 400 of FIGS. 4A through 4Y, unless otherwise described.

In one embodiment, the hinge bracket 710 may include a pair of first rail structures 711*a* and 711*b*, an intermediate member arrangement space 712, a pair of open spaces 713*a* and 713*b*, a pair of bracket fixing holes 714*a* and 714*b*, and an intermediate protrusion 715.

In one embodiment, the hinge bracket 710 may include a pair of first rail structures 711*a* and 711*b* so that the pair of hinge structures 720*a* and 720*b* may be rotatably coupled. At least a portion of a cross section of the pair of first rail structures 711*a* and 711*b* may have an arc shape in a direction from an upper surface (e.g., a surface facing the +z-axis direction) of the hinge bracket 710 to a lower surface (e.g., a surface facing the −z-axis direction) of the hinge bracket 710. The pair of first rail structures 711*a* and 711*b* may be recessed in an arc shape with a predetermined angle.

For example, the first rail structure 711a or 711b may be recessed from an upper side (e.g., a +z side) to a lower side (e.g., a −z side) such that a cross section of the first rail structure 711a or 711b with respect to an x-z plane may have an arc shape. At least a portion of the hinge structure 720a or 720b may be inserted into the first rail structure 711a or 711b in a direction (e.g., an +x-axis direction or a −x-axis direction) perpendicular to a folding axis (e.g., the folding axis A of FIG. 3). For example, a second rail structure 7213 of each of the pair of hinge structures 720a and 720b may be inserted into the pair of first rail structures 711a and 711b to interoperate with the pair of first rail structures 711a and 711b. The pair of first rail structures 711a and 711b may be formed to diagonally face each other. For example, the pair of first rail structures 711a and 711b may be formed to be point-symmetric with respect to a center of the hinge bracket 710, when the hinge bracket 710 is viewed from the front side. For example, one first rail structure 711a may be formed at a position relatively biased in the −x-axis direction and/or the −y-axis direction, in comparison to the other first rail structure 711b, and the other first rail structure 711b may be formed at a position relatively biased in the +x-axis direction and/or the +y-axis direction, in comparison to the one first rail structure 711a. The arc shapes of the pair of first rail structures 711a and 711b may define the pair of hinge axes Ha and Hb. For example, centers of the arc shapes of the pair of first rail structures 711a and 711b may be defined as a pair of hinge axes Ha and Hb. The pair of hinge axes Ha and Hb may be parallel to the folding axis A. The pair of hinge axes Ha and Hb may be spaced apart from each other by a designated interval.

In one embodiment, the intermediate member arrangement space 712 and the intermediate protrusion 715 may be formed near the center of the hinge bracket 710. The description of the intermediate member arrangement space 412 and the intermediate protrusion 415 of the hinge assembly 400 provided with reference to FIGS. 4A through 4Y may be similarly applied to the intermediate member arrangement space 712 and the intermediate protrusion 715, unless otherwise described.

In one embodiment, the pair of open spaces 713a and 713b may be formed on both sides (e.g., the −x side and the +x side) of the hinge bracket 710. The pair of open spaces 713a and 713b may be formed on the sides (e.g., the −x side and the +x side) of the hinge bracket 710, respectively, when the hinge bracket 710 is viewed from the front side. The open space 713a, 713b may be a space for an arrangement of at least the elastic member 750a or 750b, an extension (e.g., the extension 432a or 432b of FIG. 4H) of the intermediate member 730, and the fixing plate 760. For example, at least a portion of the open space 713a, 713b may be formed to have a longitudinal direction in the y-axis direction. The pair of open spaces 713a and 713b may be formed to diagonally face each other. For example, the pair of open spaces 713a and 713b may be formed to be point-symmetric with respect to the center of the hinge bracket 710, when the hinge bracket 710 is viewed from the front side.

In one embodiment, a first connection projection 7131a or 7131b may protrude in a direction parallel to the hinge axis Ha or Hb in the open space 713a or 713b. For example, one first connection projection 7131a may protrude in the +y-axis direction in one open space 713a, and the other first connection projection 7131b may protrude in the −y-axis direction in the other open space 713b. The first connection projection 7131a or 7131b may be inserted into and connected to one end portion (e.g., an end portion facing the −y-axis direction, or an end portion facing the +y-axis direction) of the elastic member 750a or 750b.

In one embodiment, a protruding pin 7132a or 7132b may protrude in a direction parallel to the hinge axis Ha or Hb in the open space 713a or 713b. The protruding pin 7132a or 7132b may be formed in a longitudinal direction (e.g., the y-axis direction) parallel to the hinge axis Ha or Hb. The protruding pin 7132a or 7132b may protrude to face the first connection projection 7131a or 7131b. For example, one protruding pin 7132a may protrude in the +y-axis direction in one open space 713a, and the other protruding pin 7132b may protrude in the −y-axis direction in the other open space 713b. The protruding pins 7132a or 7132b may have an arc-shaped cross section. For example, a cross section of the protruding pin 7132a or 7132b facing the x-z plane may have an arc shape. The arc shape of the protruding pin 7132a or 7132b may be an arc having the hinge axis Ha or Hb as a center. However, this is merely an example, and the shape of the protruding pin 7132a or 7132b is not limited thereto. For example, the protruding pin 7132a or 7132b may also have a shape of a circular rod. At least one fixing plate 760 and at least one rotation plate 723 may be inserted into the protruding pin 7132a or 7132b.

In one embodiment, the hinge bracket 710 may include a pair of bracket fixing holes 714a and 714b to fix the hinge bracket 710 to a hinge housing (e.g., the hinge housing 313 of FIG. 3). For example, a fastening member (e.g., a screw, a bolt, a pin, and/or a combination fastening structure) may be inserted into each of the pair of bracket fixing holes 714a and 714b. The pair of bracket fixing holes 714a and 714b may be formed to diagonally face each other. For example, the pair of bracket fixing holes 714a and 714b may be formed to be point-symmetric with respect to the center of the hinge bracket 710 when the hinge bracket 710 is viewed from the front side. For example, one bracket fixing hole 714a may be formed at a position relatively biased in the +x-axis direction and/or −y-axis direction, in comparison to the other bracket fixing hole 714b, and the other bracket fixing hole 714b may be formed at a position relatively biased in the −x-axis direction and/or the +y-axis direction, in comparison to the one bracket fixing hole 714a. For example, a direction in which the pair of bracket fixing holes 714a and 714b is arranged may cross a direction in which the pair of first rail structures 711a and 711b is arranged.

In one embodiment, the pair of hinge structures 720a and 720b may be rotatably connected to the hinge bracket 710. For example, the pair of hinge structures 720a and 720b may be rotatably connected to the pair of first rail structures 711a and 711b. The pair of hinge structures 720a and 720b may be arranged to diagonally face each other. For example, the pair of hinge structures 720a and 720b may be disposed to be point-symmetric with respect to the center of the hinge assembly 700, when the hinge assembly 700 is viewed from the front side.

In one embodiment, each of the pair of hinge structures 720a and 720b may include a first part 721, a second part 722, a rotation plate 723, a spacer 724, and a second alignment pin 725.

In one embodiment, the first part 721 may be rotatably connected to the first rail structure 711a or 711b of the hinge bracket 710. The first part 721 may be fastened to a first housing (e.g., the first housing 311 of FIG. 3) or a second housing (e.g., the second housing 312 of FIG. 3).

In one embodiment, the first part 721 may include a first body 7211, a second body 7212, a second rail structure 7213, and an alignment pin 7214.

In one embodiment, the first body 7211 may be formed in a plate shape. The first body 7211 may be fixedly connected to the first housing (e.g., the first housing 311 of FIG. 3) or the second housing (e.g., the second housing 312 of FIG. 3). The first body 7211 may be disposed parallel to the front surface (e.g., the surface facing the +z-axis direction based on the state of FIG. 3) of the first housing 311 or the second housing 312. At least one housing fixing hole 72111 for fixing the hinge structure 720*a* or 720*b* to the first housing 311 or the second housing 312 may be formed in the first body 7211. For example, the housing fixing hole 72111 may be formed to penetrate the first body 7211 in the z-axis direction. For example, a fastening member (e.g., a screw, a bolt, a pin, and/or a combination fastening structure) may be inserted into the housing fixing hole 72111. Although two housing fixing holes 72111 are formed as shown in FIG. 7F, this is merely an example, and a number of housing fixing holes 72111 is not limited thereto.

In one embodiment, the second body 7212 may be formed to extend from at least a portion of one end of the first body 7211. For example, in FIG. 7F, the second body 7212 may be formed to extend in the −x-axis direction from at least a portion of an end of the first body 7211 facing the −x-axis direction. The second body 7212 may be formed integrally with the first body 7211. At least a portion of a cross section of the second body 7212 may have an arc shape in the direction from the upper surface (e.g., the surface facing the +z-axis direction) to the lower surface (e.g., the surface facing the −z-axis direction). For example, at least a portion of a cross section of the second body 7212 facing the x-z plane may have an arc shape.

In one embodiment, the second rail structure 7213 may be formed on a lower side (e.g., a side facing the −z-axis direction) of the second body 7212. The second rail structure 7213 may be formed to protrude from the second body 7212. At least a portion of a cross section of the second rail structure 7213 may have an arc shape in the direction from the upper surface (e.g., the surface facing the +z-axis direction) to the lower surface (e.g., the surface facing the −z-axis direction). For example, at least a portion of a cross section of the second rail structure 7213 facing the x-z plane may have an arc shape. The arc shape of the second rail structure 7213 may correspond to the arc shape of the first rail structure 711*a* or 711*b*. The hinge structure 720*a* or 720*b* may be connected to the hinge bracket 710 such that the second rail structure 7213 may be inserted into the first rail structure 711*a* or 711*b*. The second rail structure 7213 may rotate about the hinge axis Ha or Hb within a designated angle range along the first rail structure 711*a* or 711*b*. Based on the above structure, in a state in which the second rail structure 7213 is inserted into the first rail structure 711*a* or 711*b*, the hinge structure 720*a* or 720*b* may rotate within a designated angle range with respect to the hinge bracket 710. For example, the hinge structure 720*a* or 720*b* may rotate in the x-z plane about the hinge axis Ha or Hb formed by the first rail structure 711*a* or 711*b* and the second rail structure 7213. The first rail structure 711*a* or 711*b* and the second rail structure 7213 may allow only a rotational motion of the hinge structure 720*a* or 720*b* on the x-z plane and may restrict a translational movement and/or a rotational motion of the hinge structure 720*a* or 720*b* in another direction. For example, an outer portion of the first rail structure 711*a* or 711*b* in the radial direction may be formed to be stepped with a relatively large width (e.g., a width in the y-axis direction), in comparison to an inner portion thereof, and an outer portion of the second rail structure 7213 in the radial direction may be formed to be stepped with a relatively large width (e.g., a width in the y-axis direction), in comparison to an inner portion thereof. The pair of first rail structures 711*a* and 711*b* protrude and the second rail structure 7213 is recessed, as illustrated and described above, however, this is merely an example. For example, the pair of first rail structures 711*a* and 711*b* may be recessed, and the second rail structure 7213 may protrude.

In one embodiment, a first alignment pin 7214 and a first alignment hole 7215 may be formed in the first body 7211. The first alignment pin 7214 and the first alignment hole 7215 may be configured to align and connect the second part 722, the rotation plate 723, and the spacer 724 to the first part 721. For example, the first alignment pin 7214 and the first alignment hole 7215 may be formed in an end portion of the first body 7211 facing the −y-axis direction. The first alignment pin 7214 may be formed to protrude from one end portion (e.g., an end portion facing the −y-axis direction) of the first body 7211 in a longitudinal direction (e.g., the −y-axis direction). The first alignment pin 7214 may extend in a direction parallel to the hinge axis Ha or Hb. The first alignment pin 7214 may be inserted into the second part 722, the rotation plate 723, and the spacer 724. The first alignment hole 7215 may be recessed from the one end portion (e.g., the end portion facing the −y-axis direction) of the first body 7211 in an inward direction (e.g., a +y-axis direction). The first alignment hole 7215 may be recessed in a direction parallel to the hinge axis Ha or Hb. The second alignment pin 725 may be inserted into the first alignment hole 7215. The first alignment pin 7214 and the first alignment hole 7215 may be spaced apart from each other by a designated interval.

In one embodiment, the second part 722 may be a component formed separately from the first part 721. The second part 722 may be connected to one end portion of the first part 721 by the first alignment pin 7214 and the second alignment pin 725. The second part 722 may be connected to the first body 7211 of the first part 721 to be disposed on an opposite side of the second body 7212. For example, referring to FIG. 7F, the second part 722 may be connected to an end portion of the first part 721 facing the −y-axis direction to be disposed on the opposite side of the second body 7212.

In one embodiment, the second part 722 may include a third body 7221, a fourth body 7222, a first cam structure 7223, a rotation guide groove 7224, and a protrusion guide 7225.

In one embodiment, the third body 7221 may be connected to the first part 721. A second alignment hole 72211 may be formed in the third body 7221. The second alignment hole 72211 may be formed to penetrate the third body 7221. For example, the second alignment hole 72211 may penetrate the third body 7221 in the y-axis direction. At least one second alignment hole 72211 may be formed. For example, a pair of second alignment holes 72211 may be formed, and the first alignment pin 7214 and the second alignment pin 725 may be inserted into the second alignment holes 72211, respectively.

In one embodiment, the fourth body 7222 may be formed to extend from one end portion of the third body 7221. For example, the fourth body 7222 may be formed to extend in the −x-axis direction from an end portion of the third body 7221 facing the −x-axis direction, as shown in FIG. 7F. The fourth body 7222 may be formed in an arc shape of a predetermined angle. In a state in which the second part 722 is connected to the first part 721, the fourth body 7222 may be disposed on the opposite side of the second body 7212.

In one embodiment, the first cam structure 7223 may be formed on one surface of the fourth body 7222. For example, in the state in which the second part 722 is connected to the first part 721, the first cam structure 7223 may be formed on a surface of the fourth body 7222 facing the second body 7212. For example, referring to FIG. 7D, the first cam structure 7223 may be formed on a surface of the fourth body 7222 facing the −y-axis direction. The first cam structure 7223 may be formed along an arc having the hinge axis Ha or Hb as a center. The first cam structure 7223 may include at least one crest and/or one trough structure. For example, the first cam structure 7223 may protrude to include a first inclined surface, a first flat surface, and a second inclined surface.

In one embodiment, the rotation guide groove 7224 may be formed on another surface of the fourth body 7222. The rotation guide groove 7224 may be formed on a surface opposite to the surface on which the first cam structure 7223 is formed. For example, in the state in which the second part 722 is connected to the first part 721, the rotation guide groove 7224 may be formed on a surface opposite to a surface of the fourth body 7222 facing the second body 7212. For example, in FIG. 7F, the rotation guide groove 7224 may be formed on a surface of the fourth body 7222 facing the −y-axis direction. The rotation guide groove 7224 may be recessed along an arc having the hinge axis Ha or Hb as a center. An end portion of the protruding pin 7132a or 7132b of the hinge bracket 710 may be inserted into the rotation guide groove 7224. When the hinge structure 720a or 720b is rotated about the hinge axis Ha or Hb, an end portion of the protruding pin 7132a or 7132b may move along the rotation guide groove 7224, so that a path of rotation of the second part 722 relative to the protruding pin 7132a or 7132b may be guided.

In one embodiment, the protrusion guide 7225 may be formed to protrude from another surface of the fourth body 7222. The protrusion guide 7225 may be formed on the same side as a side on which the rotation guide groove 7224 is formed. For example, in FIG. 7F, the protrusion guide 7225 may be formed to protrude in the −y-axis direction from a side of the fourth body 7222 facing the −y-axis direction. At least a portion of a cross section of the protrusion guide 7225 may have an arc shape in the direction from the upper surface (e.g., the surface facing the +z-axis direction) to the lower surface (e.g., the surface facing the −z-axis direction). For example, a lower surface (e.g., a surface facing the −z-axis direction) of the protrusion guide 7225 may be formed in a shape of an arc having the hinge axis Ha or Hb as a center. The lower surface (e.g., the surface facing the −z-axis direction) of the protrusion guide 7225 may be seated on a guide seating portion 72322 of the rotation plate 723, and relative positions of the second part 722 and the rotation plate 723 may be aligned. In addition, the lower surface (e.g., the surface facing the −z-axis direction) of the protrusion guide 7225 may rotate along an arc-shaped upper surface (e.g., a surface facing the +z-axis direction) of the fixing plate 760 while being in contact with the arc-shaped upper surface, and a path of rotation of the second part 722 relative to the fixing plate 760 may be guided.

In one embodiment, the rotation plate 723 may be formed in a plate shape. At least one rotation plate 723 may be provided. The rotation plate 723 may be connected to one end portion of the second part 722 by the first alignment pin 7214 and the second alignment pin 725. For example, the rotation plate 723 may be connected to an end portion of the second part 722 facing the −y-axis direction, as shown in FIG. 7F.

In one embodiment, the rotation plate 723 may include a first portion 7231 and a second portion 7232.

In one embodiment, the first portion 7231 may correspond to the third body 7221 of the second part 722. A third alignment hole 72311 may be formed in the first portion 7231. The third alignment hole 72311 may be formed to penetrate the first portion 7231. For example, the third alignment hole 72311 may penetrate the first portion 7231 in the y-axis direction. At least one third alignment hole 72311 may be formed. For example, a pair of third alignment holes 72311 may be formed, and the first alignment pin 7214 and the second alignment pin 725 may be inserted into the third alignment holes 72311, respectively.

In one embodiment, the second portion 7232 may correspond to the fourth body 7222 of the second part 722. The second portion 7232 may be formed to extend from one end portion of the first portion 7231. For example, the second portion 7232 may be formed to extend in the −x-axis direction from an end portion of the first portion 7231 facing the −x-axis direction, as shown in FIG. 7F. The second portion 7232 may be formed in an arc shape of a predetermined angle.

In one embodiment, a rotation guide hole 72321 may be formed in the second portion 7232. The rotation guide hole 72321 may be formed to penetrate the second portion 7232. For example, the rotation guide hole 72321 may penetrate the second portion 7232 in the y-axis direction. The rotation guide hole 72321 may be formed along an arc having the hinge axis Ha or Hb as a center. The protruding pin 7132a or 7132b of the hinge bracket 710 may be inserted into the rotation guide hole 72321. When the hinge structure 720a or 720b is rotated about the hinge axis Ha or Hb, the protruding pin 7132a or 7132b may move along the rotation guide hole 72321, so that a path of rotation of the rotation plate 723 relative to the protruding pin 7132a or 7132b may be guided.

In one embodiment, a guide seating portion 72322 may be formed in the second portion 7232. The guide seating portion 72322 may be formed by recessing an upper surface (e.g., a surface facing the +z-axis direction) of the second portion 7232. The guide seating portion 72322 may be formed in a shape of an arc having the hinge axis Ha or Hb as a center. The guide seating portion 72322 may be formed in a shape corresponding to that of the lower surface (e.g., the surface facing the −z-axis direction) of the protruding guide 7225. The protrusion guide 7225 of the second part 722 may be seated on the guide seating portion 72322. The lower surface (e.g., the surface facing the −z-axis direction) of the protrusion guide 7225 may be seated on the guide seating portion 7232 of the rotation plate 723, and relative positions of the second part 722 and the rotation plate 723 may be aligned.

In one embodiment, the spacer 724 may correspond to the first portion 7231 of the rotation plate 723. The spacer 724 may be formed in a plate shape. A fourth alignment hole 7241 may be formed in the spacer 724. The fourth alignment hole 7241 may be formed to penetrate the spacer 724. For example, the fourth alignment hole 7241 may penetrate the spacer 724 in the y-axis direction. At least one fourth alignment hole 7241 may be formed. For example, a pair of fourth alignment holes 7241 may be formed, and the first alignment pin 7214 and the second alignment pin 725 may be inserted into the fourth alignment holes 7241, respectively.

In one embodiment, at least one spacer 724 may be provided. The rotation plate 723 and the spacer 724 may be alternately connected to one side of the second part 722. For example, the rotation plate 723 and the spacer 724 may be alternately disposed. For example, as shown in FIG. 7F, three rotation plates 723 and two spacers 724 may be alternately disposed. However, this is merely an example, and a number of rotation plates 723 and a number of spacers 724 are not limited thereto. Since an area of a rotation plate 723 is greater than an area of a spacer 724, a gap with a predetermined width may be formed between a plurality of rotation plates 723 when the rotation plates 723 and the spacers 724 are alternately disposed.

In one embodiment, the second alignment pin 725 may align positions of the first part 721, the second part 722, the rotation plate 723, and the spacer 724 and connect the first part 721, the second part 722, the rotation plate 723, and the spacer 724 to each other. The second alignment pin 725 may pass through the first alignment hole 7215 of the first part 721, the second alignment hole 72211 of the second part 722, the third alignment hole 72311 of the rotation plate 723, and the fourth alignment hole 7241 of the spacer 724. For example, an end portion of the second alignment pin 725 may be fixedly connected to the first alignment hole 7215 of the first part 721. For example, a screw thread may be formed in the end portion of the second alignment pin 725, and a screw thread corresponding to the formed screw thread may be formed in the first alignment hole 7215 of the first part 721. Based on the above structure, the first part 721, the second part 722, the rotation plate 723, and the spacer 724 may be fixedly connected to each other by the second alignment pin 725.

In one embodiment, the first alignment pin 7214 and the second alignment pin 725 may align positions of the first part 721, the second part 722, the rotation plate 723, and the spacer 724 and connect the first part 721, the second part 722, the rotation plate 723, and the spacer 724 to each other. The first alignment pin 7214 and the second alignment pin 725 may have a longitudinal direction (e.g., a y-axis direction) parallel to the hinge axis Ha or Hb. The first alignment pin 7214 and the second alignment pin 725 may be spaced apart from each other, to limit translational movements in the x-axis direction and the z-axis direction between the first part 721, the second part 722, the rotation plate 723, and the spacer 724, and limit rotational movements in all directions. The first alignment pin 7214 is formed integrally with the first part 721, as illustrated and described above, however, this is merely an example. For example, the first alignment pin 7214 may also be provided as a separate component such as the second alignment pin 725.

In one embodiment, the fixing plate 760 may be formed in a plate shape. At least one fixing plate 760 may be provided. A fixing hole 761 may be formed in the fixing plate 760. For example, the fixing hole 761 may be formed to penetrate the fixing plate 760. For example, the fixing hole 761 may penetrate the fixing plate 760 in the y-axis direction. The fixing hole 761 may have an arc shape corresponding to the protruding pin 7213a or 7213b of the hinge bracket 710. Since the protruding pin 7213a or 7213b is inserted into the fixing hole 761 of the fixing plate 760, the fixing plate 760 may be connected to the protruding pin 7213a or 7213b. An insertion structure of the fixing hole 761 and the protruding pin 7213a or 7213b may limit translational movements of the fixing plate 760 in the x-axis direction and the z-axis direction with respect to the hinge bracket 710, and rotational movements in all directions. At least a portion of an upper surface (e.g., a surface facing the +z-axis direction) of the fixing plate 760 may be formed in an arc shape. For example, the upper surface (e.g., the surface facing the +z-axis direction) of the fixing plate 760 may be formed in a shape of an arc having the hinge axis Ha or Hb as a center. The upper surface (e.g., the surface facing the +z-axis direction) of the fixing plate 760 may have a shape corresponding to that of the lower surface (e.g., the surface facing the −z-axis direction) of the protrusion guide 7225. The protrusion guide 7225 may be seated on the upper surface (e.g., the surface facing the +z-axis direction) of the fixing plate 760. When the second part 722 is rotated about the hinge axis Ha or Hb, the lower surface (e.g., the surface facing the −z-axis direction) of the protrusion guide 7225 may rotate along the arc-shaped upper surface (e.g., the surface facing the +z-axis direction) of the fixing plate 760 while being in contact with the upper surface of the fixing plate 760, and a path of rotation of the second part 722 relative to the fixing plate 760 may be guided.

In one embodiment, the fixing plate 760 may be alternately disposed with the rotation plate 723. For example, the fixing plate 760 and the rotation plate 723 may be alternately disposed in the y-axis direction. A thickness of the fixing plate 760 may substantially correspond to a thickness of the spacer 724. For example, as shown in FIG. 7A, three fixing plates 760 and three rotation plates 723 may be alternately disposed in the y-axis direction. However, this is merely an example, and a number of fixing plates 760 and a number of rotation plates 723 are not limited thereto. The fixing plate 760 and the rotation plate 723 that are alternately disposed may be in surface contact with each other in at least some areas. An elastic force provided by the elastic member 750a or 750b may be perpendicular to a surface of each of the fixing plate 760 and the rotation plate 723. Accordingly, the elastic force of the elastic member 750a or 750b may act as a normal force to generate a friction force between the fixing plate 760 and the rotation plate 723. A direction in which the fixing plate 760 and the rotation plate 723 are inserted into the protruding pin 7132a or 7132b may coincide with a direction of the elastic force of the elastic member 750a or 750b. For example, the fixing plate 760 and the rotation plate 723 may be inserted in the y-axis direction into the protruding pin 7132a or 7132b protruding in the y-axis direction, and the elastic force of the elastic member 750a or 750b may be directed in the y-axis direction. Based on the above structure, the fixing plate 760 and the rotation plate 723 may be in close contact with each other in the y-axis direction by the elastic force of the elastic member 750a or 750b. Accordingly, a large friction force may be generated between the fixing plate 760 and the rotation plate 723. For example, as shown in FIGS. 7G through 7I, when the hinge structure 720a or 720b is rotated about the hinge axis Ha or Hb, the rotation plate 723 may be relatively rotated while being in surface contact with the fixing plate 760, and a large friction force may be generated between the rotation plate 723 and the fixing plate 760. As a result, the friction force acting between the rotation plate 723 and the fixing plate 760 may further increase an open detent force, an intermediate state stopping force, and/or a close detent force.

Figure 8:
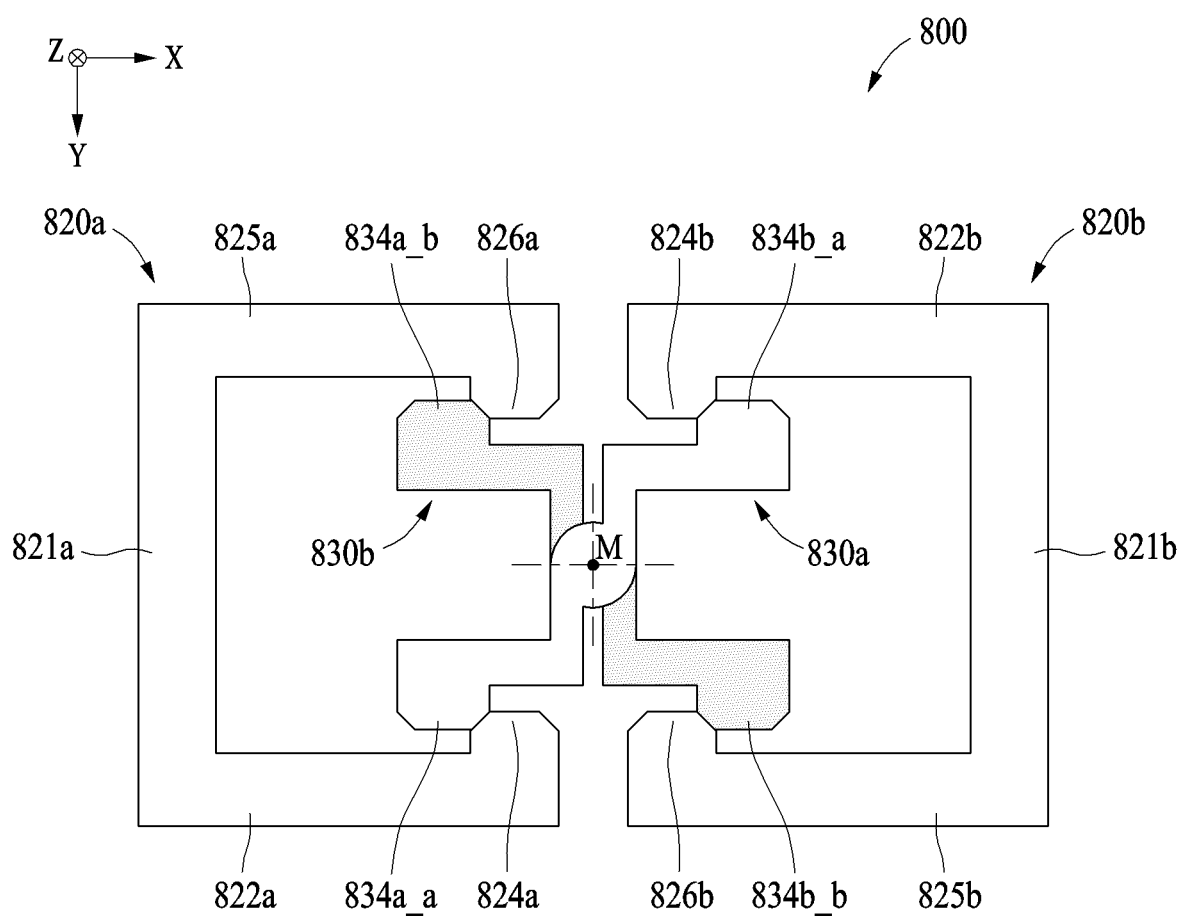
FIG. 8 is a rear view schematically illustrating a hinge assembly according to one embodiment.

FIG. 8 is a rear view schematically illustrating a hinge assembly according to one embodiment.

Referring to FIG. 8, in one embodiment, hinge structures 820a or 820b may be formed to be symmetrical with each other about the x-axis. For example, the hinge structure 820a or 820b may include a first body 821a or 821b, a second body 822a or 822b extending from one side (e.g., a side facing the −y-axis direction or +y-axis direction) of the first body 821a or 821b, and a third body 825a or 825b extending from another side (e.g., a side facing the +y-axis direction or −y-axis direction) of the first body 821a or 821b. A first cam structure 824a or 824b may be formed in the second body 822a or 822b, and a third cam structure 826a or 826b may be formed in the third body 825a or 825b.

In one embodiment, a pair of intermediate members 830 may be provided. For example, the intermediate members 830 may include a first intermediate member 830a and a second intermediate member 830b. The first intermediate member 830a and the second intermediate member 830b may be disposed to cross each other. For example, the first intermediate member 830a and the second intermediate member 830b may share the same middle axis M, but may be respectively disposed in diagonal directions crossing each other. For example, the first cam structure 824a of one hinge structure 820a may interoperate with one second cam structure 834a_a of the first intermediate member 830a, and the third cam structure 826a of the one hinge structure 820a may interoperate with one second cam structure 834a_b of the second intermediate member 830b. For example, the first cam structure 824b of the other hinge structure 820b may interoperate with another second cam structure 834b_a of the first intermediate member 830a, and the third cam structure 826b of the other hinge structure 820b may interoperate with another second cam structure 834b_b of the second intermediate member 830b. A hinge assembly 800 of FIG. 8 may operate in substantially the same manner as the hinge assembly 400 described with reference to FIGS. 4A through 4Y. The hinge assembly 800 of FIG. 8 may generate a detent force greater than that of the hinge assembly 400 of FIGS. 4A through 4Y.

Figure 9A:
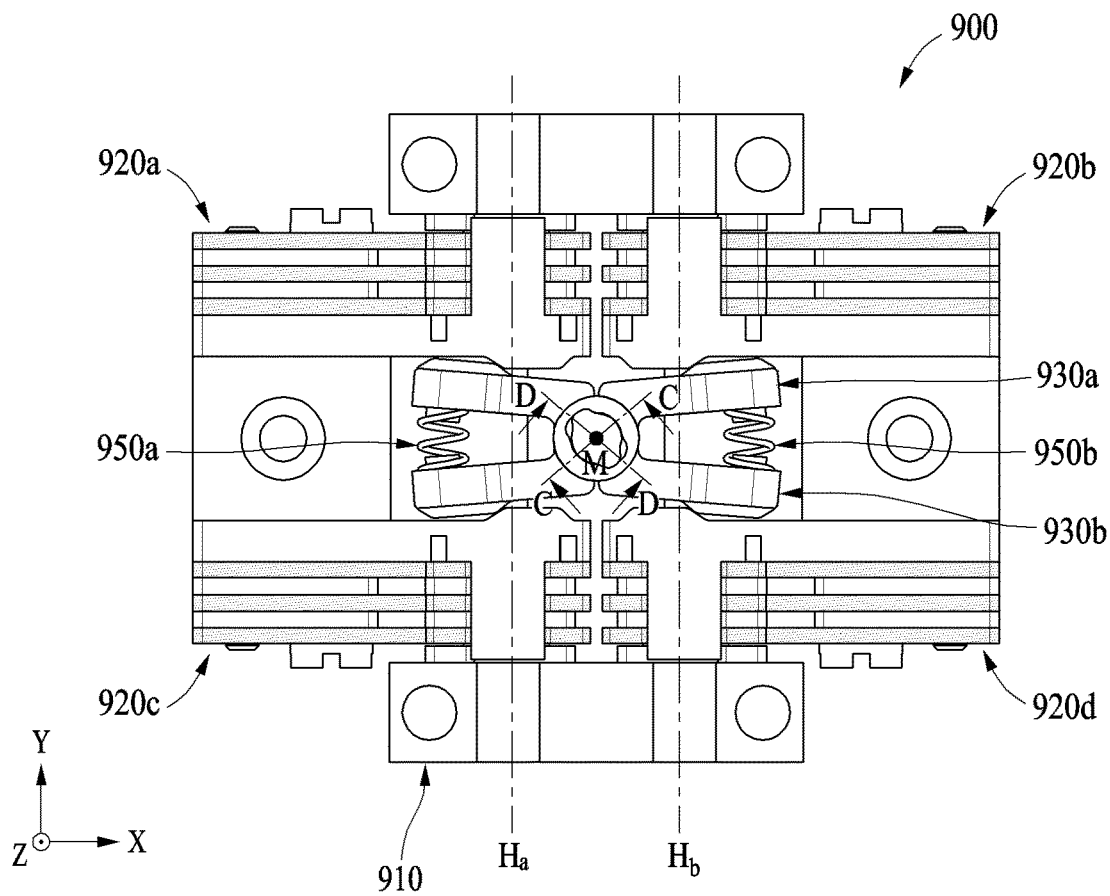
FIG. 9A is a front view illustrating a hinge assembly according to one embodiment.
Figure 9B:
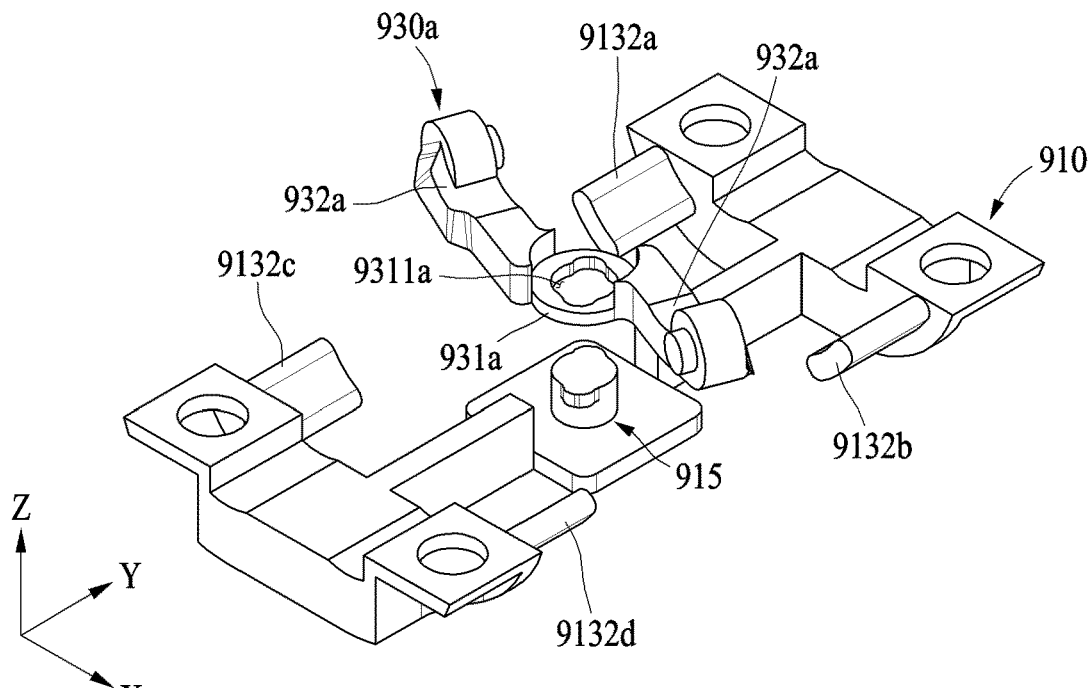
FIG. 9B is a perspective view illustrating a process of connecting a first intermediate member to a hinge bracket according to one embodiment.
Figure 9C:
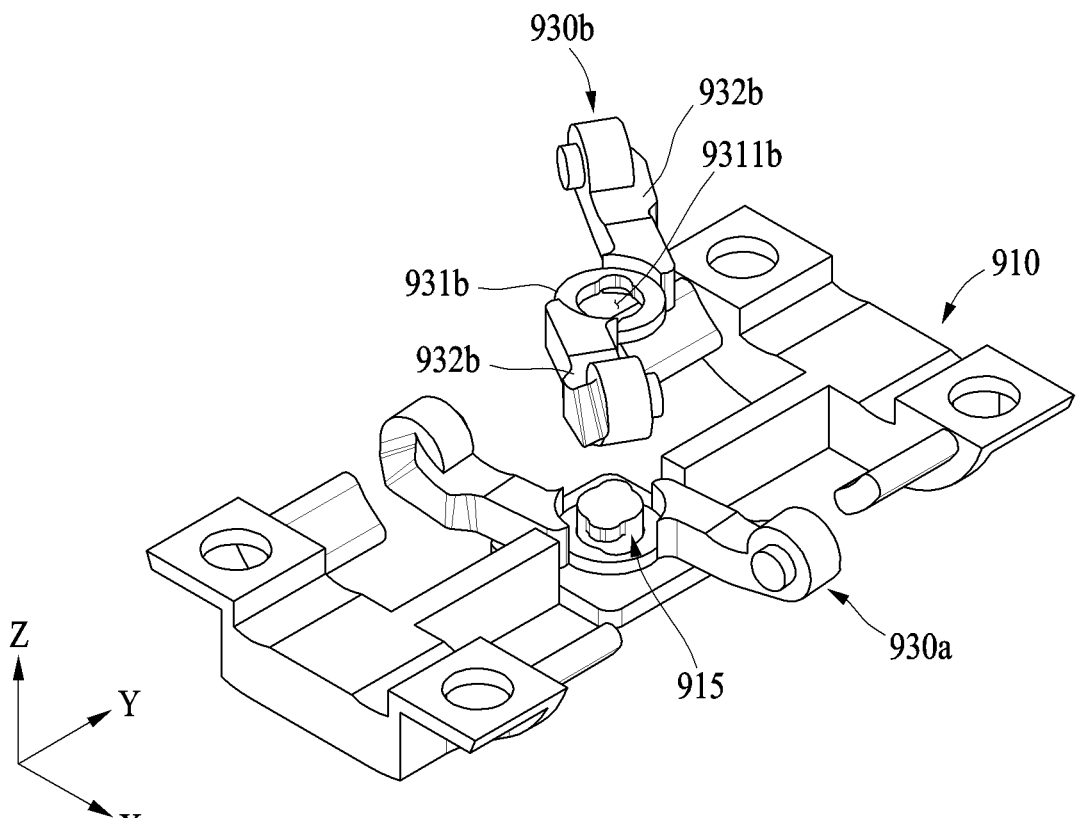
FIG. 9C is a perspective view illustrating a process of connecting a second intermediate member to a hinge bracket according to one embodiment.
Figure 9D:
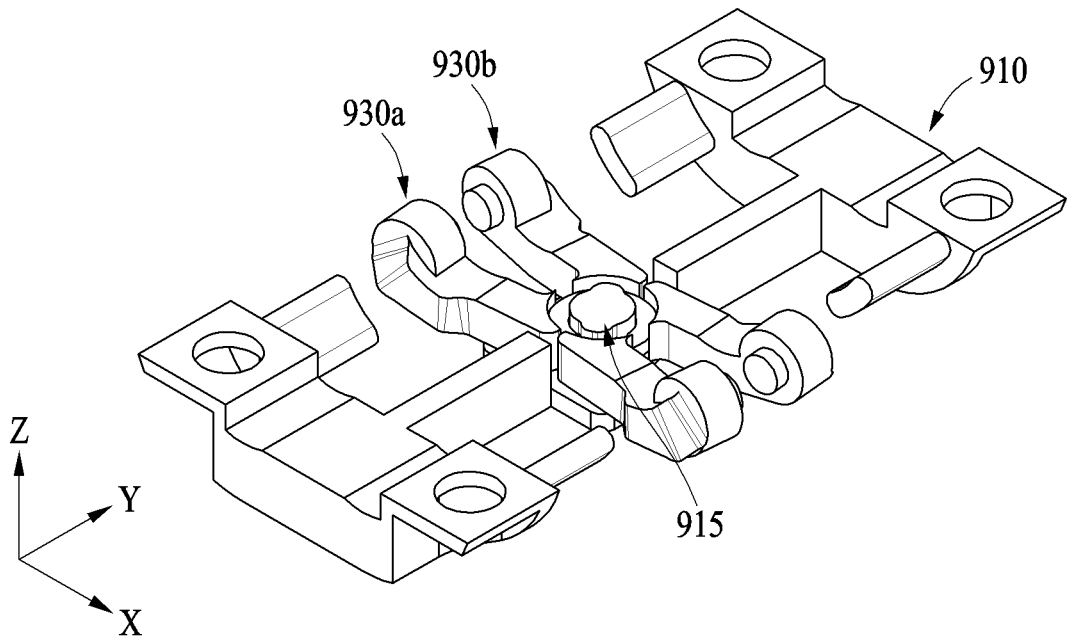
FIG. 9D is a perspective view illustrating a state in which a first intermediate member and a second intermediate member are connected to a hinge bracket according to one embodiment.
Figure 9E:
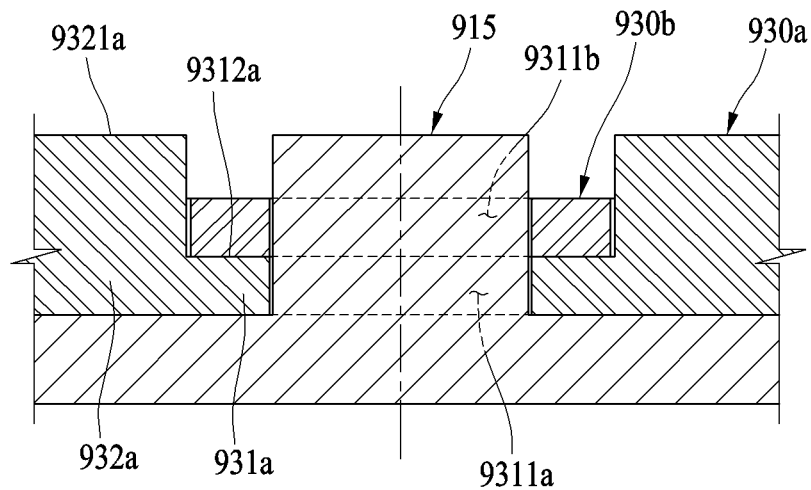
FIG. 9E is a cross-sectional view taken along line C-C of FIG. 9A.
Figure 9F:
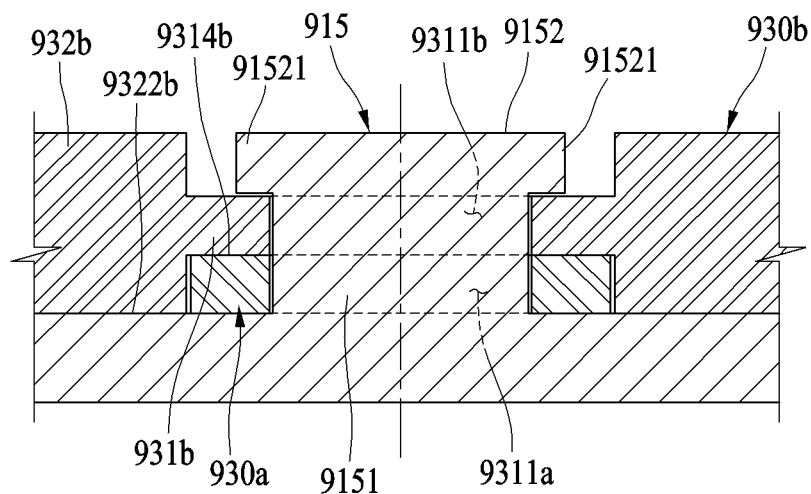
FIG. 9F is a cross-sectional view taken along line D-D of FIG. 9A.

FIG. 9A is a front view illustrating a hinge assembly according to one embodiment. FIG. 9B is a perspective view illustrating a process of connecting a first intermediate member to a hinge bracket according to one embodiment. FIG. 9C is a perspective view illustrating a process of connecting a second intermediate member to a hinge bracket according to one embodiment. FIG. 9D is a perspective view illustrating a state in which a first intermediate member and a second intermediate member are connected to a hinge bracket according to one embodiment. FIG. 9E is a cross-sectional view taken along line C-C of FIG. 9A. FIG. 9F is a cross-sectional view taken along line D-D of FIG. 9A.

Referring to FIGS. 9A through 9F, a hinge assembly 900 according to one embodiment may include a hinge bracket 910, two pairs of hinge structures 920a, 920b, 920c, and 920d, a pair of intermediate members 930a and 930b, and a pair of elastic members 950a and 950b.

In one embodiment, the hinge bracket 910 may include two pairs of protruding pins 9132a, 9132b, 9132c, and 9132d. The two pairs of hinge structures 920a, 920b, 920c, and 920d may be rotatably connected to the two pairs of protruding pins 9132a, 9132b, 9132c, and 9132d, respectively. For example, two hinge structures 920a and 920c may be rotatable about a first hinge axis Ha, and the other two hinge structures 920b and 920d may be rotatable about a second hinge axis Hb. However, this is merely an example, and the hinge bracket 910 may include two pairs of rail structures (e.g., the first rail structures 711a and 711b of FIG. 7E), and the two pairs of hinge structures 920a, 920b, 920c, and 920d may also be rotatably connected to the two pairs of rail structures.

In one embodiment, an intermediate protrusion 915 may be formed near a center of the hinge bracket 910. The description of the intermediate protrusion 415 of the hinge assembly 400 provided with reference to FIGS. 4A through 4Y may be similarly applied to the intermediate member protrusion 915, unless otherwise described.

In one embodiment, the pair of intermediate members 930a and 930b may include central portions 931a and 931b and extensions 932a and 932b, respectively. Through-holes 9311a and 9311b may be formed in the central portions 931a and 931b, respectively. The description of the through-hole 4311 of the hinge assembly 400 provided with reference to FIGS. 4A through 4Y may be similarly applied to the through-holes 9311a and 9311b, unless otherwise described.

In one embodiment, the pair of intermediate members 930a and 930b may be rotatably connected to the intermediate protrusion 915. For example, the pair of intermediate members 930a and 930b may be connected to the intermediate protrusion 915 and overlap each other. For example, the first intermediate member 930a may be disposed below (e.g., in the −z direction) the second intermediate member 930b, and the second intermediate member 930b may be disposed above (e.g., in the +z direction) the first intermediate member 930a. For example, the first intermediate member 930a may first be connected to the intermediate protrusion 915, and the second intermediate member 930b may be connected to the intermediate protrusion 915 above (e.g., in the +z direction) the first intermediate member 930a. For example, the pair of intermediate members 930a and 930b may be arranged such that longitudinal directions thereof may cross each other with respect to the middle axis M. For example, the pair of intermediate members 930a and 930b may cross to form an X-shape about the middle axis M.

In one embodiment, the first intermediate member 930a may be inserted into the intermediate protrusion 915 in a state in which the through-hole 9311a is aligned with a head 9152. For example, when the first intermediate member 930a is inserted into the intermediate protrusion 915, the first intermediate member 930a may be rotated in one direction (e.g., a counterclockwise direction) with respect to the intermediate protrusion 915 such that the through-hole 9311a may be out of alignment with the head 9152. The second intermediate member 930b may be inserted into the intermediate protrusion 915 in a state in which the through-hole 9311b is aligned with the head 9152. For example, when the second intermediate member 930b is inserted into the intermediate protrusion 915, the second intermediate member 930b may be rotated in one direction (e.g., a counterclockwise direction) with respect to the intermediate protrusion 915 such that the through-hole 9311b may be out of alignment with the head 9152. Based on the above configuration, the pair of intermediate members 930a and 930b may be prevented from being separated from the intermediate protrusion 915. However, this is merely an example, and a direction in which the pair of intermediate members 930a and 930b are rotated to prevent the pair of intermediate members 930a and 930b from being separated from the intermediate protrusion 915 is not limited thereto.

In one embodiment, in the first intermediate member 930a, an upper surface 9312a (e.g., a surface facing the +z direction) of the central portion 931a may be formed to be stepped below (e.g., in the −z direction) an upper surface 9321a (e.g., a surface facing the +z direction) of the extension 932a. In the second intermediate member 930b, a lower surface 9314b (e.g., a surface facing the −z direction) of the central portion 931b may be formed to be stepped above (e.g., in the +z direction) a lower surface 9322b (e.g., a surface facing the −z direction) of the extension 932b. For example, a sum of a height (e.g., a height in the z direction) of the central portion 931a of the first intermediate member 930a and a height (e.g., a height in the z direction) of the central portion 931b of the second intermediate member 930b may substantially correspond to a height (e.g., a height in the z direction to a bottom surface of a projection 91521 of a head 9152) of a protrusion base 9151. For example, each of the height (e.g., the height in the z direction) of the central portion 931a of the first intermediate member 930a and the height (e.g., the height in the z direction) of the central portion 931b of the second intermediate member 930b may be substantially half the height of the protrusion base 9151. Based on the above configuration, when the pair of intermediate members 930a and 930b are inserted into the intermediate protrusion 915, the head 9152 of the intermediate protrusion 915 may be exposed to an upper side (e.g., a side facing the +z direction) of the pair of intermediate members 930a and 930b by passing through the through-holes 9311a and 9311b. In addition, based on the above configuration, the extension 932a of the first intermediate member 930a and the extension 932b of the second intermediate member 930b may be positioned at substantially the same height (e.g., the height in the z direction), and accordingly the elastic member 950a or 950b may be disposed between the pair of intermediate members 930a and 930b.

In one embodiment, the pair of elastic members 950a and 950b may be arranged between both end portions of the pair of intermediate members 930a and 930b. For example, the first elastic member 950a may be positioned between one end portion of the first intermediate members 930a and one end portion of the second intermediate members 930b, and the second elastic member 950b may be positioned between the other end portion of the first intermediate members 930a and the other end portion of the second intermediate members 930b. For example, the pair of elastic members 950a and 950b may generate an elastic force to rotate the first intermediate member 930a in one direction (e.g., a counter-clockwise direction), and generate an elastic force to rotate the second intermediate member 930b in another direction (e.g., a clockwise direction).

The hinge assembly 900 of FIGS. 9A through 9F may operate in substantially the same manner as the hinge assembly 800 described above with reference to FIG. 8.

According to one embodiment, an electronic device 300 may include a display 250 including a first area 251, a second area 252, and a folding area 253 between the first area 251 and the second area 252, a first housing 311 configured to support the first area 251, a second housing 312 configured to support the second area 252, and a hinge assembly 400 configured to connect the first housing 311 and the second housing 312, and having a pair of hinge axes Ha and Hb. The hinge assembly 400 may include a hinge bracket 410 including an intermediate protrusion 415 formed to protrude in a direction of a middle axis M perpendicular to the pair of hinge axes Ha and Hb, a pair of hinge structures 420a and 420b connected to the hinge bracket 410 to be rotatable about the pair of hinge axes Ha and Hb, and an intermediate member 430 including a through-hole 4311 into which the intermediate protrusion 415 is inserted, to be rotatable about the middle axis M with respect to the hinge bracket 410. The intermediate protrusion 415 may include a protrusion base 4151 having a first radius R1, and a head 4152 including a projection 41521 which is formed on the protrusion base 4151 and which has a second radius R2 greater than the first radius R1. The through-hole 4311 may have a shape corresponding to a shape of the head 4152.

In one embodiment, the through-hole 4311 may include a main hole 43111 having the first radius R1, and a recessed portion 43112 recessed radially from the main hole 43111 to have the second radius R2.

In one embodiment, the intermediate member 430 may be inserted into the intermediate protrusion 415 in a state in which the head 4152 and the through-hole 4311 are aligned such that the shape of the head 4152 and the shape of the through-hole 4311 correspond to each other.

In one embodiment, when the intermediate member 430 is inserted into the intermediate protrusion 415, the intermediate member 430 may be rotated with respect to the intermediate protrusion 415 such that the head 4152 and the through-hole 4311 may be out of alignment with each other.

In one embodiment, the head 4152 and the through-hole 4311 may be out of alignment with each other in a state in which the intermediate member 430 is inserted into the intermediate protrusion 415, to prevent the intermediate member 430 from being separated from the intermediate protrusion 415 in a direction of the middle axis M.

In one embodiment, a number of projections 41521 and a number of recessed portions 43112 may be equal.

In one embodiment, a pair of projections 41521 may be formed to protrude in directions opposite to each other, and a pair of recessed portions 43112 may be formed to protrude in directions opposite to each other.

In one embodiment, the intermediate member 430 may include a central portion 431 in which the through-hole 4311 is formed and which is rotatably connected to the hinge bracket 410, and a pair of extensions 432a and 432b which extend from the central portion 431 to both sides.

In one embodiment, an upper surface of the central portion 431 may be formed to be stepped below an upper surface of the extension 432a, 432b.

In one embodiment, the intermediate protrusion 415 may further include a groove 4153 recessed in at least a portion of an outer surface of the protrusion base 4151.

In one embodiment, the groove 4153 may be formed along a circumference of the protrusion base 4151.

In one embodiment, a plurality of grooves 4153 may be formed. The plurality of grooves 4153 may be formed to be spaced apart from each other in the direction of the middle axis M in the protrusion base 4151.

In one embodiment, a lubricant may be disposed in the groove 4153 to reduce a rotational frictional resistance of the intermediate member 430 with respect to the intermediate protrusion 415.

In one embodiment, a first cam structure 424 may be formed on each of the pair of hinge structures 420a and 420b, and a second cam structure 434a, 434b interoperating with the first cam structure 424 may be formed in each of both end portions of the intermediate member 430.

In one embodiment, the intermediate member 430 may further include an elastic member 450a, 450b configured to provide an elastic force to the intermediate member 430 in a direction in which the intermediate member 430 is rotated in one direction about the middle axis M.

According to various embodiments, the electronic device 300 may include a display 250 including a first area 251, a second area 252, and a folding area 253 between the first area 251 and the second area 252, a first housing 311 configured to support the first area 251, a second housing 312 configured to support the second area 252, a hinge assembly 900 configured to connect the first housing 311 and the second housing 312, and having a pair of hinge axes Ha and Hb. The hinge assembly 900 may include a hinge bracket 910 including an intermediate protrusion 915 formed to protrude in a direction of a middle axis M perpendicular to the pair of hinge axes Ha and Hb, two pairs of hinge structures 920a, 920b, 920c, and 920d connected to the hinge bracket 910 to be rotatable about the pair of hinge axes Ha and Hb, a pair of intermediate members 930a and 930b connected to the intermediate protrusion 915 and overlapping each other, to be rotatable about the middle axis M with respect to the hinge bracket 910, respectively, each of the pair of intermediate members 930a and 930b including a through-hole 9311a or 9311b into which the intermediate protrusion 915 is inserted. The intermediate protrusion 915 may include a protrusion base 9151 having a first radius R1, and a head 9152 including a projection 91521 which is formed on the protrusion base 9151 and which has a second radius R2 greater than the first radius R1. The through-hole 9311a or 9311b may have a shape corresponding to a shape of the head 9152.

In one embodiment, each of the pair of intermediate members 930a and 930b may include a central portion 931a or 931b in which the through-hole 9311a or 9311b is formed and which is rotatably connected to the hinge bracket 910, and a pair of extensions 932a or 932b which extend from the central portion 931a or 931b to both sides of each of the intermediate members 930a and 930b.

In one embodiment, the pair of intermediate members 930a and 930b may be arranged such that longitudinal directions of the intermediate members 930a and 930b cross each other with respect to the middle axis M.

In one embodiment, the first intermediate member 930a disposed on a relatively lower side of the pair of intermediate members 930a and 930b may be formed such that an upper surface of the central portion 931a of the first intermediate member 930a is stepped below an upper surface of the extension 932a of the first intermediate member 930a, and the second intermediate member 930b disposed on a relatively upper side of the pair of intermediate members 930a and 930b may be formed such that a lower surface of the central portion 931b of the second intermediate member 930b is stepped above a lower surface of the extension 932b of the second intermediate member 930b.

In one embodiment, a pair of elastic members 950a and 950b disposed between both ends of the pair of intermediate members 930a and 930b may be further included.

What is claimed is:

1. An electronic device comprising:
   a display comprising a first area, a second area, and a folding area between the first area and the second area;
   a first housing configured to support the first area;
   a second housing configured to support the second area; and
   a hinge assembly configured to connect the first housing and the second housing, and having a pair of hinge axes,
   wherein the hinge assembly comprises:
      a hinge bracket comprising an intermediate protrusion formed to protrude in a direction of a middle axis perpendicular to the pair of hinge axes;
      a pair of hinge structures connected to the hinge bracket to be rotatable about the pair of hinge axes; and
      an intermediate member comprising a through-hole into which the intermediate protrusion is inserted, to be rotatable about the middle axis with respect to the hinge bracket,
      wherein the intermediate protrusion comprises a protrusion base having a first radius, and a head comprising a projection which is formed on the protrusion base and which has a second radius greater than the first radius, and
      wherein the through-hole has a shape corresponding to a shape of the head.

2. The electronic device of claim 1, wherein the through-hole comprises:
   a main hole having the first radius; and
   a recessed portion recessed radially from the main hole to have the second radius.

3. The electronic device of claim 1, wherein the intermediate member is inserted into the intermediate protrusion in a state in which the head and the through-hole are aligned such that the shape of the head and the shape of the through-hole correspond to each other.

4. The electronic device of claim 3, wherein, when the intermediate member is inserted into the intermediate protrusion, the intermediate member is rotated with respect to the intermediate protrusion such that the head and the through-hole are out of alignment with each other.

5. The electronic device of claim 4, wherein the head and the through-hole are out of alignment with each other in a state in which the intermediate member is inserted into the intermediate protrusion, to prevent the intermediate member from being separated from the intermediate protrusion in a direction of the middle axis.

6. The electronic device of claim 2, wherein a number of projections and a number of recessed portions are equal.

7. The electronic device of claim 6, wherein
   a pair of projections are formed to protrude in directions opposite to each other, and
   a pair of recessed portions are recessed in direction opposite to each other.

8. The electronic device of claim 1, wherein the intermediate member comprises:
   a central portion in which the through-hole is formed and which is rotatably connected to the hinge bracket; and
   a pair of extensions which extend from the central portion to both sides of the intermediate member.

9. The electronic device of claim 8, wherein an upper surface of the central portion is formed to be stepped below an upper surface of each of the extensions.

10. The electronic device of claim 1, wherein the intermediate protrusion further comprises a groove recessed in at least a portion of an outer surface of the protrusion base.

11. The electronic device of claim 10, wherein the groove is formed along a circumference of the protrusion base.

12. The electronic device of claim 11, wherein
    a plurality of grooves is formed, and
    the plurality of grooves is formed to be spaced apart from each other in a direction of the middle axis in the protrusion base.

13. The electronic device of claim 12, wherein a lubricant is disposed in the groove to reduce a rotational frictional resistance of the intermediate member with respect to the intermediate protrusion.

14. The electronic device of claim 1, wherein
    a first cam structure is formed on each of the pair of hinge structures, and
    a second cam structure interoperating with the first cam structure is formed in each of both end portions of the intermediate member.

15. The electronic device of claim 14, further comprising:
    an elastic member configured to provide an elastic force to the intermediate member in a direction in which the intermediate member is rotated in one direction about the middle axis.

16. An electronic device comprising:
    a display comprising a first area, a second area, and a folding area between the first area and the second area;
    a first housing configured to support the first area;
    a second housing configured to support the second area; and a hinge assembly configured to connect the first housing and the second housing, and having a pair of hinge axes, wherein the hinge assembly comprises:

a hinge bracket comprising an intermediate protrusion formed to protrude in a direction of a middle axis perpendicular to the pair of hinge axes;

two pairs of hinge structures connected to the hinge bracket to be rotatable about the pair of hinge axes;

a pair of intermediate members connected to the intermediate protrusion and overlapping each other, to be rotatable about the middle axis with respect to the hinge bracket, respectively, each of the pair of intermediate members comprising a through-hole into which the intermediate protrusion is inserted, wherein the intermediate protrusion comprises a protrusion base having a first radius, and a head comprising a projection which is formed on the protrusion base and which has a second radius greater than the first radius, and wherein the through-hole has a shape corresponding to a shape of the head.

17. The electronic device of claim 16, wherein each of the pair of intermediate members comprises:

a central portion in which the through-hole is formed and which is rotatably connected to the hinge bracket; and a pair of extensions which extend from the central portion to both sides of each of the intermediate members.

18. The electronic device of claim 17, wherein the pair of intermediate members are arranged such that longitudinal directions of the intermediate members cross each other with respect to the middle axis.

19. The electronic device of claim 17, wherein a first intermediate member disposed on a relatively lower side of the pair of intermediate members is formed such that an upper surface of a central portion of the first intermediate member is stepped below an upper surface of an extension of the first intermediate member, and a second intermediate member disposed on a relatively upper side of the pair of intermediate members is formed such that a lower surface of a central portion of the second intermediate member is stepped above a lower surface of an extension of the second intermediate member.

20. The electronic device of claim 18, further comprising:

a pair of elastic members disposed between both end portions of the pair of intermediate members.

* * * * *